(12) United States Patent
Suh et al.

(10) Patent No.: US 12,540,942 B2
(45) Date of Patent: *Feb. 3, 2026

(54) MONOCLONAL ANTIBODY SPECIFICALLY BINDING TO THIOREDOXIN 1 AND METHODS OF USE THEREOF FOR BREAST CANCER DIAGNOSIS

(71) Applicant: E&S HEALTHCARE CO., LTD., Daejeon (KR)

(72) Inventors: Kyong Hoon Suh, Daejeon (KR); Dae Joong Kim, Seoul (KR); Young Kim, Cheongju-si (KR); Mi Kyung Kim, Daejeon (KR); Jong Hwan Jung, Daejeon (KR); Ki Se Lee, Sejong (KR)

(73) Assignee: E&S HEALTHCARE CO., LTD., Yuseong-Gu (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/443,970

(22) Filed: Feb. 16, 2024

(65) Prior Publication Data

US 2024/0192215 A1 Jun. 13, 2024

Related U.S. Application Data

(63) Continuation of application No. 16/755,035, filed as application No. PCT/KR2018/012069 on Oct. 12, 2018, now Pat. No. 11,953,502.

(30) Foreign Application Priority Data

Oct. 12, 2017 (KR) ........................ 10-2017-0132536

(51) Int. Cl.

| | |
|---|---|
| G01N 33/574 | (2006.01) |
| C07K 7/08 | (2006.01) |
| C07K 16/40 | (2006.01) |
| G01N 33/543 | (2006.01) |
| G01N 33/577 | (2006.01) |
| G01N 33/58 | (2006.01) |
| C07K 7/00 | (2006.01) |
| C07K 7/06 | (2006.01) |
| C07K 14/00 | (2006.01) |

(52) U.S. Cl.
CPC ......... *G01N 33/57415* (2013.01); *C07K 7/08* (2013.01); *C07K 16/40* (2013.01); *G01N 33/54393* (2013.01); *G01N 33/577* (2013.01); *G01N 33/581* (2013.01); *C07K 7/00* (2013.01); *C07K 7/06* (2013.01); *C07K 14/00* (2013.01); *C07K 2317/21* (2013.01); *C07K 2317/24* (2013.01); *C07K 2317/34* (2013.01); *C07K 2317/54* (2013.01); *C07K 2317/55* (2013.01); *C07K 2317/565* (2013.01); *C07K 2317/622* (2013.01)

(58) Field of Classification Search
CPC ....... G01N 33/57415; G01N 33/54393; G01N 33/577; G01N 33/581; G01N 2333/90209; C07K 7/08; C07K 16/40; C07K 7/00; C07K 7/06; C07K 14/00; C07K 2317/21; C07K 2317/24; C07K 2317/34; C07K 2317/54; C07K 2317/55; C07K 2317/565; C07K 2317/622; C07K 2317/52; C07K 2317/56; C07K 2317/92

See application file for complete search history.

(56) References Cited

U.S. PATENT DOCUMENTS

| | | |
|---|---|---|
| 8,512,963 B2 | 8/2013 | Graham et al. |
| 2002/0102654 A1 | 8/2002 | Tang et al. |
| 2011/0143379 A1 | 6/2011 | Graham et al. |
| 2012/0289431 A1 | 11/2012 | Kim |

FOREIGN PATENT DOCUMENTS

| | | |
|---|---|---|
| CN | 106397581 | 2/2017 |
| EP | 2410336 | 1/2012 |
| EP | 3708575 | 9/2020 |
| JP | 06261783 | 9/1994 |
| KR | 10-2005-0114268 | 12/2005 |
| KR | 20100104110 | 9/2010 |
| KR | 101058230 | 8/2011 |
| RU | 2344831 | 1/2009 |
| WO | WO 2005/117930 | 12/2005 |
| WO | WO 2010/107158 | 9/2010 |
| WO | WO 2018/052153 | 3/2018 |

OTHER PUBLICATIONS

International Search Report and Written Opinion issued in Application No. PCT/KR2018/012069, dated May 17, 2019.

(Continued)

*Primary Examiner* — Robert S Landsman
(74) *Attorney, Agent, or Firm* — NORTON ROSE FULBRIGHT US LLP

(57) ABSTRACT

The present invention relates to an epitope of a thioredoxin-1 (Trx1) antigen and a use thereof, and more particularly, to the epitope, and an antibody or an antigen-binding fragment binding thereto. The epitope region of the human Trx1 antigen confirmed in the present invention may be effectively used in the development of an improved antibody to enhance the binding affinity of an anti-Trx1 antibody. In addition, the improved antibody of the present invention is effective in improvement of performance of a breast cancer diagnosis kit due to excellent binding affinity for Trx1 and very high sensitivity and specificity, compared to a conventional anti-Trx1 antibody. Further, the accuracy and reliability of breast cancer diagnosis may significantly increase because exceptionally high sensitivity and specificity are exhibited by detecting the monoclonal antibody of the present invention, which specifically binds to Trx1, rather than detecting CA15-3, another conventional breast cancer diagnostic biomarker.

15 Claims, 35 Drawing Sheets

Specification includes a Sequence Listing.

(56) References Cited

OTHER PUBLICATIONS

NCBI, GenBank: AAA16583.1, "Immunoglobulin Heavy Chain, Partial [Mus musculus]", Mar. 9, 1991.
NCBI, GenBank: AAB05154.1. "Ig 6D12.F1 Light Chain, Partial [Mus musculus]", Sep. 14, 2001.
NCBI, GenBank: AAF88053.1. "Immunoglobulin Light Chain Variable Region, Partial [Mus musculus]", Jul. 26, 2016.
NCBI, GenBank: BAU30829.1, "Immunoglobulin Heavy Chain, Partial [Mus musculus]", Jan. 14, 2016.
NCBI, PDB: 2IIY_A, "Chain A, Crystal Structure of S-Nitroso Thioredoxin", Oct. 10, 2012.
Park et al., "Thioredoxin 1 as a serum marker for breast cancer and its use in combination with CEA or CA15-3 for improving the sensitivity of breast cancer diagnoses" *BMC Research Notes* 2014, 7(7), 12 pages.
Schellens, et al. "Comprehensive analysis of the naturally processed peptide repertoire: differences between HLA-A and B in the immunopeptidome", *PLOS One*, 2015.
Uniparc—UP10000DFC16 (https://www.uniprot.org/uniparc/UP1000D9FC_16_) web capture Oct. 9, 2021.
Weichsel et al., "Buried S-Nitrosocysteine Revealed in Crystal Structures of Human Thioredoxin" *Biochemistry* 2007, 46, 1219-1227.
Extended European Search Report issued in corresponding European Application No. 18866509.5, dated Apr. 16, 2025.

(a)
SEQUENCE: >Unnamed-1

1   QIVLTQSPAIMSASPGEKVTMTCSASSRLSYMHWYQQKPGTSPKRWIYDTSKLASGVPARFSGSGSGTSYSLTISTMEAE
81  DAATYYCHQRSSYPFTFGAGTKLEIKRADAAPTVSIFPPSSEQLTSGGASVVCFLNNFYPRDINVKWKIDGSERQNGVLNS
161 WTDQDSKDSTYSMSSTLTLTKDEYERHNSYTCEATHKTSTSPIVKSFNRNEC (SEQ ID NO: 186)

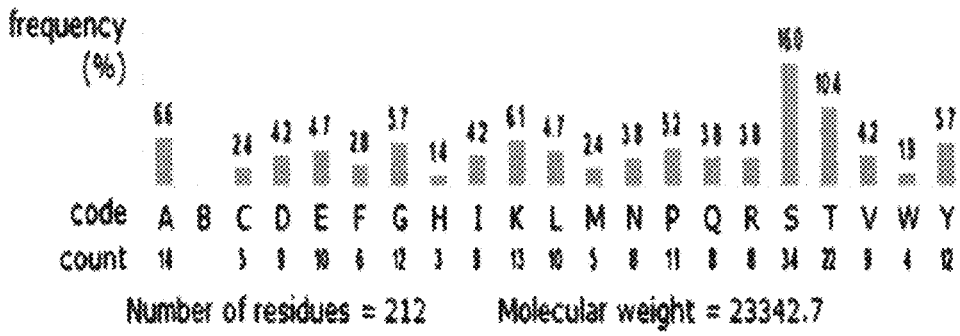

Number of residues = 212    Molecular weight = 23342.7

(b)
SEQUENCE: >Unnamed-1

1   EVQLQQSGAELVRPGASVKLSCTASGFNIKDTFMHWVKQRPEQGLEWIGRIDPANGNTRYDPKFQGRATITADTSSNTAY
81  LQLSSLTSEDTAVYYCALLQYSANDYWGQGTSVTVSSAKTTPPSVYPLAPGCGDTTGSSVTLGCLVKGYFPESVTVTWNS
161 GSLSSSVHTFPALLQSGLYTMSSSVTVPSSTWPSQTVTCSVAHPASSTTVDKKLEPSGPISTINPCPPCKECHKCPAPNL
241 EGGPSVFIFPPNIKDVLMISLTPKVTCVVVDVSEDDPDVQISWFVNNVEVHTAQTQTHREDYNSTIRVVSTLPIQHQDWM
321 SGKEFKCKVNNKDLPSPIERTISKIKGLVRAPQVYILPPPAEQLSRKDVSLTCLVVGFNPGDISVEWTSNGHTEENYKDT
401 APVLDSDGSYFIYSKLNMKTSKWEKTDSFSCNVRHEGLKNYYLKKTISRSPG (SEQ ID NO: 187)

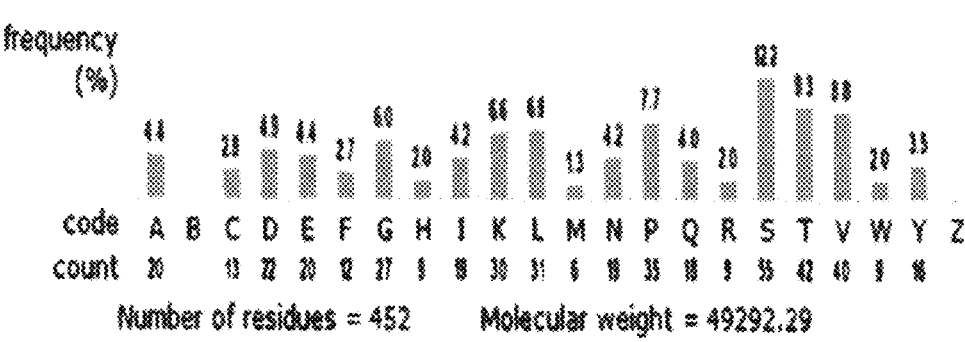

Number of residues = 452    Molecular weight = 49292.29

FIG. 2

(a)
SEQUENCE: >Unnamed-1

1   DVLMTQTPLSLPVSLGDQASISCRSSQSIVHSNGNTYLEWYLQRPGQSPKLLIYKVSNRFSGVPDRFSGSGSGTDFTLKI
81  SRVEAEDLGVYYCFQGSHVPYTFGGGTKLEIKRADAAPTVSIFPPSSEQLTSGGASVVCFLNNFYPKDINVKWKIDGSER
161 QNGVLNSWTDQDSKDSTYSMSSTLTLTKDEYERHNSYTCEATHKTSTSPIVKSFNRNEC (SEQ ID NO: 188)

COMPOSITION: frequency (%)

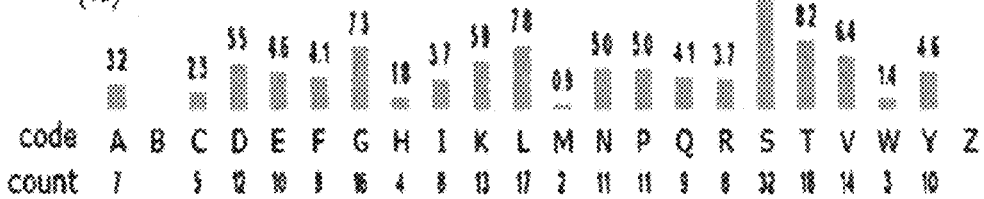

Number of residues = 219    Molecular weight = 24157.65

(b)
SEQUENCE: >Unnamed-1

1   GVPLDQSGAELARPGASVKMSCKASGYTFTSYTMHWVKQRPGQGLEWIGYINPSSGYTNYNQKFKDKATLTADKSSSTAY
81  MQLSSLTSEDSAVYFCASEGGPLYYFDYWGQGTTLTVSSAKTTPPSVYPLAPGSAAQTNSMVTLGCLVKGYFPEPVTVTN
161 NSGSLSSGVHTFPAVLQSDLYTLSSSVTVPSSTWPSETVTCNVAHPASSTKVDKKIVPRDCGCKPCICTVPEVSSVFIFP
241 PKPKDVLTITLTPKVTCVVVDISKDDPEVQFSWFVDDVEVHTAQTQPREEQFNSTFRSVSELPIMHQDWLNGKEFKCRVN
321 SAAFPAPIEKTISKTKGRPKAPQVYTIPPPKEQMAKDKVSLTCMITDFFPEDITVEWQWNGQPAENYKNTQPIMDTDGSY
401 FVYSKLNVQKSNWEAGNTFTCSVLHEGLHNHHTEKSLSHSPG (SEQ ID NO: 189)

COMPOSITION: frequency (%)

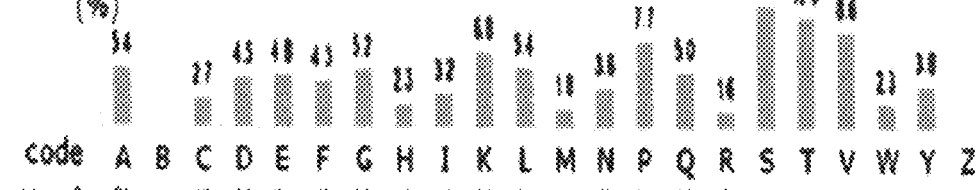

Number of residues = 442    Molecular weight = 48807.7

FIG. 3

● Alignment with the closest gene and allele from the IMGT V domain directory: (All species)

```
                   FR1-IMGT           CDR1-IMGT             FR2-IMGT         CDR2-IMGT
                    (1-26)             (27-38)               (39-55)          (56-65)
                                         BC                    C'C"            C'C"
            A                (16-26)   (27-38)    C  (39-46) (47-55)         (56-65)
          (1-15)      B                                                              
            1        10  15 16        23 26 27  38 39 41  46 47          55 56     65
            |........|   |.........|   |......|  |.......|  |.........|  |.........|

DVLMTQTPLSLPVSL GDQASISCRSS QSIVHS.NGNTY LEWYLQKP GQSPKLLIY KV........S

IGKV1-117*01   DVLMTQTPLSLPVSL GDQASISCRSS QSIVHS.NGNTY LEWYLQKP GQSPKLLIY KV........S
Mus musculus FR3-IMGT                            CDR3-IMGT         FR4-IMGT
                    (66-104)                            (105-117)         (118-128)
                                                            FG                G
            C"       D          E          F          (105-117)          (118-128)
          (66-74)  (75-84)    (85-96)    (97-104)
           66    74 75    84 85    89  96 97    104 105 111 112 117 118       128
           |......|  |.......|  |........|  |.......|  |.....................|  |.........|

NRFSGVP.D RFSGSG..SG TDFTLKISRVEA EDLGVYYC FQGSH....VFIT FGGGTKLEIK. (SEQ ID NO: 190)

NRFSGVP.D RFSGSG..SG TDFTLKISRVEA EDLGVYYC FQGSHVP              (SEQ ID NO: 191)

YT FGGGTKLEIK  (SEQ ID NO: 192)
```

FIG. 8A

● Alignment with the closest gene and allele from the IMGT V domain directory: (All species)

```
                    FR1-IMGT              CDR1-IMGT           FR2-IMGT              CDR2-IMGT
                     (1-26)                (27-38)             (39-55)               (56-65)
              A              B                BC              C           C'          C'C"
             (1-15)        (16-26)          (27-38)         (39-46)     (47-55)      (56-65)
        1         10  15 16      23 26 27           38 3941 46 47      55 56     65
        |..........|...|........|..|..|.|..........|..|.|..|..|........|..|.....|

IGKV4-70*01   QIVLTQSPAIMSASP GEKVTMTCSAS SRI......SY MHWYQQKP GTSPKRWIY DI......S
Mus musculus QIVLTQSPAIMSASP GEKVTMTCSAS SSI......SY MHWYQQKP GTSPKRWIY DI......S
                                              R                Y FR3-IMGT                                        CDR3-IMGT              FR4-IMGT
                     (66-104)                                        (105-117)              (118-128)
              C"            D              E            F              FG                     G
             (66-74)      (75-84)        (85-96)      (97-104)        (105-117)              (118-128)
        66    74 75      84 85   89   96 97     104 105 11112 117 118             128
        |.....|..|........|..|..|..|..|........|..|..|...|..|........|..|..|.....|

KLASGVP.A RFSGSG..SG TSYSLTISSMEA EDAATYYC HQRS......SYPT FGAGTKLELK (SEQ ID NO: 196)

KLASGVP.A RFSGSG..SG TSYSLTISSMEA EDAATYYC HQRSSYP            (SEQ ID NO: 197)
                                          T (SEQ ID NO: 198)
                                                               LT FGAGTKLELK
                                                                P
```

IGKV4-70*01
*Mus musculus*

IGKJ5*01
*Mus musculus*

FIG. 8C

PREDICTED: thioredoxin-like [Chrysochloris asiatica]
Sequence ID: XP_006863063.1 Length: 105 Number of Matches: 1

Range 1: 2 to 104 Genbank Graphics

Query: human TRX1
Sbjct: *Chrysochloris asiatica* TRX1

| Score | Expect | Method | Identities | Positives | Gaps |
|---|---|---|---|---|---|
| 176 bits(446) | 1e-55 | Compositional matrix adjust | 84/103(82%) | 92/103(89%) | 0/103(0%) |

```
Query  1    VKQIESKTAFQEALDAAGDKLVVVDFSATWCGPCKMIKPFFHHLSEKYSNVIFLEVDVDD  60
            VK+IE K F  AL +AGDKLVVVDFSATWCGPCKMIKPF+HSLSEK+ N++FLEVDVDD
Sbjct  2    VKEIEGREDKRAALSSAGDKLVVVDFSATWCGPCKMIKPFYHSLSEKFGNMVFLEVDVDD  61

Query  61   CQDVASECEVKCMPTFQFFKKGQKVGEFSGANKEKLEATINEL  103
            CQDVASECEVKC+ +FQF+K  +KVGEFSG NKEKLEA INEL
Sbjct  62   CQDVASECEVKCMITFQFYKKRERVGEFSGVNKEKLEAIINEL 104
```

FIG. 11

Human

Translational GUs-scientific
translation of human TRX

VKQIESKTAFQEALDAAGDKLVVVDFSATWCGPCKMIKPFFHSLSEKYSNVIFLEVDVDDCQDVASECEVKCMPTFQFFKKGQKVGEFSGANKEKLEATINELV (SEQ ID NO: 205)
VKQIESTAFQEALDAAGDKLVVVDFSATWCGPCKMIKPFFHSLSEKYSNVIFLEVDVDDCQDVASECEVKCMPTFQFFKKGQKVGEFSGANKEKLEATINELV (SEQ ID NO: 206)

FIG. 15A

Human
VKEIGKEDHAALSSAGDKLVVVDFSATWCGPCKMIKPFFHSLSEKYSNVIFLEVDVDDCQDVASECEVKCMPTFQFFKKGQKVGEFSGANKEKLEATINELC (SEQ ID NO: 205)

Asiatica
VKQIESKTAFQEALDAAGDKLVVVDFSATWCGPCKMIKPFFHSLSEKYSNVIFLEVDVDDCQDVASECEVKCMPTFQFFKKGQKVGEFSGANKEKLEATINELV (SEQ ID NO: 206)

M1  VKQIESKTAFQEALDAAGDKLVVVDFSATWCGPCKMIKPFFHSLSEKYSNVIFLEVDVDDCQDVASECEVKCMPTFQFFKKGQKVGEFSGANKEKLEATINELV (SEQ ID NO: 207)
M2  VKQIESKTAFHAALSSAGDKLVVVDFSATWCGPCKMIKPFFHSLSEKYSNVIFLEVDVDDCQDVASECEVKCMPTFQFFKKGQKVGEFSGANKEKLEATINELV (SEQ ID NO: 208)
M3  VKQIESKTAFQEALDAAGDKLVVVDFSATWCGPCKMIKPFYHSLSEKYSNVIFLEVDVDDCQDVASECEVKCMPTFQFFKKGQKVGEFSGANKEKLEATINELV (SEQ ID NO: 209)
M4  VKQIESKTAFQEALDAAGDKLVVVDFSATWCGPCKMIKPFFHSLSEKFGNMVIFLEVDVDDCQDVASECEVKCMPTFQFFKKGQKVGEFSGANKEKLEATINELV (SEQ ID NO: 210)
M5  VKQIESKTAFQEALDAAGDKLVVVDFSATWCGPCKMIKPFFHSLSEKYSNVIFLEVDVDDCQDVASECEVKCMPTFQYVGEPSGVNKEKLEATINELV (SEQ ID NO: 211)
M6  VKQIESKTAFQEALDAAGDKLVVVDFSATWCGPCKMIKPFFHSLSEKYSNVIFLEVDVDDCQDVASECEVKCMPTFQFFKKGQKVGEFSGANKEKLEATINELV (SEQ ID NO: 212)
M7  VKQIESKTAFQEALDAAGDKLVVVDFSATWCGPCKMIKPFFHSLSEKYSNVIFLEVDVDDCQDVASECEVKCMPTFQFYKREVGEFSGANKEKLEATINELV (SEQ ID NO: 213)
M8  VKQIESKTAFQEALDAAGDKLVVVDFSATWCGPCKMIKPFFHSLSEKYSNVIFLEVDVDDCQDVASECEVKCMPTFQFFKKGQKVGEFSGANKEKLEATINELC (SEQ ID NO: 214)

FIG. 15B

| Lane | Fragment | Lane | Fragment |
|---|---|---|---|
| 1 | TRX1-M1-F1 | 9 | TRX1-M5-F1 |
| 2 | TRX1-M1-F2 | 10 | TRX1-M5-F2 |
| 3 | TRX1-M2-F1 | 11 | TRX1-M6-F1 |
| 4 | TRX1-M2-F2 | 12 | TRX1-M6-F2 |
| 5 | TRX1-M3-F1 | 13 | TRX1-M7-F1 |
| 6 | TRX1-M3-F2 | 14 | TRX1-M7-F2 |
| 7 | TRX1-M4-F1 | 15 | TRX1-M8-F1 |
| 8 | TRX1-M4-F2 | 16 | TRX1-M8-F2 |

| Antibody | W | M1 | M2 | M3 | M4 | M5 | M6 | M7 | M8 | C |
|---|---|---|---|---|---|---|---|---|---|---|
| Ab1 hIgG1 | 2.5023 | 2.3086 | 2.3268 | 2.2046 | 0.4397 | 2.4078 | 2.1134 | 2.2253 | 2.2148 | 0.045 |
| Ab2 mIgG1 | 1.1369 | 0.0424 | 0.094 | 0.824 | 0.1915 | 0.4921 | 0.6594 | 0.7608 | 0.999 | 0.048 |

TRX N-His W(wild) & M(mutants) & C (asiatica TRX N-his)

FIG. 18C

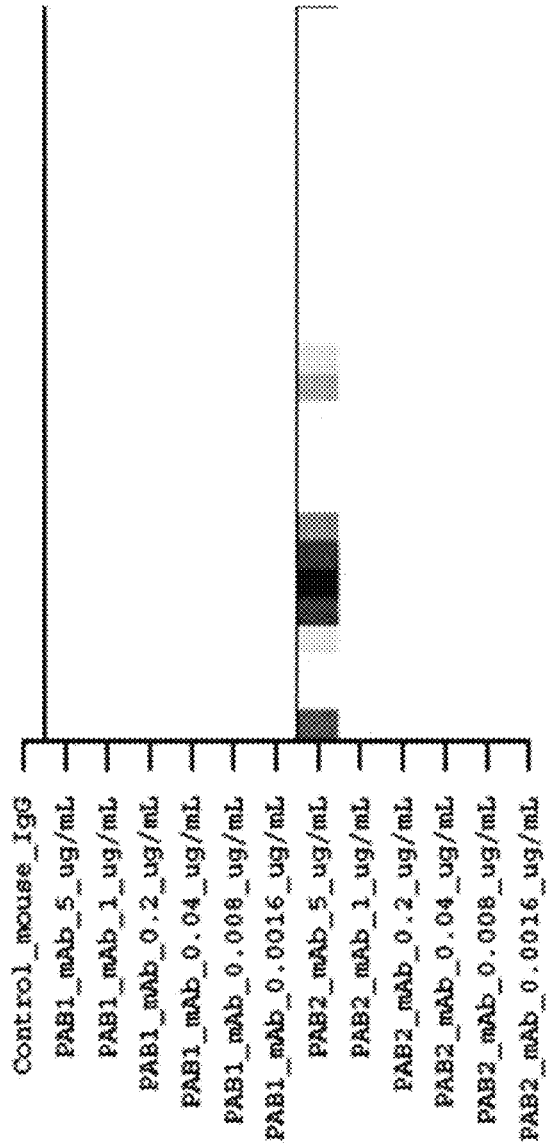

```
TAFQEALDAAGDKLV  - Peptide_026  (SEQ ID NO: 89)
AFQEALDAAGDKLVV  - Peptide_027  (SEQ ID NO: 90)
FQEALDAAGDKLVVV  - Peptide_028  (SEQ ID NO: 91)
QEALDAAGDKLVVVD  - Peptide_029  (SEQ ID NO: 92)
EALDAAGDKLVVVDF  - Peptide_030  (SEQ ID NO: 93)
ALDAAGDKLVVVDFS  - Peptide_031  (SEQ ID NO: 94)
LDAAGDKLVVVDFSA  - Peptide_032  (SEQ ID NO: 95)
DAAGDKLVVVDFSAT  - Peptide_033  (SEQ ID NO: 96)
AAGDKLVVVDFSATW  - Peptide_034  (SEQ ID NO: 97)
AGDKLVVVDFSATWC  - Peptide_035  (SEQ ID NO: 98)
GDKLVVVDFSATWCG  - Peptide_036  (SEQ ID NO: 99)
DKLVVVDFSATWCGP  - Peptide_037  (SEQ ID NO: 100)
KLVVVDFSATWCGPC  - Peptide_038  (SEQ ID NO: 101)
LVVVDFSATWCGPCK  - Peptide_039  (SEQ ID NO: 102)
VVVDFSATWCGPCKM  - Peptide_040  (SEQ ID NO: 103)
VVDFSATWCGPCKMI  - Peptide_041  (SEQ ID NO: 104)
VDFSATWCGPCKMIK  - Peptide_042  (SEQ ID NO: 105)
DFSATWCGPCKMIKP  - Peptide_043  (SEQ ID NO: 106)
FSATWCGPCKMIKPF  - Peptide_044  (SEQ ID NO: 107)
SATWCGPCKMIKPFF  - Peptide_045  (SEQ ID NO: 108)
ATWCGPCKMIKPFFH  - Peptide_046  (SEQ ID NO: 109)
TWCGPCKMIKPFFHS  - Peptide_047  (SEQ ID NO: 110)
WCGPCKMIKPFFHSL  - Peptide_048  (SEQ ID NO: 111)
CGPCKMIKPFFHSLG  - Peptide_049  (SEQ ID NO: 112)
GPCKMIKPFFHSLGE  - Peptide_050  (SEQ ID NO: 113)
PCKMIKPFFHSLGEK  - Peptide_051  (SEQ ID NO: 114)
```

FIG. 21B

```
                            SEQUENCE LISTING

Sequence total quantity: 215
SEQ ID NO: 1            moltype = AA  length = 11
FEATURE                 Location/Qualifiers
REGION                  1..11
                        note = B264 light chain CDR1
source                  1..11
                        mol_type = protein
                        organism = synthetic construct
SEQUENCE: 1
QSIVHSNGNT Y                                                                     11

SEQ ID NO: 2            moltype =   length =
SEQUENCE: 2
000

SEQ ID NO: 3            moltype = AA  length = 10
FEATURE                 Location/Qualifiers
REGION                  1..10
                        note = B264 light chain CDR3
source                  1..10
                        mol_type = protein
                        organism = synthetic construct
SEQUENCE: 3
CFQGSHVPYT                                                                       10

SEQ ID NO: 4            moltype = AA  length = 8
FEATURE                 Location/Qualifiers
REGION                  1..8
                        note = B264 heavy chain CDR1
source                  1..8
                        mol_type = protein
                        organism = synthetic construct
SEQUENCE: 4
GYTFTSYT                                                                         8

SEQ ID NO: 5            moltype = AA  length = 9
FEATURE                 Location/Qualifiers
REGION                  1..9
                        note = B264 heavy chain CDR2
source                  1..9
                        mol_type = protein
                        organism = synthetic construct
SEQUENCE: 5
INPTSDYTN                                                                        9

SEQ ID NO: 6            moltype = AA  length = 14
FEATURE                 Location/Qualifiers
REGION                  1..14
                        note = B264 heavy chain CDR3
source                  1..14
                        mol_type = protein
                        organism = synthetic construct
SEQUENCE: 6
FCASEGGFLY YFDY                                                                  14

SEQ ID NO: 7            moltype = AA  length = 5
FEATURE                 Location/Qualifiers
REGION                  1..5
                        note = B266-1 light chain CDR1
source                  1..5
                        mol_type = protein
                        organism = synthetic construct
SEQUENCE: 7
SRISY                                                                            5

SEQ ID NO: 8            moltype =   length =
SEQUENCE: 8
000
```

-continued

```
SEQ ID NO: 9                moltype = AA   length = 10
FEATURE                     Location/Qualifiers
REGION                      1..10
                            note = B266-1 light chain CDR3
source                      1..10
                            mol_type = protein
                            organism = synthetic construct
SEQUENCE: 9
CHQRSSYPTF                                                                      10

SEQ ID NO: 10               moltype = AA   length = 8
FEATURE                     Location/Qualifiers
REGION                      1..8
                            note = B266-1 heavy chain CDR1
source                      1..8
                            mol_type = protein
                            organism = synthetic construct
SEQUENCE: 10
GFNIKDTF                                                                        8

SEQ ID NO: 11               moltype = AA   length = 8
FEATURE                     Location/Qualifiers
REGION                      1..8
                            note = B266-1 heavy chain CDR2
source                      1..8
                            mol_type = protein
                            organism = synthetic construct
SEQUENCE: 11
IDPANGNT                                                                        8

SEQ ID NO: 12               moltype = AA   length = 11
FEATURE                     Location/Qualifiers
REGION                      1..11
                            note = B266-1 heavy chain CDR3
source                      1..11
                            mol_type = protein
                            organism = synthetic construct
SEQUENCE: 12
CALLQYSAMD Y                                                                    11

SEQ ID NO: 13               moltype = AA   length = 112
FEATURE                     Location/Qualifiers
REGION                      1..112
                            note = B264 light chain variable region
source                      1..112
                            mol_type = protein
                            organism = synthetic construct
SEQUENCE: 13
DVLMTQTPLS LPVSLGDQAS ISCRSSQSIV HSNGNTYLEW YLQKPGQSPK LLIYKVSNRF               60
SGVPDRFSGS GSGTDFTLKI SRVEAEDLGV YYCFQGSHVP YTFGGGTKLE IK                       112

SEQ ID NO: 14               moltype = AA   length = 119
FEATURE                     Location/Qualifiers
REGION                      1..119
                            note = B264 heavy chain variable region
source                      1..119
                            mol_type = protein
                            organism = synthetic construct
SEQUENCE: 14
QVQLQQSGAE LARPGASVKM SCKASGYTFT SYTMHWVKQR PGQGLEWIGY INPTSDYTNY               60
NQKFKDKATL TADKSSSTAY MQLSSLTSED SAVYFCASEG GFLYYFDYWG QGTTLTVSS                119

SEQ ID NO: 15               moltype = AA   length = 105
FEATURE                     Location/Qualifiers
REGION                      1..105
                            note = B266-1 light chain variable region
source                      1..105
                            mol_type = protein
                            organism = synthetic construct
SEQUENCE: 15
QIVLTQSPAI MSASPGEKVT MTCSASSRIS YMYWYQQKPG TSPKRWIYDT SKLASGVPAR               60
FSGSGSGTSY SLTISTMEAE DAATYYCHQR SSYPTFGAGT KLELK                               105

SEQ ID NO: 16               moltype = AA   length = 117
FEATURE                     Location/Qualifiers
REGION                      1..117
                            note = B266-1 heavy chain variable region
source                      1..117
```

```
                                    mol_type = protein
                                    organism = synthetic construct
SEQUENCE: 16
EVQLQQSGAE LVKPGASVKL SCTASGFNIK DTFMHWVKQR PEQGLEWIGR IDPANGNTKY        60
DPKFQGKATI TADTSSNTAY LQLSSLTSED TAVYYCALLQ YSAMDYWGQG TSVTVSS          117

SEQ ID NO: 17                       moltype = AA   length = 219
FEATURE                             Location/Qualifiers
REGION                              1..219
                                    note = B264 light chain
source                              1..219
                                    mol_type = protein
                                    organism = synthetic construct
SEQUENCE: 17
DVLMTQTPLS LPVSLGDQAS ISCRSSQSIV HSNGNTYLEW YLQKPGQSPK LLIYKVSNRF        60
SGVPDRFSGS GSGTDFTLKI SRVEAEDLGV YYCFQGSHVP YTFGGGTKLE IKRADAAPTV       120
SIFPPSSEQL TSGGASVVCF LNNFYPKDIN VKWKIDGSER QNGVLNSWTD QDSKDSTYSM       180
SSTLTLTKDE YERHNSYTCE ATHKTSTSPI VKSFNRNEC                             219

SEQ ID NO: 18                       moltype = AA   length = 443
FEATURE                             Location/Qualifiers
REGION                              1..443
                                    note = B264 heavy chain
source                              1..443
                                    mol_type = protein
                                    organism = synthetic construct
SEQUENCE: 18
QVQLQQSGAE LARPGASVKM SCKASGYTFT SYTMHWVKQR PGQGLEWIGY INPTSDYTNY        60
NQKFKDKATL TADKSSSTAY MQLSSLTSED SAVYFCASEG GFLYYFDYWG QGTTLTVSSA       120
STTPPSVYPL APGSAAQTNS MVTLGCLVKG YFPEPVTVTW NSGSLSSGVH TFPAVLQSDL       180
YTLSSSVTVP SSTWPSETVT CNVAHPASST KVDKKIVPRD CGCKPCICTV PEVSSVFIFP       240
PKPKDVLTIT LTPKVTCVVV DISKDDPEVQ FSWFVDDVEV HTAQTQPREE QFNSTFRSVS       300
ELPIMHQDWL NGKEFKCRVN SAAFPAPIEK TISKTKGRPK APQVYTIPPP KEQMAKDKVS       360
LTCMITDFFP EDITVEWQWN GQPAENYKNT QPIMDTDGSY FVYSKLNVQK SNWEAGNTFT       420
CSVLHEGLHN HHTEKSLSHS PGK                                              443

SEQ ID NO: 19                       moltype = AA   length = 212
FEATURE                             Location/Qualifiers
REGION                              1..212
                                    note = B266 light chain
source                              1..212
                                    mol_type = protein
                                    organism = synthetic construct
SEQUENCE: 19
QIVLTQSPAI MSASPGEKVT MTCSASSRIS YMYWYQQKPG TSPKRWIYDT SKLASGVPAR        60
FSGSGSGTSY SLTISTMEAE DAATYYCHQR SSYPTFGAGT KLELKRADAA PTVSIFPPSS       120
EQLTSGGASV VCFLNNFYPK DINVKWKIDG SERQNGVLNS WTDQDSKDST YSMSSTLTLT       180
KDEYERHNSY TCEATHKTST SPIVKSFNRN EC                                    212

SEQ ID NO: 20                       moltype = AA   length = 452
FEATURE                             Location/Qualifiers
REGION                              1..452
                                    note = B266 heavy chain
source                              1..452
                                    mol_type = protein
                                    organism = synthetic construct
SEQUENCE: 20
EVQLQQSGAE LVKPGASVKL SCTASGFNIK DTFMHWVKQR PEQGLEWIGR IDPANGNTKY        60
DPKFQGKATI TADTSSNTAY LQLSSLTSED TAVYYCALLQ YSAMDYWGQG TSVTVSSAKT       120
TPPSVYPLAP GCGDTTGSSV TLGCLVKGYF PESVTVTWNS GSLSSSVHTF PALLQSGLYT       180
MSSSVTVPSS TWPSQTVTCS VAHPASSTTV DKKLEPSGPI STINPCPPCK ECHKCPAPNL       240
EGGPSVFIFP PNIKDVLMIS LTPKVTCVVV DVSEDDPDVQ ISWFVNNVEV HTAQTQTHRE       300
DYNSTIRVVS TLPIQHQDWM SGKEFKCKVN NKDLPSPIER TISKIKGLVR APQVYILPPP       360
AEQLSRKDVS LTCLVVGFNP GDISVEWTSN GHTEENYKDT APVLDSDGSY FIYSKLNMKT       420
SKWEKTDSFS CNVRHEGLKN YYLKKTISRS PG                                    452

SEQ ID NO: 21                       moltype = DNA   length = 660
FEATURE                             Location/Qualifiers
misc_feature                        1..660
                                    note = B264 light chain
source                              1..660
                                    mol_type = other DNA
                                    organism = synthetic construct
SEQUENCE: 21
gacgtgctga tgacacagac accactcagc ctccctgtga gcctgggcga ccaggcctct        60
atttcttgcc ggtctagcca gagcatcgtg cactccaacg gcaacacata cttggagtgg       120
tatctacaga agcccggcca gtcccctaag ctgctgatat acaaggtgtc taaccgcttc       180
tccggcgtgc cgacaggttc tctggcagc ggctctggca ccgacttcac cctcaaaata       240
tctagggtgg aggccgagga cctgggcgtg tactactgct tccagggctc ccacgttcca       300
```

```
tacacattcg gcggcggcac aaagttggaa attaagcgcg ctgacgcagc cccaacagtg   360
agcatctttc ctccatcctc tgaacaactt acctctggag gagcctctgt ggtgtgtttc   420
ctgaacaact tctacccaaa ggacatcaat gtgaagtgga agattgatgg ctctgagaga   480
cagaatggag tgctgaactc ctggacagac caggacagca aggacagcac ctacagtatg   540
agtagcaccc tgaccctgac caaggatgaa tatgagagac aaactcctac acttgtgag    600
gctacccaca agaccagcac cagcccaatt gtcaaatcct tcaacaggaa tgagtgttaa   660
```

```
SEQ ID NO: 22          moltype = DNA   length = 1332
FEATURE                Location/Qualifiers
misc_feature           1..1332
                       note = B264 heavy chain
source                 1..1332
                       mol_type = other DNA
                       organism = synthetic construct
SEQUENCE: 22
caggtgcagc tccagcagtc cggcgccgaa ctggccagac tggcgccag cgtgaagatg     60
agctgcaagg cctccggcta cacattcaca tcttacacca tgcactgggt gaagcagaga   120
cccggccagg gcctggagtg gattggctac attaacccaa catccgacta cacaaactac   180
aaccagaagt tcaaggacaa ggccacactc accgccgaca agtcttctag cacagcctac   240
atgcagctgt ctagcctgac aagcgaggac tctgccgtgt acttctgcgc ctctgagggc   300
ggcttcctgt actacttcga ctactgggc cagggcacca cctgaccgt gtcctctgcc    360
aaaacgacac cccatctgt ctatccactg gcccctgact ctgctgccca aactaactcc   420
atggtgaccc tgggatgcct ggtcaagggc tatttccctg agccagtgac agtgacctgg   480
aactctggat ccctgtccag cggtgtgcac accttccag ctgtcctgca gtctgacctc    540
tacactctga gcagctcagt gactgtcccc tccagcacct ggcccagcga ccgtcacc     600
tgcaacgttg cccaccggc cagcagcacc aaggtggaca agaaaattgt gcccagggat   660
tgtggttgta agccttgcat atgtacagtc ccagaagtac atctgtctt catcttcccc    720
ccaaagccca aggatgtgct caccattact ctgactccta aggtcacgtg tgttgtggta   780
gacatcagca aggatgatcc cgaggtccag ttcagctggt tgtagatga tgtggaggtg   840
cacacagctc agacgcaacc ccgggaggag cagttcaaca gcactttccg ctcagtcagt   900
gaacttccca tcatgcacca ggactggctc aatggcaagg agttcaaatg cagggtcaac   960
agtgcagctt ccctgcccc catcgagaaa accatctcca aaaccaaagg cagaccgaag   1020
gctccacagg tgtacaccat tccacctccc aaggagcaga tggccaagga taaagtcagt   1080
ctgacctgca tgataacaga cttcttccct gaagacatta ctgtggagtg gcagtggaat   1140
gggcagccag cggagaacta caagaacact cagcccatca tggacacaga tggctcttac    1200
ttcgtctaca gcaagctcaa tgtgcagaag agcaactggg aggcaggaaa tacttcaccc   1260
tgctctgtgt tacatgaggg cctgcacaac caccatactg agaagagcct ctcccactct   1320
cctggtaaat aa                                                       1332
```

```
SEQ ID NO: 23          moltype = DNA   length = 639
FEATURE                Location/Qualifiers
misc_feature           1..639
                       note = B266 light chain
source                 1..639
                       mol_type = other DNA
                       organism = synthetic construct
SEQUENCE: 23
cagatcgtgc tcacacagtc tccagccatc atgagcgcct ctcctggcga aaaggtgaca    60
atgacctgct ctgcctctag ccgcatttct tacatgtact ggtatcagca gaagccaggc   120
acctccccta gaggtggat atacgacaca tccaagctgg cctccggcgt gcccgcccgg    180
ttcagcggct ctggcagcgg cacaagctac tccctgacaa ttagcacgat ggaggccgaa   240
gacgccgcca catactactg ccaccagcgc tcgtcctacc caacattcgg cgccggcaca   300
aaattggaac tgaagagagc tgacgcagcc caacagtga gcatctttcc tccatcctct   360
gaacaactta cctctggagg agcctctgtg gtgtgtttcc tgaacaactt ctacccaaag    420
gacatcaatg tgaagtggaa gattgatggc tctgagagac agaatggagt gctgaactcc   480
tggacagacc aggacagcaa ggacagcacc tacagtatga gtagcaccct gaccctgacc   540
aaggatgaat atgagagaca aactcctac acttgtgagg ctacccacaa gaccagcacc    600
agcccaattg tcaaatcctt caacaggaat gagtgttaa                         639
```

```
SEQ ID NO: 24          moltype = DNA   length = 1359
FEATURE                Location/Qualifiers
misc_feature           1..1359
                       note = B266 heavy chain
source                 1..1359
                       mol_type = other DNA
                       organism = synthetic construct
SEQUENCE: 24
gaggtgcagt tacaacagtc cggcgccgag ctagtgaagc aggcgccag cgtgaagctg     60
tcttgcacag ccagcggctt caacattaag gacaccttca tgcactgggt gaagcagaga   120
cctgagcagg gcttagagtg gattggccgg atcgaccccg ccaacggcaa cacaaagtac   180
gacccaaagt tccagggcaa ggccacaatt accgccgaca catctccaa cacagcctac   240
ctccagctgt cgtctctcac cagcgaggac accgccgtgt actactgcgc cctgctccag   300
tactccgcga tggactactg gggccagggc acatctgtga ccgtgtctag cgccaagacc   360
accccaccat ccgtgtaccc actcgcccca gctccggcg acaccagg ctctagcgtg      420
acactgggct gcctggtgaa gggctacttc cccgagtctg tgacagtgac ctggaactct   480
ggctctctgt ctagctctgt gcacaccttc cccgcctgc tgcaatcgg cctgtacaca    540
atgtcttctc ctgtgacagt gcctagctct acatggccat ctcagacagt gacatgtctc   600
gtggcccacc ccgcctctag cacaaccgtg gacaagaagc tggagccatc cggcccatt   660
tctacaatta ccccttgccc tccttgcaaa gaatgccaca gtgccccgc cccaaacctg    720
```

```
gagggcggcc cttctgtgtt catttcccct cctaacatta aggacgtgct gatgatcagc    780
ctcaccccaa aggtgacatg cgtggtggtg gacgtgtccg aggacgaccc tgacgtgcag    840
atttcttggt tcgtgaacaa cgtggaggtg cacaccgccc agacccagac ccaccgggag    900
gactacaact ccaccattcg ggtggtgtct acactgccta ttcagcacca ggactggatg    960
agcggcaaag agttcaagtg caaggtgaac aacaaggact gccatctcc tattgagaga    1020
acaatttcta agattaaggg cctggtgcgc gcccctcagg tgtacattct gcctcctccc    1080
gccgagcagc tgagccggaa ggacgtgtcc ctcacatgcc tcgtggtggg cttcaaccct    1140
ggcgacatta gcgtggagtg gacatctaac ggccacacag aagaaaacta caaggacaca    1200
gcccctgtgc tcgactccga cggctcttac ttcatatact ctaagctgaa catgaaaaca    1260
tctaagtggg aaaagaccga ctctttctct tgcaacgtgc ggcacgaggg cctgaagaac    1320
tactacctca agaaaaccat tagcagaagt ccaggctaa                          1359

SEQ ID NO: 25           moltype = AA  length = 211
FEATURE                 Location/Qualifiers
REGION                  1..211
                        note = B266-1 light chain
source                  1..211
                        mol_type = protein
                        organism = synthetic construct
SEQUENCE: 25
QIVLTQSPAI MSASPGEKVT MTCSASSRIS YMYWYQQKPG TSPKRWIYDT SKLASGVPAR     60
FSGSGSGTSY SLTISTMEAE DAATYYCHQR SSYPTFGAGT KLELKSVAAP SVFIFPPSDE    120
QLKSGTASVV CLLNNFYPRE AKVQWKVDNA LQSGNSQESV TEQDSKDSTY SLSSTLTLSK    180
ADYEKHKVYA CEVTHQGLSS PVTKSFNRGE C                                   211

SEQ ID NO: 26           moltype = AA  length = 447
FEATURE                 Location/Qualifiers
REGION                  1..447
                        note = B266-1 heavy chain
source                  1..447
                        mol_type = protein
                        organism = synthetic construct
SEQUENCE: 26
EVQLQQSGAE LVKPGASVKL SCTASGFNIK DTFMHWVKQR PEQGLEWIGR IDPANGNTKY     60
DPKFQGKATI TADTSSNTAY LQLSSLTSED TAVYYCALLQ YSAMDYWGQG TSVTVSSAST    120
KGPSVFPLAP SSKSTSGGTA ALGCLVKDYF PEPVTVSWNS GALTSGVHTF PAVLQSSGLY    180
SLSSVVTVPS SSLGTQTYIC NVNHKPSNTK VDKKVEPKSC DKTHTCPPCP APELLGGPSV    240
FLFPPKPKDT LMISRTPEVT CVVVDVSHED PEVKFNWYVD GVEVHNAKTK PREEQYNSTY    300
RVVSVLTVLH QDWLNGKEYK CKVSNKALPA PIEKTISKAK GQPREPQVYT LPPSREEMTK    360
NQVSLTCLVK GFYPSDIAVE WESNGQPENN YKTTPPVLDS DGSFFLYSKL TVDKSRWQQG    420
NVFSCSVMHE ALHNHYTQKS LSLSPGK                                        447

SEQ ID NO: 27           moltype = DNA  length = 633
FEATURE                 Location/Qualifiers
misc_feature            1..633
                        note = B266-1 light chain
source                  1..633
                        mol_type = other DNA
                        organism = synthetic construct
SEQUENCE: 27
cagatcgtgc tcacacagtc tccagccatc atgagcgcct ctcctggcga gaaggtgaca     60
atgacctgct ctgcctctag ccgcatttct tacatgtact ggtatcagca gaagccaggc    120
acctccccta gaggtggat atacgacaca tccaagctgg cctccggcgt gccgccgg      180
ttcagcggct ctggcagcgg cacaagctac tccctgacaa ttagcacgat ggaggccgag    240
gacgccgcca catactactg ccaccagcgc tcgtcctacc caacattcgg cgccggcaca    300
aaattggaac tgaaggtggc tgcaccatct gtcttcatct tcccgccatc tgatgagcag    360
ttgaaatctg gaactgcctc tgttgtgtgc ctgctgaata acttctatcc cagagaggcc    420
aaagtacagt ggaaggtgga taacgcccct caatcgggta actcccagga gagtgtcaca    480
gagcaggaca gcaaggacag cacctacagc ctcagcagca cctgacgct gagcaaagca    540
gactacgaga aacacaaagt ctacgcctgc gaagtcaccc atcagggcct gagctcgccc    600
gtcacaaaga gcttcaacag gggagagtgt tag                                633

SEQ ID NO: 28           moltype = DNA  length = 1337
FEATURE                 Location/Qualifiers
misc_feature            1..1337
                        note = B266-1 heavy chain
source                  1..1337
                        mol_type = other DNA
                        organism = synthetic construct
SEQUENCE: 28
gaggtgcagt tacaacagtc cggcgccgag ctagtgaagc caggcgccag cgtgaagctg     60
tcttgcacac ccagcggctt caacattaag gacaccttca tgcactgggt gaagcagaga    120
cctgagcagg gcttagagtg gattggccgg atcgaccccg ccaacggcaa cacaaagtac    180
gacccaaagt tccagggcaa ggccacaatt accgccacca tcttccaa cacagccagt    240
ctccagctgt cgtctctcac cagcgaggac accgccgtgt actactgcgc cctgctccag    300
tactccgcga tggactactg gggccagggc acatctgtga ccgtgtctag ccaaggggcc    360
catcggtctt cccctggca ccctcctcca gagcacctc tggggcaca gcggccctgg    420
gctgcctggt caaggactac ttccccgaac cggtgacggt gtcgtggaac tcaggcgccc    480
tgaccagcgg cgtgcacacc ttcccggctg tcctacagtc ctcaggactc tactccctca    540
```

```
gcagcgtggt gaccgtgccc tccagcagct tgggcaccca gacctacatc tgcaacgtga    600
atcacaagcc cagcaacacc aaggtggaca gaaagttga gcccaaatct tgtgacaaaa    660
ctcacacatg cccaccgtgc ccagcacctg aactcctggg gggaccgtca gtcttcctct    720
ttccccccaaa acccaaggac accctcatga tctcccggac ccctgaggtc acatgcgtgg    780
tggtggacgt gagccacgaa gaccctgagg tcaagttcaa ctggtacgtg gacggcgtgg    840
aggtgcataa tgccaagaca aagccgcggg aggagcagta caacagcacg taccgtgtgt    900
tcagcgtcct caccgtcctg caccaggact ggctgaatgg caaggagtac aagtgcaagg    960
tctccaacaa agccctccca gcccccatcg agaaaaccat ctccaaagcc aaagggcagc   1020
cccgagaacc acaggtgtac accctgcccc catcccggga ggagatgacc aagaaccagg   1080
tcagcctgac ctgcctggtc aaaggcttct atcccagcga catcgccgtg gagtgggaga   1140
gcaatgggca gccggagaac aactacaaga ccacgcctcc cgtgctggac tccgacggct   1200
ccttcttcct ctacagcaag ctcaccgtgg acaagagcag gtggcagcag gggaacgtct   1260
tctcatgctc cgtgatgcat gaggctctgc acaaccacta cacgcagaag agcctctccc   1320
tgtctccggg taaatga                                                   1337

SEQ ID NO: 29           moltype = DNA  length = 315
FEATURE                 Location/Qualifiers
misc_feature            1..315
                        note = Trx1 gene
source                  1..315
                        mol_type = other DNA
                        organism = synthetic construct
SEQUENCE: 29
atggtcaaac agatcgaatc aaaaaccgca tttcaagaag ccctggacgc cgctggtgac     60
aaactggtcg tggtggactt tagtgctacc tggtgcggcc cgtgtaaaat gattaaaccg    120
tttttccata gcctgtctga aaaatacagt aacgttatct ttctggaagt ggatgttgat    180
gactgccagg acgtgcgcag cgaatgcgaa gtgaaatgta tgccgacgtt ccagttttc    240
aaaaaaggtc aaaagtcgg tgaatttagc ggtgccaaca aagaaaaact ggaagccacg    300
attaacgaac tggtg                                                    315

SEQ ID NO: 30           moltype = DNA  length = 22
FEATURE                 Location/Qualifiers
misc_feature            1..22
                        note = hTrx1-For primer
source                  1..22
                        mol_type = other DNA
                        organism = synthetic construct
SEQUENCE: 30
taatggtcaa acagatcgaa tc                                              22

SEQ ID NO: 31           moltype = DNA  length = 31
FEATURE                 Location/Qualifiers
misc_feature            1..31
                        note = hTrx1-Rev primer
source                  1..31
                        mol_type = other DNA
                        organism = synthetic construct
SEQUENCE: 31
caccagttcg ttaatcgtgg taatgaaagc t                                    31

SEQ ID NO: 32           moltype = AA   length = 7
FEATURE                 Location/Qualifiers
REGION                  1..7
                        note = hTrx1 M1
source                  1..7
                        mol_type = protein
                        organism = synthetic construct
SEQUENCE: 32
QIEGSTA                                                                7

SEQ ID NO: 33           moltype = AA   length = 6
FEATURE                 Location/Qualifiers
REGION                  1..6
                        note = hTrx1 M2
source                  1..6
                        mol_type = protein
                        organism = synthetic construct
SEQUENCE: 33
QEALDA                                                                 6

SEQ ID NO: 34           moltype = AA   length = 5
FEATURE                 Location/Qualifiers
REGION                  1..5
                        note = hTrx1 M4
source                  1..5
                        mol_type = protein
                        organism = synthetic construct
SEQUENCE: 34
YSNVI                                                                  5
```

```
SEQ ID NO: 35              moltype = DNA   length = 21
FEATURE                    Location/Qualifiers
misc_feature               1..21
                           note = hTrx1 M1
source                     1..21
                           mol_type = other DNA
                           organism = synthetic construct
SEQUENCE: 35
cagatcgaat caaaaaccgc a                                              21

SEQ ID NO: 36              moltype = DNA   length = 18
FEATURE                    Location/Qualifiers
misc_feature               1..18
                           note = hTrx1 M2
source                     1..18
                           mol_type = other DNA
                           organism = synthetic construct
SEQUENCE: 36
caagaagccc tggacgcc                                                  18

SEQ ID NO: 37              moltype = DNA   length = 15
FEATURE                    Location/Qualifiers
misc_feature               1..15
                           note = hTrx1 M4
source                     1..15
                           mol_type = other DNA
                           organism = synthetic construct
SEQUENCE: 37
tacagtaacg ttatc                                                     15

SEQ ID NO: 38              moltype = DNA   length = 312
FEATURE                    Location/Qualifiers
misc_feature               1..312
                           note = TRX-N-His-M1
source                     1..312
                           mol_type = other DNA
                           organism = synthetic construct
SEQUENCE: 38
gtcaaagaga tcgaaggcaa agaagatttt caagaagccc tggacgccgc tggtgacaaa    60
ctggtcgtgg tggactttag tgctacctgg tgcggcccgt gtaaaatgat taaaccgttt   120
ttccatagcc tgtctgaaaa atacagtaac gttatctttc tggaagtgga tgttgatgac   180
tgccaggacg tcgcgagcga atgcgaagtg aaatgtatgc cgacgttcca gttttttcaaa  240
aaaggtcaaa aagtcggtga atttagcggt gccaacaaag aaaaactgga agccacgatt   300
aacgaactgg tg                                                       312

SEQ ID NO: 39              moltype = DNA   length = 312
FEATURE                    Location/Qualifiers
misc_feature               1..312
                           note = TRX-N-His-M2
source                     1..312
                           mol_type = other DNA
                           organism = synthetic construct
SEQUENCE: 39
gtcaaacaga tcgaatcaaa aaccgcattt catgctgccc tgagcagtgc tggtgacaaa    60
ctggtcgtgg tggactttag tgctacctgg tgcggcccgt gtaaaatgat taaaccgttt   120
ttccatagcc tgtctgaaaa atacagtaac gttatctttc tggaagtgga tgttgatgac   180
tgccaggacg tcgcgagcga atgcgaagtg aaatgtatgc cgacgttcca gttttttcaaa  240
aaaggtcaaa aagtcggtga atttagcggt gccaacaaag aaaaactgga agccacgatt   300
aacgaactgg tg                                                       312

SEQ ID NO: 40              moltype = DNA   length = 312
FEATURE                    Location/Qualifiers
misc_feature               1..312
                           note = TRX-N-His-M3
source                     1..312
                           mol_type = other DNA
                           organism = synthetic construct
SEQUENCE: 40
gtcaaacaga tcgaatcaaa aaccgcattt caagaagccc tggacgccgc tggtgacaaa    60
ctggtcgtgg tggactttag tgctacctgg tgcggcccgt gtaaaatgat taaaccgttt   120
tatcatagcc tgtctgaaaa atacagtaac gttatctttc tggaagtgga tgttgatgac   180
tgccaggacg tcgcgagcga atgcgaagtg aaatgtatgc cgacgttcca gttttttcaaa  240
aaaggtcaaa aagtcggtga atttagcggt gccaacaaag aaaaactgga agccacgatt   300
aacgaactgg tg                                                       312

SEQ ID NO: 41              moltype = DNA   length = 312
FEATURE                    Location/Qualifiers
misc_feature               1..312
```

```
                         note = TRX-N-His-M4
source                   1..312
                         mol_type = other DNA
                         organism = synthetic construct
SEQUENCE: 41
gtcaaacaga tcgaatcaaa aaccgcattt caagaagccc tggacgccgc tggtgacaaa    60
ctggtcgtgg tggactttag tgctacctgg tgcggcccgt gtaaaatgat taaaccgttt   120
ttccatagcc tgtctgaaaa atttggcaac atggtgttcc tggaagtgga tgttgatgac   180
tgccaggacg tcgcgagcga atgcgaagtg aaatgtatgc cgacgttcca gttttttcaaa  240
aaaggtcaaa aagtcggtga atttagcggt gccaacaaag aaaaactgga agccacgatt   300
aacgaactgg tg                                                       312

SEQ ID NO: 42            moltype = DNA  length = 312
FEATURE                  Location/Qualifiers
misc_feature             1..312
                         note = TRX-N-His-M5
source                   1..312
                         mol_type = other DNA
                         organism = synthetic construct
SEQUENCE: 42
gtcaaacaga tcgaatcaaa aaccgcattt caagaagccc tggacgccgc tggtgacaaa    60
ctggtcgtgg tggactttag tgctacctgg tgcggcccgt gtaaaatgat taaaccgttt   120
ttccatagcc tgtctgaaaa atacagtaac gttatctttc tggaagtgga tgttgatgac   180
tgccaggacg tcgcgagcga atgcgaagtg aaatgtatga taacgttcca gttttttcaaa  240
aaaggtcaaa aagtcggtga atttagcggt gccaacaaag aaaaactgga agccacgatt   300
aacgaactgg tg                                                       312

SEQ ID NO: 43            moltype = DNA  length = 312
FEATURE                  Location/Qualifiers
misc_feature             1..312
                         note = TRX-N-His-M6
source                   1..312
                         mol_type = other DNA
                         organism = synthetic construct
SEQUENCE: 43
gtcaaacaga tcgaatcaaa aaccgcattt caagaagccc tggacgccgc tggtgacaaa    60
ctggtcgtgg tggactttag tgctacctgg tgcggcccgt gtaaaatgat taaaccgttt   120
ttccatagcc tgtctgaaaa atacagtaac gttatctttc tggaagtgga tgttgatgac   180
tgccaggacg tcgcgagcga atgcgaagtg aaatgtatgc cgacgttcca gttttataaa   240
aaaagggaaa aagtcggtga atttagcggt gccaacaaag aaaaactgga agccacgatt   300
aacgaactgg tg                                                       312

SEQ ID NO: 44            moltype = DNA  length = 312
FEATURE                  Location/Qualifiers
misc_feature             1..312
                         note = TRX-N-His-M7
source                   1..312
                         mol_type = other DNA
                         organism = synthetic construct
SEQUENCE: 44
gtcaaacaga tcgaatcaaa aaccgcattt caagaagccc tggacgccgc tggtgacaaa    60
ctggtcgtgg tggactttag tgctacctgg tgcggcccgt gtaaaatgat taaaccgttt   120
ttccatagcc tgtctgaaaa atacagtaac gttatctttc tggaagtgga tgttgatgac   180
tgccaggacg tcgcgagcga atgcgaagtg aaatgtatgc cgacgttcca gttttttcaaa  240
aaaggtcaaa aagtcggtga atttagcggt gttaacaaag aaaaactgga agccacgatt   300
aacgaactgg tg                                                       312

SEQ ID NO: 45            moltype = DNA  length = 312
FEATURE                  Location/Qualifiers
misc_feature             1..312
                         note = TRX-N-His-M8
source                   1..312
                         mol_type = other DNA
                         organism = synthetic construct
SEQUENCE: 45
gtcaaacaga tcgaatcaaa aaccgcattt caagaagccc tggacgccgc tggtgacaaa    60
ctggtcgtgg tggactttag tgctacctgg tgcggcccgt gtaaaatgat taaaccgttt   120
ttccatagcc tgtctgaaaa atacagtaac gttatctttc tggaagtgga tgttgatgac   180
tgccaggacg tcgcgagcga atgcgaagtg aaatgtatgc cgacgttcca gttttttcaaa  240
aaaggtcaaa aagtcggtga atttagcggt gccaacaaag aaaaactgga agccatcatt   300
aacgaactgt gt                                                       312

SEQ ID NO: 46            moltype = DNA  length = 19
FEATURE                  Location/Qualifiers
misc_feature             1..19
                         note = Vector-F primer
source                   1..19
                         mol_type = other DNA
                         organism = synthetic construct
```

```
SEQUENCE: 46
ggcgtgtacg gtgggaggt                                                  19

SEQ ID NO: 47         moltype = DNA  length = 20
FEATURE               Location/Qualifiers
misc_feature          1..20
                      note = Vector-R primer
source                1..20
                      mol_type = other DNA
                      organism = synthetic construct
SEQUENCE: 47
agcagcgtat ccacatagcg                                                 20

SEQ ID NO: 48         moltype = DNA  length = 57
FEATURE               Location/Qualifiers
misc_feature          1..57
                      note = TRX M1-F primer
source                1..57
                      mol_type = other DNA
                      organism = synthetic construct
SEQUENCE: 48
catcacgtca aagagatcga aggcaaagaa gattttcaag aagccctgga cgccgct        57

SEQ ID NO: 49         moltype = DNA  length = 58
FEATURE               Location/Qualifiers
misc_feature          1..58
                      note = TRX M1-R primer
source                1..58
                      mol_type = other DNA
                      organism = synthetic construct
SEQUENCE: 49
ggcttcttga aaatcttctt tgccttcgat ctctttgacg tgatgatgat gatgatga       58

SEQ ID NO: 50         moltype = DNA  length = 52
FEATURE               Location/Qualifiers
misc_feature          1..52
                      note = TRX M2-F primer
source                1..52
                      mol_type = other DNA
                      organism = synthetic construct
SEQUENCE: 50
aaaaccgcat ttcatgctgc cctgagcagt gctggtgaca aactggtcgt gg             52

SEQ ID NO: 51         moltype = DNA  length = 54
FEATURE               Location/Qualifiers
misc_feature          1..54
                      note = TRX M2-R primer
source                1..54
                      mol_type = other DNA
                      organism = synthetic construct
SEQUENCE: 51
tttgtcacca gcactgctca gggcagcatg aaatgcggtt tttgattcga tctg           54

SEQ ID NO: 52         moltype = DNA  length = 58
FEATURE               Location/Qualifiers
misc_feature          1..58
                      note = TRX-M3-OV-F primer
source                1..58
                      mol_type = other DNA
                      organism = synthetic construct
SEQUENCE: 52
attaaaccgt tttatcatag cctgtctgaa aaatacagta acgttatctt tctggaag       58

SEQ ID NO: 53         moltype = DNA  length = 50
FEATURE               Location/Qualifiers
misc_feature          1..50
                      note = TRX-M3-OV-R primer
source                1..50
                      mol_type = other DNA
                      organism = synthetic construct
SEQUENCE: 53
agacaggcta tgataaaacg gtttaatcat tttacacggg ccgcaccagg                50

SEQ ID NO: 54         moltype = DNA  length = 65
FEATURE               Location/Qualifiers
misc_feature          1..65
                      note = TRX-M4-OV-F primer
source                1..65
                      mol_type = other DNA
```

```
                                organism = synthetic construct
SEQUENCE: 54
ctgtctgaaa aatttggcaa catggtgttc ctggaagtgg atgttgatga ctgccaggac    60
gtcgc                                                                65

SEQ ID NO: 55           moltype = DNA   length = 73
FEATURE                 Location/Qualifiers
misc_feature            1..73
                        note = TRX-M4-OV-R primer
source                  1..73
                        mol_type = other DNA
                        organism = synthetic construct
SEQUENCE: 55
atccacttcc aggaacacca tgttgccaaa tttttcagac aggctatgga aaaacggttt    60
aatcatttta cac                                                       73

SEQ ID NO: 56           moltype = DNA   length = 55
FEATURE                 Location/Qualifiers
misc_feature            1..55
                        note = TRX-M5-OV-F primer
source                  1..55
                        mol_type = other DNA
                        organism = synthetic construct
SEQUENCE: 56
gtgaaatgta tgataacgtt ccagtttttc aaaaaaggtc aaaaagtcgg tgaat          55

SEQ ID NO: 57           moltype = DNA   length = 49
FEATURE                 Location/Qualifiers
misc_feature            1..49
                        note = TRX-M5-OV-R primer
source                  1..49
                        mol_type = other DNA
                        organism = synthetic construct
SEQUENCE: 57
aaactggaac gttatcatac atttcacttc gcattcgctc gcgacgtcc                 49

SEQ ID NO: 58           moltype = DNA   length = 65
FEATURE                 Location/Qualifiers
misc_feature            1..65
                        note = TRX-M6-OV-F primer
source                  1..65
                        mol_type = other DNA
                        organism = synthetic construct
SEQUENCE: 58
acgttccagt tttataaaaa aagggaaaaa gtcggtgaat ttagcggtgc aacaaagaa     60
aaact                                                                65

SEQ ID NO: 59           moltype = DNA   length = 64
FEATURE                 Location/Qualifiers
misc_feature            1..64
                        note = TRX-M6-OV-R primer
source                  1..64
                        mol_type = other DNA
                        organism = synthetic construct
SEQUENCE: 59
ttcaccgact ttttcccttt ttttataaaa ctggaacgtc ggcatacatt tcacttcgca    60
ttcg                                                                 64

SEQ ID NO: 60           moltype = DNA   length = 84
FEATURE                 Location/Qualifiers
misc_feature            1..84
                        note = TRX-M7-Xho-R primer
source                  1..84
                        mol_type = other DNA
                        organism = synthetic construct
SEQUENCE: 60
gaattctcga gctatcacac cagttcgtta atcgtggctt ccagttttc tttgttaaca    60
ccgctaaatt caccgacttt ttga                                           84

SEQ ID NO: 61           moltype = DNA   length = 59
FEATURE                 Location/Qualifiers
misc_feature            1..59
                        note = TRX-M8-Xho-R primer
source                  1..59
                        mol_type = other DNA
                        organism = synthetic construct
SEQUENCE: 61
gaattctcga gctatcaaca cagttcgtta atgatggctt ccagttttc tttgttggc     59
```

-continued

```
SEQ ID NO: 62              moltype = DNA  length = 19
FEATURE                    Location/Qualifiers
misc_feature               1..19
                           note = N293F-colo-F primer
source                     1..19
                           mol_type = other DNA
                           organism = synthetic construct
SEQUENCE: 62
ggcgtgtacg gtgggaggt                                                    19

SEQ ID NO: 63              moltype = DNA  length = 20
FEATURE                    Location/Qualifiers
misc_feature               1..20
                           note = N293F-colo-R primer
source                     1..20
                           mol_type = other DNA
                           organism = synthetic construct
SEQUENCE: 63
agcagcgtat ccacatagcg                                                   20

SEQ ID NO: 64              moltype = AA  length = 15
FEATURE                    Location/Qualifiers
REGION                     1..15
                           note = Peptide_001
source                     1..15
                           mol_type = protein
                           organism = synthetic construct
SEQUENCE: 64
VATAADVHSQ HHHHH                                                        15

SEQ ID NO: 65              moltype = AA  length = 15
FEATURE                    Location/Qualifiers
REGION                     1..15
                           note = Peptide_002
source                     1..15
                           mol_type = protein
                           organism = synthetic construct
SEQUENCE: 65
ATAADVHSQH HHHH                                                         15

SEQ ID NO: 66              moltype = AA  length = 15
FEATURE                    Location/Qualifiers
REGION                     1..15
                           note = Peptide_003
source                     1..15
                           mol_type = protein
                           organism = synthetic construct
SEQUENCE: 66
TAADVHSQHH HHHH                                                         15

SEQ ID NO: 67              moltype = AA  length = 15
FEATURE                    Location/Qualifiers
REGION                     1..15
                           note = Peptide_004
source                     1..15
                           mol_type = protein
                           organism = synthetic construct
SEQUENCE: 67
AADVHSQHHH HHHH                                                         15

SEQ ID NO: 68              moltype = AA  length = 15
FEATURE                    Location/Qualifiers
REGION                     1..15
                           note = Peptide_005
source                     1..15
                           mol_type = protein
                           organism = synthetic construct
SEQUENCE: 68
ADVHSQHHHH HHHHV                                                        15

SEQ ID NO: 69              moltype = AA  length = 15
FEATURE                    Location/Qualifiers
REGION                     1..15
                           note = Peptide_006
source                     1..15
                           mol_type = protein
                           organism = synthetic construct
SEQUENCE: 69
DVHSQHHHHH HHHVK                                                        15
```

| SEQ ID NO: 70 | moltype = AA   length = 15 |
| --- | --- |
| FEATURE | Location/Qualifiers |
| REGION | 1..15 |
|  | note = Peptide_007 |
| source | 1..15 |
|  | mol_type = protein |
|  | organism = synthetic construct |

SEQUENCE: 70
VHSQHHHHHH HHVKQ                                                              15

| SEQ ID NO: 71 | moltype = AA   length = 15 |
| --- | --- |
| FEATURE | Location/Qualifiers |
| REGION | 1..15 |
|  | note = Peptide_008 |
| source | 1..15 |
|  | mol_type = protein |
|  | organism = synthetic construct |

SEQUENCE: 71
HSQHHHHHHH HVKQI                                                              15

| SEQ ID NO: 72 | moltype = AA   length = 15 |
| --- | --- |
| FEATURE | Location/Qualifiers |
| REGION | 1..15 |
|  | note = Peptide_009 |
| source | 1..15 |
|  | mol_type = protein |
|  | organism = synthetic construct |

SEQUENCE: 72
SQHHHHHHHH VKQIE                                                              15

| SEQ ID NO: 73 | moltype = AA   length = 15 |
| --- | --- |
| FEATURE | Location/Qualifiers |
| REGION | 1..15 |
|  | note = Peptide_010 |
| source | 1..15 |
|  | mol_type = protein |
|  | organism = synthetic construct |

SEQUENCE: 73
QHHHHHHHHV KQIES                                                              15

| SEQ ID NO: 74 | moltype = AA   length = 15 |
| --- | --- |
| FEATURE | Location/Qualifiers |
| REGION | 1..15 |
|  | note = Peptide_011 |
| source | 1..15 |
|  | mol_type = protein |
|  | organism = synthetic construct |

SEQUENCE: 74
HHHHHHHHVK QIESK                                                              15

| SEQ ID NO: 75 | moltype = AA   length = 15 |
| --- | --- |
| FEATURE | Location/Qualifiers |
| REGION | 1..15 |
|  | note = Peptide_012 |
| source | 1..15 |
|  | mol_type = protein |
|  | organism = synthetic construct |

SEQUENCE: 75
HHHHHHHVKQ IESKT                                                              15

| SEQ ID NO: 76 | moltype = AA   length = 15 |
| --- | --- |
| FEATURE | Location/Qualifiers |
| REGION | 1..15 |
|  | note = Peptide_013 |
| source | 1..15 |
|  | mol_type = protein |
|  | organism = synthetic construct |

SEQUENCE: 76
HHHHHHVKQI ESKTA                                                              15

| SEQ ID NO: 77 | moltype = AA   length = 15 |
| --- | --- |
| FEATURE | Location/Qualifiers |
| REGION | 1..15 |
|  | note = Peptide_014 |
| source | 1..15 |
|  | mol_type = protein |
|  | organism = synthetic construct |

SEQUENCE: 77

```
HHHHHVKQIE SKTAF                                                                                      15

SEQ ID NO: 78            moltype = AA  length = 15
FEATURE                  Location/Qualifiers
REGION                   1..15
                         note = Peptide_015
source                   1..15
                         mol_type = protein
                         organism = synthetic construct
SEQUENCE: 78
HHHHVKQIES KTAFQ                                                                                      15

SEQ ID NO: 79            moltype = AA  length = 15
FEATURE                  Location/Qualifiers
REGION                   1..15
                         note = Peptide_016
source                   1..15
                         mol_type = protein
                         organism = synthetic construct
SEQUENCE: 79
HHHVKQIESK TAFQE                                                                                      15

SEQ ID NO: 80            moltype = AA  length = 15
FEATURE                  Location/Qualifiers
REGION                   1..15
                         note = Peptide_017
source                   1..15
                         mol_type = protein
                         organism = synthetic construct
SEQUENCE: 80
HHVKQIESKT AFQEA                                                                                      15

SEQ ID NO: 81            moltype = AA  length = 15
FEATURE                  Location/Qualifiers
REGION                   1..15
                         note = Peptide_018
source                   1..15
                         mol_type = protein
                         organism = synthetic construct
SEQUENCE: 81
HVKQIESKTA FQEAL                                                                                      15

SEQ ID NO: 82            moltype = AA  length = 15
FEATURE                  Location/Qualifiers
REGION                   1..15
                         note = Peptide_019
source                   1..15
                         mol_type = protein
                         organism = synthetic construct
SEQUENCE: 82
VKQIESKTAF QEALD                                                                                      15

SEQ ID NO: 83            moltype = AA  length = 15
FEATURE                  Location/Qualifiers
REGION                   1..15
                         note = Peptide_020
source                   1..15
                         mol_type = protein
                         organism = synthetic construct
SEQUENCE: 83
KQIESKTAFQ EALDA                                                                                      15

SEQ ID NO: 84            moltype = AA  length = 15
FEATURE                  Location/Qualifiers
REGION                   1..15
                         note = Peptide_021
source                   1..15
                         mol_type = protein
                         organism = synthetic construct
SEQUENCE: 84
QIESKTAFQE ALDAA                                                                                      15

SEQ ID NO: 85            moltype = AA  length = 15
FEATURE                  Location/Qualifiers
REGION                   1..15
                         note = Peptide_022
source                   1..15
                         mol_type = protein
                         organism = synthetic construct
```

```
SEQUENCE: 85
IESKTAFQEA LDAAG                                                15

SEQ ID NO: 86          moltype = AA  length = 15
FEATURE                Location/Qualifiers
REGION                 1..15
                       note = Peptide_023
source                 1..15
                       mol_type = protein
                       organism = synthetic construct
SEQUENCE: 86
ESKTAFQEAL DAAGD                                                15

SEQ ID NO: 87          moltype = AA  length = 15
FEATURE                Location/Qualifiers
REGION                 1..15
                       note = Peptide_024
source                 1..15
                       mol_type = protein
                       organism = synthetic construct
SEQUENCE: 87
SKTAFQEALD AAGDK                                                15

SEQ ID NO: 88          moltype = AA  length = 15
FEATURE                Location/Qualifiers
REGION                 1..15
                       note = Peptide_025
source                 1..15
                       mol_type = protein
                       organism = synthetic construct
SEQUENCE: 88
KTAFQEALDA AGDKL                                                15

SEQ ID NO: 89          moltype = AA  length = 15
FEATURE                Location/Qualifiers
REGION                 1..15
                       note = Peptide_026
source                 1..15
                       mol_type = protein
                       organism = synthetic construct
SEQUENCE: 89
TAFQEALDAA GDKLV                                                15

SEQ ID NO: 90          moltype = AA  length = 15
FEATURE                Location/Qualifiers
REGION                 1..15
                       note = Peptide_027
source                 1..15
                       mol_type = protein
                       organism = synthetic construct
SEQUENCE: 90
AFQEALDAAG DKLVV                                                15

SEQ ID NO: 91          moltype = AA  length = 15
FEATURE                Location/Qualifiers
REGION                 1..15
                       note = Peptide_028
source                 1..15
                       mol_type = protein
                       organism = synthetic construct
SEQUENCE: 91
FQEALDAAGD KLVVV                                                15

SEQ ID NO: 92          moltype = AA  length = 15
FEATURE                Location/Qualifiers
REGION                 1..15
                       note = Peptide_029
source                 1..15
                       mol_type = protein
                       organism = synthetic construct
SEQUENCE: 92
QEALDAAGDK LVVVD                                                15

SEQ ID NO: 93          moltype = AA  length = 15
FEATURE                Location/Qualifiers
REGION                 1..15
                       note = Peptide_030
source                 1..15
                       mol_type = protein
```

```
                                    -continued
                        organism = synthetic construct
SEQUENCE: 93
EALDAAGDKL VVVDF                                                                    15

SEQ ID NO: 94           moltype = AA  length = 15
FEATURE                 Location/Qualifiers
REGION                  1..15
                        note = Peptide_031
source                  1..15
                        mol_type = protein
                        organism = synthetic construct
SEQUENCE: 94
ALDAAGDKLV VVDFS                                                                    15

SEQ ID NO: 95           moltype = AA  length = 15
FEATURE                 Location/Qualifiers
REGION                  1..15
                        note = Peptide_032
source                  1..15
                        mol_type = protein
                        organism = synthetic construct
SEQUENCE: 95
LDAAGDKLVV VDFSA                                                                    15

SEQ ID NO: 96           moltype = AA  length = 15
FEATURE                 Location/Qualifiers
REGION                  1..15
                        note = Peptide_033
source                  1..15
                        mol_type = protein
                        organism = synthetic construct
SEQUENCE: 96
DAAGDKLVVV DFSAT                                                                    15

SEQ ID NO: 97           moltype = AA  length = 15
FEATURE                 Location/Qualifiers
REGION                  1..15
                        note = Peptide_034
source                  1..15
                        mol_type = protein
                        organism = synthetic construct
SEQUENCE: 97
AAGDKLVVVD FSATW                                                                    15

SEQ ID NO: 98           moltype = AA  length = 15
FEATURE                 Location/Qualifiers
REGION                  1..15
                        note = Peptide_035
source                  1..15
                        mol_type = protein
                        organism = synthetic construct
SEQUENCE: 98
AGDKLVVVDF SATWC                                                                    15

SEQ ID NO: 99           moltype = AA  length = 15
FEATURE                 Location/Qualifiers
REGION                  1..15
                        note = Peptide_036
source                  1..15
                        mol_type = protein
                        organism = synthetic construct
SEQUENCE: 99
GDKLVVVDFS ATWCG                                                                    15

SEQ ID NO: 100          moltype = AA  length = 15
FEATURE                 Location/Qualifiers
REGION                  1..15
                        note = Peptide_037
source                  1..15
                        mol_type = protein
                        organism = synthetic construct
SEQUENCE: 100
DKLVVVDFSA TWCGP                                                                    15

SEQ ID NO: 101          moltype = AA  length = 15
FEATURE                 Location/Qualifiers
REGION                  1..15
                        note = Peptide_038
source                  1..15
```

```
                        mol_type = protein
                        organism = synthetic construct
SEQUENCE: 101
KLVVVDFSAT WCGPC                                                        15

SEQ ID NO: 102          moltype = AA   length = 15
FEATURE                 Location/Qualifiers
REGION                  1..15
                        note = Peptide_039
source                  1..15
                        mol_type = protein
                        organism = synthetic construct
SEQUENCE: 102
LVVVDFSATW CGPCK                                                        15

SEQ ID NO: 103          moltype = AA   length = 15
FEATURE                 Location/Qualifiers
REGION                  1..15
                        note = Peptide_040
source                  1..15
                        mol_type = protein
                        organism = synthetic construct
SEQUENCE: 103
VVVDFSATWC GPCKM                                                        15

SEQ ID NO: 104          moltype = AA   length = 15
FEATURE                 Location/Qualifiers
REGION                  1..15
                        note = Peptide_041
source                  1..15
                        mol_type = protein
                        organism = synthetic construct
SEQUENCE: 104
VVDFSATWCG PCKMI                                                        15

SEQ ID NO: 105          moltype = AA   length = 15
FEATURE                 Location/Qualifiers
REGION                  1..15
                        note = Peptide_042
source                  1..15
                        mol_type = protein
                        organism = synthetic construct
SEQUENCE: 105
VDFSATWCGP CKMIK                                                        15

SEQ ID NO: 106          moltype = AA   length = 15
FEATURE                 Location/Qualifiers
REGION                  1..15
                        note = Peptide_043
source                  1..15
                        mol_type = protein
                        organism = synthetic construct
SEQUENCE: 106
DFSATWCGPC KMIKP                                                        15

SEQ ID NO: 107          moltype = AA   length = 15
FEATURE                 Location/Qualifiers
REGION                  1..15
                        note = Peptide_044
source                  1..15
                        mol_type = protein
                        organism = synthetic construct
SEQUENCE: 107
FSATWCGPCK MIKPF                                                        15

SEQ ID NO: 108          moltype = AA   length = 15
FEATURE                 Location/Qualifiers
REGION                  1..15
                        note = Peptide_045
source                  1..15
                        mol_type = protein
                        organism = synthetic construct
SEQUENCE: 108
SATWCGPCKM IKPFF                                                        15

SEQ ID NO: 109          moltype = AA   length = 15
FEATURE                 Location/Qualifiers
REGION                  1..15
                        note = Peptide_046
```

```
source                  1..15
                        mol_type = protein
                        organism = synthetic construct
SEQUENCE: 109
ATWCGPCKMI KPFFH                                                   15

SEQ ID NO: 110          moltype = AA   length = 15
FEATURE                 Location/Qualifiers
REGION                  1..15
                        note = Peptide_047
source                  1..15
                        mol_type = protein
                        organism = synthetic construct
SEQUENCE: 110
TWCGPCKMIK PFFHS                                                   15

SEQ ID NO: 111          moltype = AA   length = 15
FEATURE                 Location/Qualifiers
REGION                  1..15
                        note = Peptide_048
source                  1..15
                        mol_type = protein
                        organism = synthetic construct
SEQUENCE: 111
WCGPCKMIKP FFHSL                                                   15

SEQ ID NO: 112          moltype = AA   length = 15
FEATURE                 Location/Qualifiers
REGION                  1..15
                        note = Peptide_049
source                  1..15
                        mol_type = protein
                        organism = synthetic construct
SEQUENCE: 112
CGPCKMIKPF FHSLS                                                   15

SEQ ID NO: 113          moltype = AA   length = 15
FEATURE                 Location/Qualifiers
REGION                  1..15
                        note = Peptide_050
source                  1..15
                        mol_type = protein
                        organism = synthetic construct
SEQUENCE: 113
GPCKMIKPFF HSLSE                                                   15

SEQ ID NO: 114          moltype = AA   length = 15
FEATURE                 Location/Qualifiers
REGION                  1..15
                        note = Peptide_051
source                  1..15
                        mol_type = protein
                        organism = synthetic construct
SEQUENCE: 114
PCKMIKPFFH SLSEK                                                   15

SEQ ID NO: 115          moltype = AA   length = 15
FEATURE                 Location/Qualifiers
REGION                  1..15
                        note = Peptide_052
source                  1..15
                        mol_type = protein
                        organism = synthetic construct
SEQUENCE: 115
CKMIKPFFHS LSEKY                                                   15

SEQ ID NO: 116          moltype = AA   length = 15
FEATURE                 Location/Qualifiers
REGION                  1..15
                        note = Peptide_053
source                  1..15
                        mol_type = protein
                        organism = synthetic construct
SEQUENCE: 116
KMIKPFFHSL SEKYS                                                   15

SEQ ID NO: 117          moltype = AA   length = 15
FEATURE                 Location/Qualifiers
REGION                  1..15
```

```
SEQ ID NO: 117         moltype = AA  length = 15
FEATURE                Location/Qualifiers
REGION                 1..15
                       note = Peptide_054
source                 1..15
                       mol_type = protein
                       organism = synthetic construct
SEQUENCE: 117
MIKPFFHSLS EKYSN                                                       15

SEQ ID NO: 118         moltype = AA  length = 15
FEATURE                Location/Qualifiers
REGION                 1..15
                       note = Peptide_055
source                 1..15
                       mol_type = protein
                       organism = synthetic construct
SEQUENCE: 118
IKPFFHSLSE KYSNV                                                       15

SEQ ID NO: 119         moltype = AA  length = 15
FEATURE                Location/Qualifiers
REGION                 1..15
                       note = Peptide_056
source                 1..15
                       mol_type = protein
                       organism = synthetic construct
SEQUENCE: 119
KPFFHSLSEK YSNVI                                                       15

SEQ ID NO: 120         moltype = AA  length = 15
FEATURE                Location/Qualifiers
REGION                 1..15
                       note = Peptide_057
source                 1..15
                       mol_type = protein
                       organism = synthetic construct
SEQUENCE: 120
PFFHSLSEKY SNVIF                                                       15

SEQ ID NO: 121         moltype = AA  length = 15
FEATURE                Location/Qualifiers
REGION                 1..15
                       note = Peptide_058
source                 1..15
                       mol_type = protein
                       organism = synthetic construct
SEQUENCE: 121
FFHSLSEKYS NVIFL                                                       15

SEQ ID NO: 122         moltype = AA  length = 15
FEATURE                Location/Qualifiers
REGION                 1..15
                       note = Peptide_059
source                 1..15
                       mol_type = protein
                       organism = synthetic construct
SEQUENCE: 122
FHSLSEKYSN VIFLE                                                       15

SEQ ID NO: 123         moltype = AA  length = 15
FEATURE                Location/Qualifiers
REGION                 1..15
                       note = Peptide_060
source                 1..15
                       mol_type = protein
                       organism = synthetic construct
SEQUENCE: 123
HSLSEKYSNV IFLEV                                                       15

SEQ ID NO: 124         moltype = AA  length = 15
FEATURE                Location/Qualifiers
REGION                 1..15
                       note = Peptide_061
source                 1..15
                       mol_type = protein
                       organism = synthetic construct
SEQUENCE: 124
SLSEKYSNVI FLEVD                                                       15

SEQ ID NO: 125         moltype = AA  length = 15
FEATURE                Location/Qualifiers
```

```
REGION                  1..15
                        note = Peptide_062
source                  1..15
                        mol_type = protein
                        organism = synthetic construct
SEQUENCE: 125
LSEKYSNVIF LEVDV                                                       15

SEQ ID NO: 126          moltype = AA  length = 15
FEATURE                 Location/Qualifiers
REGION                  1..15
                        note = Peptide_063
source                  1..15
                        mol_type = protein
                        organism = synthetic construct
SEQUENCE: 126
SEKYSNVIFL EVDVD                                                       15

SEQ ID NO: 127          moltype = AA  length = 15
FEATURE                 Location/Qualifiers
REGION                  1..15
                        note = Peptide_064
source                  1..15
                        mol_type = protein
                        organism = synthetic construct
SEQUENCE: 127
EKYSNVIFLE VDVDD                                                       15

SEQ ID NO: 128          moltype = AA  length = 15
FEATURE                 Location/Qualifiers
REGION                  1..15
                        note = Peptide_065
source                  1..15
                        mol_type = protein
                        organism = synthetic construct
SEQUENCE: 128
KYSNVIFLEV DVDDC                                                       15

SEQ ID NO: 129          moltype = AA  length = 15
FEATURE                 Location/Qualifiers
REGION                  1..15
                        note = Peptide_066
source                  1..15
                        mol_type = protein
                        organism = synthetic construct
SEQUENCE: 129
YSNVIFLEVD VDDCQ                                                       15

SEQ ID NO: 130          moltype = AA  length = 15
FEATURE                 Location/Qualifiers
REGION                  1..15
                        note = Peptide_067
source                  1..15
                        mol_type = protein
                        organism = synthetic construct
SEQUENCE: 130
SNVIFLEVDV DDCQD                                                       15

SEQ ID NO: 131          moltype = AA  length = 15
FEATURE                 Location/Qualifiers
REGION                  1..15
                        note = Peptide_068
source                  1..15
                        mol_type = protein
                        organism = synthetic construct
SEQUENCE: 131
NVIFLEVDVD DCQDV                                                       15

SEQ ID NO: 132          moltype = AA  length = 15
FEATURE                 Location/Qualifiers
REGION                  1..15
                        note = Peptide_069
source                  1..15
                        mol_type = protein
                        organism = synthetic construct
SEQUENCE: 132
VIFLEVDVDD CQDVA                                                       15

SEQ ID NO: 133          moltype = AA  length = 15
```

```
FEATURE                 Location/Qualifiers
REGION                  1..15
                        note = Peptide_070
source                  1..15
                        mol_type = protein
                        organism = synthetic construct
SEQUENCE: 133
IFLEVDVDDC QDVAS                                                      15

SEQ ID NO: 134          moltype = AA  length = 15
FEATURE                 Location/Qualifiers
REGION                  1..15
                        note = Peptide_071
source                  1..15
                        mol_type = protein
                        organism = synthetic construct
SEQUENCE: 134
FLEVDVDDCQ DVASE                                                      15

SEQ ID NO: 135          moltype = AA  length = 15
FEATURE                 Location/Qualifiers
REGION                  1..15
                        note = Peptide_072
source                  1..15
                        mol_type = protein
                        organism = synthetic construct
SEQUENCE: 135
LEVDVDDCQD VASEC                                                      15

SEQ ID NO: 136          moltype = AA  length = 15
FEATURE                 Location/Qualifiers
REGION                  1..15
                        note = Peptide_073
source                  1..15
                        mol_type = protein
                        organism = synthetic construct
SEQUENCE: 136
EVDVDDCQDV ASECE                                                      15

SEQ ID NO: 137          moltype = AA  length = 15
FEATURE                 Location/Qualifiers
REGION                  1..15
                        note = Peptide_074
source                  1..15
                        mol_type = protein
                        organism = synthetic construct
SEQUENCE: 137
VDVDDCQDVA SECEV                                                      15

SEQ ID NO: 138          moltype = AA  length = 15
FEATURE                 Location/Qualifiers
REGION                  1..15
                        note = Peptide_075
source                  1..15
                        mol_type = protein
                        organism = synthetic construct
SEQUENCE: 138
DVDDCQDVAS ECEVK                                                      15

SEQ ID NO: 139          moltype = AA  length = 15
FEATURE                 Location/Qualifiers
REGION                  1..15
                        note = Peptide_076
source                  1..15
                        mol_type = protein
                        organism = synthetic construct
SEQUENCE: 139
VDDCQDVASE CEVKC                                                      15

SEQ ID NO: 140          moltype = AA  length = 15
FEATURE                 Location/Qualifiers
REGION                  1..15
                        note = Peptide_077
source                  1..15
                        mol_type = protein
                        organism = synthetic construct
SEQUENCE: 140
DDCQDVASEC EVKCM                                                      15
```

-continued

```
SEQ ID NO: 141         moltype = AA   length = 15
FEATURE                Location/Qualifiers
REGION                 1..15
                       note = Peptide_078
source                 1..15
                       mol_type = protein
                       organism = synthetic construct
SEQUENCE: 141
DCQDVASECE VKCMP                                                            15

SEQ ID NO: 142         moltype = AA   length = 15
FEATURE                Location/Qualifiers
REGION                 1..15
                       note = Peptide_079
source                 1..15
                       mol_type = protein
                       organism = synthetic construct
SEQUENCE: 142
CQDVASECEV KCMPT                                                            15

SEQ ID NO: 143         moltype = AA   length = 15
FEATURE                Location/Qualifiers
REGION                 1..15
                       note = Peptide_080
source                 1..15
                       mol_type = protein
                       organism = synthetic construct
SEQUENCE: 143
QDVASECEVK CMPTF                                                            15

SEQ ID NO: 144         moltype = AA   length = 15
FEATURE                Location/Qualifiers
REGION                 1..15
                       note = Peptide_081
source                 1..15
                       mol_type = protein
                       organism = synthetic construct
SEQUENCE: 144
DVASECEVKC MPTFQ                                                            15

SEQ ID NO: 145         moltype = AA   length = 15
FEATURE                Location/Qualifiers
REGION                 1..15
                       note = Peptide_082
source                 1..15
                       mol_type = protein
                       organism = synthetic construct
SEQUENCE: 145
VASECEVKCM PTFQF                                                            15

SEQ ID NO: 146         moltype = AA   length = 15
FEATURE                Location/Qualifiers
REGION                 1..15
                       note = Peptide_083
source                 1..15
                       mol_type = protein
                       organism = synthetic construct
SEQUENCE: 146
ASECEVKCMP TFQFF                                                            15

SEQ ID NO: 147         moltype = AA   length = 15
FEATURE                Location/Qualifiers
REGION                 1..15
                       note = Peptide_084
source                 1..15
                       mol_type = protein
                       organism = synthetic construct
SEQUENCE: 147
SECEVKCMPT FQFFK                                                            15

SEQ ID NO: 148         moltype = AA   length = 15
FEATURE                Location/Qualifiers
REGION                 1..15
                       note = Peptide_085
source                 1..15
                       mol_type = protein
                       organism = synthetic construct
SEQUENCE: 148
ECEVKCMPTF QFFKK                                                            15
```

| | |
|---|---|
| SEQ ID NO: 149<br>FEATURE<br>REGION<br><br>source | moltype = AA  length = 15<br>Location/Qualifiers<br>1..15<br>note = Peptide_086<br>1..15<br>mol_type = protein<br>organism = synthetic construct |

SEQUENCE: 149
CEVKCMPTFQ FFKKG                                                    15

| | |
|---|---|
| SEQ ID NO: 150<br>FEATURE<br>REGION<br><br>source | moltype = AA  length = 15<br>Location/Qualifiers<br>1..15<br>note = Peptide_087<br>1..15<br>mol_type = protein<br>organism = synthetic construct |

SEQUENCE: 150
EVKCMPTFQF FKKGQ                                                    15

| | |
|---|---|
| SEQ ID NO: 151<br>FEATURE<br>REGION<br><br>source | moltype = AA  length = 15<br>Location/Qualifiers<br>1..15<br>note = Peptide_088<br>1..15<br>mol_type = protein<br>organism = synthetic construct |

SEQUENCE: 151
VKCMPTFQFF KKGQK                                                    15

| | |
|---|---|
| SEQ ID NO: 152<br>FEATURE<br>REGION<br><br>source | moltype = AA  length = 15<br>Location/Qualifiers<br>1..15<br>note = Peptide_089<br>1..15<br>mol_type = protein<br>organism = synthetic construct |

SEQUENCE: 152
KCMPTFQFFK KGQKV                                                    15

| | |
|---|---|
| SEQ ID NO: 153<br>FEATURE<br>REGION<br><br>source | moltype = AA  length = 15<br>Location/Qualifiers<br>1..15<br>note = Peptide_090<br>1..15<br>mol_type = protein<br>organism = synthetic construct |

SEQUENCE: 153
CMPTFQFFKK GQKVG                                                    15

| | |
|---|---|
| SEQ ID NO: 154<br>FEATURE<br>REGION<br><br>source | moltype = AA  length = 15<br>Location/Qualifiers<br>1..15<br>note = Peptide_091<br>1..15<br>mol_type = protein<br>organism = synthetic construct |

SEQUENCE: 154
MPTFQFFKKG QKVGE                                                    15

| | |
|---|---|
| SEQ ID NO: 155<br>FEATURE<br>REGION<br><br>source | moltype = AA  length = 15<br>Location/Qualifiers<br>1..15<br>note = Peptide_092<br>1..15<br>mol_type = protein<br>organism = synthetic construct |

SEQUENCE: 155
PTFQFFKKGQ KVGEF                                                    15

| | |
|---|---|
| SEQ ID NO: 156<br>FEATURE<br>REGION<br><br>source | moltype = AA  length = 15<br>Location/Qualifiers<br>1..15<br>note = Peptide_093<br>1..15<br>mol_type = protein<br>organism = synthetic construct |

SEQUENCE: 156

```
TFQFFKKGQK VGEFS                                                         15

SEQ ID NO: 157       moltype = AA   length = 15
FEATURE              Location/Qualifiers
REGION               1..15
                     note = Peptide_094
source               1..15
                     mol_type = protein
                     organism = synthetic construct
SEQUENCE: 157
FQFFKKGQKV GEFSG                                                         15

SEQ ID NO: 158       moltype = AA   length = 15
FEATURE              Location/Qualifiers
REGION               1..15
                     note = Peptide_095
source               1..15
                     mol_type = protein
                     organism = synthetic construct
SEQUENCE: 158
QFFKKGQKVG EFSGA                                                         15

SEQ ID NO: 159       moltype = AA   length = 15
FEATURE              Location/Qualifiers
REGION               1..15
                     note = Peptide_096
source               1..15
                     mol_type = protein
                     organism = synthetic construct
SEQUENCE: 159
FFKKGQKVGE FSGAN                                                         15

SEQ ID NO: 160       moltype = AA   length = 15
FEATURE              Location/Qualifiers
REGION               1..15
                     note = Peptide_097
source               1..15
                     mol_type = protein
                     organism = synthetic construct
SEQUENCE: 160
FKKGQKVGEF SGANK                                                         15

SEQ ID NO: 161       moltype = AA   length = 15
FEATURE              Location/Qualifiers
REGION               1..15
                     note = Peptide_098
source               1..15
                     mol_type = protein
                     organism = synthetic construct
SEQUENCE: 161
KKGQKVGEFS GANKE                                                         15

SEQ ID NO: 162       moltype = AA   length = 15
FEATURE              Location/Qualifiers
REGION               1..15
                     note = Peptide_099
source               1..15
                     mol_type = protein
                     organism = synthetic construct
SEQUENCE: 162
KGQKVGEFSG ANKEK                                                         15

SEQ ID NO: 163       moltype = AA   length = 15
FEATURE              Location/Qualifiers
REGION               1..15
                     note = Peptide_100
source               1..15
                     mol_type = protein
                     organism = synthetic construct
SEQUENCE: 163
GQKVGEFSGA NKEKL                                                         15

SEQ ID NO: 164       moltype = AA   length = 15
FEATURE              Location/Qualifiers
REGION               1..15
                     note = Peptide_101
source               1..15
                     mol_type = protein
                     organism = synthetic construct
```

-continued

```
SEQUENCE: 164
QKVGEFSGAN KEKLE                                                    15

SEQ ID NO: 165          moltype = AA  length = 15
FEATURE                 Location/Qualifiers
REGION                  1..15
                        note = Peptide_102
source                  1..15
                        mol_type = protein
                        organism = synthetic construct
SEQUENCE: 165
KVGEFSGANK EKLEA                                                    15

SEQ ID NO: 166          moltype = AA  length = 15
FEATURE                 Location/Qualifiers
REGION                  1..15
                        note = Peptide_103
source                  1..15
                        mol_type = protein
                        organism = synthetic construct
SEQUENCE: 166
VGEFSGANKE KLEAT                                                    15

SEQ ID NO: 167          moltype = AA  length = 15
FEATURE                 Location/Qualifiers
REGION                  1..15
                        note = Peptide_104
source                  1..15
                        mol_type = protein
                        organism = synthetic construct
SEQUENCE: 167
GEFSGANKEK LEATI                                                    15

SEQ ID NO: 168          moltype = AA  length = 15
FEATURE                 Location/Qualifiers
REGION                  1..15
                        note = Peptide_105
source                  1..15
                        mol_type = protein
                        organism = synthetic construct
SEQUENCE: 168
EFSGANKEKL EATIN                                                    15

SEQ ID NO: 169          moltype = AA  length = 15
FEATURE                 Location/Qualifiers
REGION                  1..15
                        note = Peptide_106
source                  1..15
                        mol_type = protein
                        organism = synthetic construct
SEQUENCE: 169
FSGANKEKLE ATINE                                                    15

SEQ ID NO: 170          moltype = AA  length = 15
FEATURE                 Location/Qualifiers
REGION                  1..15
                        note = Peptide_107
source                  1..15
                        mol_type = protein
                        organism = synthetic construct
SEQUENCE: 170
SGANKEKLEA TINEL                                                    15

SEQ ID NO: 171          moltype = AA  length = 15
FEATURE                 Location/Qualifiers
REGION                  1..15
                        note = Peptide_108
source                  1..15
                        mol_type = protein
                        organism = synthetic construct
SEQUENCE: 171
GANKEKLEAT INELV                                                    15

SEQ ID NO: 172          moltype = AA  length = 26
FEATURE                 Location/Qualifiers
REGION                  1..26
                        note = B264 and B266-1 epitope
source                  1..26
                        mol_type = protein
```

```
                                    organism = synthetic construct
SEQUENCE: 172
ATWCGPCKMI KPFFHSLSEK YSNVIF                                          26

SEQ ID NO: 173          moltype = AA   length = 15
FEATURE                 Location/Qualifiers
REGION                  1..15
                        note = B266-1 epitope
source                  1..15
                        mol_type = protein
                        organism = synthetic construct
SEQUENCE: 173
PTFQFFKKGQ KVGEF                                                      15

SEQ ID NO: 174          moltype = AA   length = 21
FEATURE                 Location/Qualifiers
REGION                  1..21
                        note = B264 epitope
source                  1..21
                        mol_type = protein
                        organism = synthetic construct
SEQUENCE: 174
VKQIESKTAF QEALDAAGDK L                                               21

SEQ ID NO: 175          moltype = AA   length = 17
FEATURE                 Location/Qualifiers
REGION                  1..17
                        note = B264 epitope
source                  1..17
                        mol_type = protein
                        organism = synthetic construct
SEQUENCE: 175
SECEVKCMPT FQFFKKG                                                    17

SEQ ID NO: 176          moltype = AA   length = 20
FEATURE                 Location/Qualifiers
REGION                  1..20
                        note = B264 epitope
source                  1..20
                        mol_type = protein
                        organism = synthetic construct
SEQUENCE: 176
PTFQFFKKGQ KVGEFSGANK                                                 20

SEQ ID NO: 177          moltype = DNA   length = 78
FEATURE                 Location/Qualifiers
misc_feature            1..78
                        note = B264 and B266-1 epitope
source                  1..78
                        mol_type = other DNA
                        organism = synthetic construct
SEQUENCE: 177
gctacctggt gcggcccgtg taaaatgatt aaaccgtttt tccatagcct gtctgaaaaa     60
tacagtaacg ttatcttt                                                   78

SEQ ID NO: 178          moltype = DNA   length = 45
FEATURE                 Location/Qualifiers
misc_feature            1..45
                        note = B266-1 epitope
source                  1..45
                        mol_type = other DNA
                        organism = synthetic construct
SEQUENCE: 178
ccgacgttcc agtttttcaa aaaaggtcaa aaagtcggtg aattt                     45

SEQ ID NO: 179          moltype = DNA   length = 63
FEATURE                 Location/Qualifiers
misc_feature            1..63
                        note = B264 epitope
source                  1..63
                        mol_type = other DNA
                        organism = synthetic construct
SEQUENCE: 179
gtcaaacaga tcgaatcaaa aaccgcattt caagaagccc tggacgccgc tggtgacaaa     60
ctg                                                                   63

SEQ ID NO: 180          moltype = DNA   length = 51
FEATURE                 Location/Qualifiers
misc_feature            1..51
```

```
                    note = B264 epitope
source              1..51
                    mol_type = other DNA
                    organism = synthetic construct
SEQUENCE: 180
agcgaatgcg aagtgaaatg tatgccgacg ttccagtttt tcaaaaaagg t          51

SEQ ID NO: 181      moltype = DNA   length = 60
FEATURE             Location/Qualifiers
misc_feature        1..60
                    note = B264 epitope
source              1..60
                    mol_type = other DNA
                    organism = synthetic construct
SEQUENCE: 181
ccgacgttcc agttttttcaa aaaggtcaa aaagtcggtg aatttagcgg tgccaacaaa   60

SEQ ID NO: 182      moltype = AA   length = 14
FEATURE             Location/Qualifiers
REGION              1..14
                    note = TRX1-M1 mutant protein
source              1..14
                    mol_type = protein
                    organism = synthetic construct
SEQUENCE: 182
QIESKTAEIE GKED                                                    14

SEQ ID NO: 183      moltype = AA   length = 12
FEATURE             Location/Qualifiers
REGION              1..12
                    note = M2 mutant protein
source              1..12
                    mol_type = protein
                    organism = synthetic construct
SEQUENCE: 183
QEALDAHAAL SS                                                      12

SEQ ID NO: 184      moltype = AA   length = 10
FEATURE             Location/Qualifiers
REGION              1..10
                    note = M4 mutant protein
source              1..10
                    mol_type = protein
                    organism = synthetic construct
SEQUENCE: 184
YSNVIFGNMV                                                         10

SEQ ID NO: 185      moltype = DNA   length = 11
FEATURE             Location/Qualifiers
misc_feature        1..11
                    note = BamH1 Restriction Site
source              1..11
                    mol_type = other DNA
                    organism = synthetic construct
SEQUENCE: 185
cctaggctat a                                                       11

SEQ ID NO: 186      moltype = AA   length = 212
FEATURE             Location/Qualifiers
REGION              1..212
                    note = light chain of antibody 9G7
source              1..212
                    mol_type = protein
                    organism = synthetic construct
SEQUENCE: 186
QIVLTQSPAI MSASPGEKVT MTCSASSRLS YMYWYQQKPG TSPKRWIYDT SKLASGVPAR   60
FSGSGSGTSY SLTISTMEAE DAATYYCHQR SSYPTFGAGT KLEIKRADAA PTVSIFPPSS  120
EQLTSGGASV VCFLNNFYPK DINVKWKIDG SERQNGVLNS WTDQDSKDST YSMSSTLTLT  180
KDEYERHNSY TCEATHKTST SPIVKSFNRN EC                                212

SEQ ID NO: 187      moltype = AA   length = 452
FEATURE             Location/Qualifiers
REGION              1..452
                    note = heavy chain of antibody 9GF
source              1..452
                    mol_type = protein
                    organism = synthetic construct
SEQUENCE: 187
EVQLQQSGAE LVKPGASVKL SCTASGFNIK DTFMHWVKQR PEQGLEWIGR IDPANGNTKY   60
```

```
DPKFQGKATI TADTSSNTAY LQLSSLTSED TAVYYCALLQ YSAMDYWGQG TSVTVSSAKT    120
TPPSVYPLAP GCGDTTGSSV TLGCLVKGYF PESVTVTWNS GSLSSSVHTF PALLQSGLYT    180
MSSSVTVPSS TWPSQTVTCS VAHPASSTTV DKKLEPSGPI STINPCPPCK ECHKCPAPNL    240
EGGPSVFIFP PNIKDVLMIS LTPKVTCVVV DVSEDDPDVQ ISWFVNNVEV HTAQTQTHRE    300
DYNSTIRVVS TLPIQHQDWM SGKEFKCKVN NKDLPSPIER TISKIKGLVR APQVYILPPP    360
AEQLSRKDVS LTCLVVGFNP GDISVEWTSN GHTEENYKDT APVLDSDGSY FIYSKLNMKT    420
SKWEKTDSFS CNVRHEGLKN YYLKKTISRS PG                                 452

SEQ ID NO: 188          moltype = AA  length = 219
FEATURE                 Location/Qualifiers
REGION                  1..219
                        note = light chain of antibody 2B4
source                  1..219
                        mol_type = protein
                        organism = synthetic construct
SEQUENCE: 188
DVLMTQTPLS LPVSLGDQAS ISCRSSQSIV HSNGNTYLEW YLQKPGQSPK LLLYKVSNRF     60
SGVPDRFSGS GSGTDFTLKI SRVEAEDLGV YYCFQGSHVP YTFGGGTKLE IKRADAAPTV    120
SIFPPSSEQL TSGGASVVCF LNNFYPKDIN VKWKIDGSER QNGVLNSWTD QDSKDSTYSM    180
SSTLTLTKDE YERHNSYTCE ATHKTSTSPI VKSFNRNEC                           219

SEQ ID NO: 189          moltype = AA  length = 442
FEATURE                 Location/Qualifiers
REGION                  1..442
                        note = heavy chain of antibody 2B4
source                  1..442
                        mol_type = protein
                        organism = synthetic construct
SEQUENCE: 189
QVQLQQSFAE LARPGASVKM SCKASGYTFT SYTMHWVKQR PGQGLEWIGY INPTSDYTNY     60
NQKFKDKATL TADKSSSTAY MQLSSLTSED SAVYFCASEG GFLYYFDYWG QGTTLTVSSA    120
KTTPPSVYPL APGSAAQTNS NVTLGCLVKG YFPEPVTVTW NSGSLSSGVH TFPAVLQSDL    180
YTLSSSVTVP SSTWPSETVT CNVAHPASST KVDKKIVPRD CGCKPCICTV PEVSSVFIFP    240
PKPKDVLTIT LTPKVTCVVV DISKDDPEVQ FSWFVDDVEV HTAQTQPREE QFNSTFRSVS    300
ELPIMHQDWL NGKEFKCRVN SAAFPAPIEK TISKTKGRPK APQVYTIPPP KEQMAKDKVS    360
LTCMITDFFP EDITVEWQWN GQPAENYKNT QPIMDTDGSY FVYSKLNVQK SNWEAGNTFT    420
CSVLHEGLHN HHTEKSLSHS PG                                            442

SEQ ID NO: 190          moltype = AA  length = 112
FEATURE                 Location/Qualifiers
REGION                  1..112
                        note = light chain of antibody B266-1
source                  1..112
                        mol_type = protein
                        organism = synthetic construct
SEQUENCE: 190
DVLKTQTPLS LPVSLGDQAS ISCRSSQSIV HSNGNTYLEW YLQKPGQSPK LLIYKVSNRF     60
SGVPDRFSGS GSGTDFTLKI SRVEAEDLGV YYCFQGSHVP YTFGGGTKLE IK            112

SEQ ID NO: 191          moltype = AA  length = 100
FEATURE                 Location/Qualifiers
REGION                  1..100
                        note = Mus musculus IGKV1-117*01
source                  1..100
                        mol_type = protein
                        organism = synthetic construct
SEQUENCE: 191
DVLKTQTPLS LPVSLGDQAS ISCRSSQSIV HSNGNTYLEW YLQKPGQSPK LLIYKVSNRF     60
SGVPDRFSGS GSGTDFTLKI SRVEAEDLGV YYCFQGSHVP                          100

SEQ ID NO: 192          moltype = AA  length = 12
FEATURE                 Location/Qualifiers
REGION                  1..12
                        note = Mus musculus
source                  1..12
                        mol_type = protein
                        organism = synthetic construct
SEQUENCE: 192
YTFGGGTKLE IK                                                         12

SEQ ID NO: 193          moltype = AA  length = 119
FEATURE                 Location/Qualifiers
REGION                  1..119
                        note = heavy chain of antibody B266-1
source                  1..119
                        mol_type = protein
                        organism = synthetic construct
SEQUENCE: 193
QVQLQQSGAE LARPGASVKM SCKASGYTFT SYTMHWVKQR PGQGLEWIGY INPTSDYTNY     60
```

```
NQKFKDKATL TADKSSSTAY MQLSSLTSED SAVYFCASEG GFLYYFDYWG QGTTLTVSS        119

SEQ ID NO: 194          moltype = AA   length = 98
FEATURE                 Location/Qualifiers
REGION                  1..98
                        note = IGHV1-4*01 Mus musculus
source                  1..98
                        mol_type = protein
                        organism = synthetic construct
SEQUENCE: 194
QVQLQQSGAE LARPGASVKM SCKASGYTFT SYTMHWVKQR PGQGLEWIGY INPSSGYTKY        60
NQKFKDKATL TADKSSSTAY MQLSSLTSED SAVYYCAR                                98

SEQ ID NO: 195          moltype = AA   length = 15
FEATURE                 Location/Qualifiers
REGION                  1..15
                        note = IGHJ2*01 Mus musculus
source                  1..15
                        mol_type = protein
                        organism = synthetic construct
SEQUENCE: 195
YFDYWGQGTT LTVSS                                                         15

SEQ ID NO: 196          moltype = AA   length = 105
FEATURE                 Location/Qualifiers
REGION                  1..105
                        note = light chain of antibody B264
source                  1..105
                        mol_type = protein
                        organism = synthetic construct
SEQUENCE: 196
QIVLTQSPAI MSASPGEKVT MTCSASSRIS YMYWYQQKPG TSPKRWIYDT SKLASGVPAR        60
FSGSGSGTSY SLTISTMEAE DAATYYCHQR SSYPTFGAGT KLELK                        105

SEQ ID NO: 197          moltype = AA   length = 94
FEATURE                 Location/Qualifiers
REGION                  1..94
                        note = IGKV4-70*01 Mus musculus
source                  1..94
                        mol_type = protein
                        organism = synthetic construct
SEQUENCE: 197
QIVLTQSPAI MSASPGEKVT MTCSASSSIS YMMWYQQKPG TSPKRWIYDT SKLASGVPAR        60
FSGSGSGTSY SLTISSMEAE DAATYYCHQR SSYP                                    94

SEQ ID NO: 198          moltype = AA   length = 12
FEATURE                 Location/Qualifiers
REGION                  1..12
                        note = IGKJ5*01 Mus musculus
source                  1..12
                        mol_type = protein
                        organism = synthetic construct
SEQUENCE: 198
LTFGAGTKLE LK                                                            12

SEQ ID NO: 199          moltype = AA   length = 116
FEATURE                 Location/Qualifiers
REGION                  1..116
                        note = heavy chain of antibody B264
source                  1..116
                        mol_type = protein
                        organism = synthetic construct
SEQUENCE: 199
EVQLQQSGAE LVKPGASVKL SCTASGFNIK DTFMHWVKQR PEQGLEWIGR IDPANGNTKY        60
DPKFQGKATI TADTSSNTAY LQLSSLTSED TAVYYCALLQ YSAMDWGQG TSVTVS             116

SEQ ID NO: 200          moltype = AA   length = 98
FEATURE                 Location/Qualifiers
REGION                  1..98
                        note = IGHV14-3*02 Mus musculus
source                  1..98
                        mol_type = protein
                        organism = synthetic construct
SEQUENCE: 200
EVQLQQSGAE LVKPGASVKL SCTASGFNIK DTYMHWVKQR PEQGLEWIGR IDPANGNTKY        60
DPKFQGKATI TADTSSNTAY LQLSSLTSED TAVYYCAR                                98

SEQ ID NO: 201          moltype = AA   length = 16
FEATURE                 Location/Qualifiers
```

```
REGION                  1..16
                        note = IGHJ4*01 Mus musculus
source                  1..16
                        mol_type = protein
                        organism = synthetic construct
SEQUENCE: 201
YYAMDYWGQG TSVTVS                                                           16

SEQ ID NO: 202          moltype = AA   length = 103
FEATURE                 Location/Qualifiers
REGION                  1..103
                        note = Human TRX1
source                  1..103
                        mol_type = protein
                        organism = synthetic construct
SEQUENCE: 202
VKQIESKTAF QEALDAAGDK LVVVDFSATW CGPCKMIKPF FHSLSEKYSN VIFLEVDVDD           60
CQDVASECEV KCMPTFQFFK KGQKVGEFSG ANKEKLEATI NEL                            103

SEQ ID NO: 203          moltype = AA   length = 103
FEATURE                 Location/Qualifiers
REGION                  1..103
                        note = Chrysochloris asiatica TRX1
source                  1..103
                        mol_type = protein
                        organism = synthetic construct
SEQUENCE: 203
VKEIEGKEDF HAALSSAGDK LVVVDFSATW CGPCKMIKPF YHSLSEKFGN MVFLEVDVDD           60
CQDVASECEV KCMITFQFYK KREKVGEFSG VNKEKLEAII NEL                            103

SEQ ID NO: 204          moltype = AA   length = 103
FEATURE                 Location/Qualifiers
REGION                  1..103
                        note = Sequence homology between human TRX1 and
                         Chrysochloris asistica TRX1
SITE                    3
                        note = MISC_FEATURE - X is Gln (Q) or Glu (E).
SITE                    6
                        note = MISC_FEATURE - X is Ser (S) or Gly (G).
SITE                    8
                        note = MISC_FEATURE - X is Thr (T) or Glu (E).
SITE                    9
                        note = MISC_FEATURE - X is Ala (A) or Asp (D).
SITE                    11
                        note = MISC_FEATURE - X is Gln (Q) or His (H).
SITE                    12
                        note = MISC_FEATURE - X is Glu (E) or Ala (A).
SITE                    15
                        note = MISC_FEATURE - X is Asp (D) or Ser (S).
SITE                    16
                        note = MISC_FEATURE - X is Ala (A) or Ser (S).
SITE                    41
                        note = misc_feature - X is Phe (F) or Tyr (Y).
SITE                    48
                        note = MISC_FEATURE - X is Tyr (Y) or Phe (F).
SITE                    49
                        note = MISC_FEATURE - X is Ser (S) or Gly (G).
SITE                    51
                        note = misc_feature - X is Val (V) or Met (M).
SITE                    52
                        note = misc_feature - X is Ile (I) or Val (V).
SITE                    74
                        note = MISC_FEATURE - X is Phe (F) or Ile (I).
SITE                    79
                        note = MISC_FEATURE - X is Phe (F) or Tyr (Y).
SITE                    82
                        note = MISC_FEATURE - X is Gly (G) or Arg (R).
SITE                    83
                        note = MISC_FEATURE - X is Gln (Q) or Glu (E).
SITE                    91
                        note = MISC_FEATURE - X is Ala (A) or Val (V).
SITE                    99
                        note = MISC_FEATURE - X is Thr (T) or Ile (I).
source                  1..103
                        mol_type = protein
                        organism = synthetic construct
SEQUENCE: 204
VKXIEXKXXF XXALXXAGDK LVVVDFSATW CGPCKMIKPF XHSLSEKXXN XXFLEVDVDD           60
CQDVASECEV KCMXTFQFXK XXXKVGEFSG XNKEKLEAXI NEL                            103
```

```
SEQ ID NO: 205           moltype = AA  length = 104
FEATURE                  Location/Qualifiers
REGION                   1..104
                         note = Chrysochloris asiatica TRX
source                   1..104
                         mol_type = protein
                         organism = synthetic construct
SEQUENCE: 205
VKEIEGKEDF HAALSSAGDK LVVVDFSATW CGPCKMIKPF YHSLSEKFGN MVFLEVDVDD    60
CQDVASECEV KCMITFQFYK KREKVGEFSG VNKEKLEAII NELC                   104

SEQ ID NO: 206           moltype = AA  length = 104
FEATURE                  Location/Qualifiers
REGION                   1..104
                         note = Human TRX
source                   1..104
                         mol_type = protein
                         organism = synthetic construct
SEQUENCE: 206
VKQIESKTAF QEALDAAGDK LVVVDFSATW CGPCKMIKPF FHSLSEKYSN VIFLEVDVDD    60
CQDVASECEV KCMPTFQFFK KGQKVGEFSG ANKEKLEATI NELV                   104

SEQ ID NO: 207           moltype = AA  length = 103
FEATURE                  Location/Qualifiers
REGION                   1..103
                         note = M1 mutant
source                   1..103
                         mol_type = protein
                         organism = synthetic construct
SEQUENCE: 207
VKEIEGKEFQ EALDAAGDKL VVVDFSATWC GPCKMIKPFF HSLSEKYSNV IFLEVDVDDC    60
QDVASECEVK CMPTFQFFKK GQKVGEFSGA NKEKLEATIN ELV                    103

SEQ ID NO: 208           moltype = AA  length = 104
FEATURE                  Location/Qualifiers
REGION                   1..104
                         note = M2 mutant
source                   1..104
                         mol_type = protein
                         organism = synthetic construct
SEQUENCE: 208
VKQIESKTAF HAALSSAGDK LVVVDFSATW CGPCKMIKPF FHSLSEKYSN VIFLEVDVDD    60
CQDVASECEV KCMPTFQFFK KGQKVGEFSG ANKEKLEATI NELV                   104

SEQ ID NO: 209           moltype = AA  length = 104
FEATURE                  Location/Qualifiers
REGION                   1..104
                         note = M3 mutant
source                   1..104
                         mol_type = protein
                         organism = synthetic construct
SEQUENCE: 209
VKQIESKTAF QEALDAAGDK LVVVDFSATW CGPCKMIKPF YHSLSEKYSN VIFLEVDVDD    60
CQDVASECEV KCMPTFQFFK KGQKVGEFSG ANKEKLEATI NELV                   104

SEQ ID NO: 210           moltype = AA  length = 103
FEATURE                  Location/Qualifiers
REGION                   1..103
                         note = M4 mutant
source                   1..103
                         mol_type = protein
                         organism = synthetic construct
SEQUENCE: 210
VKQIESKTAF QEALDAAGDK LVVVDFSATW CGPCKMIKPF FHSLSEKFGN MVLEVDVDDC    60
QDVASECEVK CMPTFQFFKK GQKVGEFSGA NKEKLEATIN ELV                    103

SEQ ID NO: 211           moltype = AA  length = 104
FEATURE                  Location/Qualifiers
REGION                   1..104
                         note = M5 mutant
source                   1..104
                         mol_type = protein
                         organism = synthetic construct
SEQUENCE: 211
VKQIESKTAF QEALDAAGDK LVVVDFSATW CGPCKMIKPF FHSLSEKYSN VIFLEVDVDD    60
CQDVASECEV KCMITFQFFK KGQKVGEFSG ANKEKLEATI NELV                   104

SEQ ID NO: 212           moltype = AA  length = 104
```

```
FEATURE            Location/Qualifiers
REGION             1..104
                   note = M6 mutant
source             1..104
                   mol_type = protein
                   organism = synthetic construct
SEQUENCE: 212
VKQIESKTAF QEALDAAGDK LVVVDFSATW CGPCKMIKPF FHSLSEKYSN VIFLEVDVDD    60
CQDVASECEV KCMPTFQFYK KREKVGEFSG ANKEKLEATI NELV                   104

SEQ ID NO: 213     moltype = AA  length = 105
FEATURE            Location/Qualifiers
REGION             1..105
                   note = M7 mutant
source             1..105
                   mol_type = protein
                   organism = synthetic construct
SEQUENCE: 213
VKQIESKTAF QEALDAAGDK LVVVDFSATW CGPCKMIKPF FHSLSEKYSN VIFLEVDVDD    60
CQDVASECEV KCMPTFQFFK KGQKVGEFSS ANKEKLEATI NELVC                  105

SEQ ID NO: 214     moltype = AA  length = 104
FEATURE            Location/Qualifiers
REGION             1..104
                   note = M8 mutant
source             1..104
                   mol_type = protein
                   organism = synthetic construct
SEQUENCE: 214
VKQIESKTAF QEALDAAGDK LVVVDFSATW CGPCKMIKPF FHSLSEKYSN VIFLEVDVDD    60
CQDVASECEV KCMPTFQFFK KGQKVGEFSG ANKEKLEAII NELC                   104

SEQ ID NO: 215     moltype = DNA  length = 18
FEATURE            Location/Qualifiers
misc_feature       1..18
                   note = Xba1 Restriction Site
source             1..18
                   mol_type = other DNA
                   organism = synthetic construct
SEQUENCE: 215
attactttcg atagatct                                                 18
```

MONOCLONAL ANTIBODY SPECIFICALLY BINDING TO THIOREDOXIN 1 AND METHODS OF USE THEREOF FOR BREAST CANCER DIAGNOSIS

CROSS-REFERENCE TO RELATED APPLICATIONS

This application is a continuation of U.S. application Ser. No. 16/755,035, filed Apr. 9, 2020 now U.S. Pat. No. 11,953,502), which is a national phase application under 35 U.S.C. § 371 of International Application No. PCT/KR2018012069, filed Oct. 12, 2018, which claims priority to and the benefit of Korean Application No. 10-2017-0132536, filed Oct. 12, 2017. The contents of the referenced patent applications are incorporated into the present application by reference.

SEQUENCE LISTING

The instant application contains a Sequence Listing which has been submitted in XML format and is hereby incorporated by reference in its entirety. Said XML copy, created on Feb. 14, 2024, is named "ELIPP0105 Sequence Listing.XML" and is 289,617 bytes in size.

FIELD OF THE DISCLOSURE

The present invention relates to an epitope of a thioredoxin-1 (Trx1) antigen and a monoclonal antibody specifically binding thereto, and more particularly, to the epitope, a monoclonal antibody binding thereto, an antigen-binding fragment thereof, a nucleic acid molecule encoding a heavy chain and/or light chain of the antibody or antigen-binding fragment thereof, a recombinant vector containing the nucleic acid molecule, a host cell containing the recombinant vector, a method of preparing the antibody or antigen-binding fragment thereof, a kit for diagnosing breast cancer, and a method of providing information necessary for breast cancer diagnosis.

DESCRIPTION OF RELATED ART

Thioredoxin (Trx) is a small redox protein of about 12 kDa, which is present in the reduced state by a thioredoxin reductase through NADPH-dependent reduction, and includes thioredoxin-1 (Trx1) and thioredoxin-2 (Trx2) in mammals. Thioredoxin acts as a growth factor, removes hydrogen peroxide which is toxic in cells, promotes binding of critical factors relating to the role of a ribonucleotide reductase and transcription in bacteria to DNA, and affects the activity of a transcription factor such as nuclear transcription factor kB (NF-kB) in eukaryotic cells. Therefore, thioredoxin affects cell death and tumors and thus plays a pivotal role in regulation of cancer cell growth, and cleaves a disulfide bond of another oxidized protein to assist the maintenance of activity in a reduced state. Thioredoxin-1 and 2 reductases remove nitrogen oxide of cysteines in mammalian cells to affect cell death, and have potential significance in various diseases including an inflammatory disease, a heart attack, and cancer. In addition, immunohistochemical analysis using an anti-thioredoxin antibody shows the expression of thioredoxin in human cancer tissues including the liver, colon, pancreas and cervix, and such expression indicates the possibility of involving thioredoxin in tumorigenesis.

Under these circumstances, the inventors had studied a marker for breast cancer diagnosis which can diagnose breast cancer or predict a prognosis thereof early, thioredoxin-1 was lowly expressed in normal breast tissue, but very highly expressed in breast cancer tissue, demonstrating that thioredoxin-1 is useful as a marker for breast cancer diagnosis (Korean Patent No. 10-1058230).

To develop in vitro diagnostics (IVD) based on an enzyme-linked immunosorbent assay (ELISA) to have high accuracy and high precision, a pair of antibodies having different sites with different affinities to the same antigen protein are required. Moreover, it is necessary to have a system producing antibodies having a certain affinity every time with low costs. In the present invention, to detect thioredoxin-1 (Trx1) present in human serum, two types of high-performance recombinant monoclonal antibodies were developed, the antibodies very specifically bind to thioredoxin-1 and thus can be useful for screening breast cancer patients. In addition, by identifying a site of a human Trx1 antigen to which the two types of antibodies bind, the present invention was completed.

SUMMARY OF THE INVENTION

The present invention has been suggested to solve the above-mentioned problems, and is directed to providing a monoclonal antibody or an antigen-binding fragment thereof, which is able to diagnose breast cancer with high sensitivity and specificity.

The present invention is also directed to providing a nucleic acid molecule encoding a heavy chain and/or a light chain of the monoclonal antibody or antigen-binding fragment thereof.

The present invention is also directed to providing a recombinant vector containing the nucleic acid molecule.

The present invention is also directed to providing a host cell containing the recombinant vector.

The present invention is also directed to providing an epitope of a human Trx1 antigen to which the monoclonal antibody or a binding fragment thereof binds, a nucleic acid molecule encoding the same, a recombinant vector containing the nucleic acid molecule and a host cell containing the recombinant vector.

The present invention is also directed to providing a method of preparing a monoclonal antibody specifically binding to Trx1 or an antigen-binding fragment thereof, which includes culturing the host cell.

The present invention is also directed to providing a kit for diagnosing breast cancer, including the above-described monoclonal antibody or antigen-binding fragment thereof.

The present invention is also directed to providing a method of providing information necessary for breast cancer diagnosis using the above-described monoclonal antibody or antigen-binding fragment thereof.

To solve the above-described problems, the present invention provides a monoclonal antibody specifically binding to Trx1 or an antigen-binding fragment thereof, which includes a light chain variable region including light chain CDR1 consisting of an amino acid sequence of SEQ ID NO: 1, light chain CDR2 consisting of an amino acid sequence of SEQ ID NO: 2 and light chain CDR3 consisting of an amino acid sequence of SEQ ID NO: 3, and a heavy chain variable region including heavy chain CDR1 consisting of an amino acid sequence of SEQ ID NO: 4, heavy chain CDR2 consisting of an amino acid sequence of SEQ ID NO: 5 and heavy chain CDR3 consisting of an amino acid sequence of SEQ ID NO: 6.

According to an exemplary embodiment of the present invention, the antibody may include a light chain variable region consisting of an amino acid sequence of SEQ ID NO: 13 and a heavy chain variable region consisting of an amino acid sequence of SEQ ID NO: 14.

According to another exemplary embodiment of the present invention, the antibody may include a light chain consisting of an amino acid sequence of SEQ ID NO: 17 and a heavy chain consisting of an amino acid sequence of SEQ ID NO: 18.

The present invention also provides a monoclonal antibody specifically binding to Trx1 or an antigen-binding fragment thereof, which includes a light chain variable region including light chain CDR1 consisting of an amino acid sequence of SEQ ID NO: 7, light chain CDR2 consisting of an amino acid sequence of SEQ ID NO: 8 and light chain CDR3 consisting of an amino acid sequence of SEQ ID NO: 9, and a heavy chain variable region including heavy chain CDR1 consisting of an amino acid sequence of SEQ ID NO: 10, heavy chain CDR2 consisting of an amino acid sequence of SEQ ID NO: 11 and heavy chain CDR3 consisting of an amino acid sequence of SEQ ID NO: 12.

According to one exemplary embodiment of the present invention, the antibody may include a light chain variable region consisting of an amino acid sequence of SEQ ID NO: 15 and a heavy chain variable region consisting of an amino acid sequence of SEQ ID NO: 16.

According to another exemplary embodiment of the present invention, the antibody may include a light chain consisting of an amino acid sequence of SEQ ID NO: 19 and a heavy chain consisting of an amino acid sequence of SEQ ID NO: 20.

According to still another exemplary embodiment of the present invention, the antibody may include a light chain consisting of an amino acid sequence of SEQ ID NO: 25 and a heavy chain consisting of an amino acid sequence of SEQ ID NO: 26.

According to yet another exemplary embodiment of the present invention, the antibody may include an IgG1 heavy chain and a kappa (κ) light chain.

According to yet another exemplary embodiment of the present invention, the antigen-binding fragment may be Fab, F(ab'), F(ab')$_2$, Fv or a single chain antibody molecule.

According to yet another exemplary embodiment of the present invention, the antibody may be a chimeric antibody, a humanized antibody or a human antibody.

The present invention also provides a nucleic acid molecule encoding a heavy chain and/or light chain of the above-described antibody or antigen-binding fragment thereof.

According to one exemplary embodiment of the present invention, the nucleic acid molecule encoding the light chain may consist of a nucleotide sequence of SEQ ID NO: 21, a nucleotide sequence of SEQ ID NO: 23 or a nucleotide sequence of SEQ ID NO: 27.

According to one exemplary embodiment of the present invention, the nucleic acid molecule encoding the heavy chain may consist of a nucleotide sequence of SEQ ID NO: 22, a nucleotide sequence of SEQ ID NO: 24 or a nucleotide sequence of SEQ ID NO: 28.

The present invention also provides a recombinant vector containing the nucleic acid molecule encoding the heavy chain, the nucleic acid encoding the light chain or both of the nucleic acid molecules encoding the heavy chain and the light chain, and a host cell containing the same.

The present invention also provides an epitope of a human Trx1 antigen consisting of any one amino acid sequence selected from the group consisting of SEQ ID NOs: 32 to 34 and 172 to 176, and a nucleic acid molecule encoding the same.

According to one exemplary embodiment of the present invention, the nucleic acid molecule may consist of any one nucleotide sequence selected from the group consisting of SEQ ID NOs: 35 to 37 and 177 to 181.

The present invention also provides a recombinant vector containing the nucleic acid molecule and a host cell containing the same.

The present invention also provides a method of preparing a monoclonal antibody specifically binding to Trx1 or an antigen-binding fragment thereof, which includes culturing a host cell containing a recombinant vector including a nucleic acid molecule encoding a heavy chain of the above-described antibody, a nucleic acid encoding a light chain thereof, or both of the nucleic acid molecules encoding the heavy chain and the light chain thereof.

The present invention also provides a kit for diagnosing breast cancer, which includes the above-described antibody or antigen-binding fragment thereof.

According to one exemplary embodiment of the present invention, the kit may be an enzyme-linked immunosorbent assay (ELISA) kit.

According to another exemplary embodiment of the present invention, the ELISA may be any one selected from the group consisting of direct ELISA, indirect ELISA, direct sandwich ELISA and indirect sandwich ELISA.

The present invention also provides a method of providing information necessary for breast cancer diagnosis, which includes: (a) bringing the above-described monoclonal antibody or antigen-binding fragment thereof into contact with a biological sample isolated from a subject suspected of having breast cancer; (b) measuring an expression level of the Trx1 protein binding to the monoclonal antibody or antigen-binding fragment thereof in the biological sample through the formation of an antigen-antibody complex; and (c) comparing the expression level of the Trx1 protein, measured in Step (b) with that of a control and, if the protein expression level is higher than that of the control, determining the subject to be a breast cancer patient.

Further, the present invention provides a method of providing information necessary for breast cancer diagnosis, which includes: (a) coating a solid support with a monoclonal antibody or an antigen-binding fragment thereof, including light chains CDR1 to CDR3 and heavy chains CDR1 to CDR3 of antibody B266 or B266-1, a monoclonal antibody or an antigen-binding fragment thereof including a light chain variable region and a heavy chain variable region of antibody B266 or B266-1, or antibody B266 or B266-1 or an antigen-binding fragment thereof; (b) applying a biological sample isolated from a subject suspected of having breast cancer to the coated solid support; (c) removing an unbound sample; (d) applying a monoclonal antibody or an antigen-binding fragment thereof, including light chains CDR1 to CDR3 and heavy chains CDR1 to CDR3 of antibody B264, a monoclonal antibody or an antigen-binding fragment thereof, including a light chain variable region and a heavy chain variable region of antibody B264, or antibody B264 or an antigen-binding fragment thereof to the solid support; (e) removing an unbound monoclonal antibody or antigen-binding fragment thereof; (f) measuring an expression level of Trx1 protein; and (g) comparing the expression level of the Trx1 protein, measured in Step (f), with that of a control, and, if the protein expression level is higher than that of the control, determining the subject to be a breast cancer patient.

According to one exemplary embodiment of the present invention, the expression level of the Trx1 protein may be measured by any one method selected from the group consisting of Western blotting, ELISA, sandwich ELISA, a radioimmunoassay, radioimmunodiffusion, Ouchterlony immunodiffusion, an immunoprecipitation assay, a complement fixation assay, an immunochromatographic assay, FACS and a protein chip assay.

According to another exemplary embodiment of the present invention, the isolated biological sample may be any one or more selected from the group consisting of whole blood, serum, plasma, breast tissue and breast cells.

Unless defined otherwise, all technical and scientific terms used in the specification have the same meaning as commonly understood by one of ordinary skill in the art to which the invention belongs. Generally, the nomenclature used herein is well known and commonly used in the art.

The definitions of key terms used herein are as follows.

The term "antigen" refers to a molecule which can be bound by an antibody, and can be used in an animal to produce an antibody capable of binding to an epitope of the antigen or a part of the molecule. The antigen may have one or more epitopes.

The term "antibody" or "Ab" is an immunoglobulin molecule which can recognize a specific target or antigen, for example, a carbohydrate, a polynucleotide, a lipid or a polypeptide through one or more antigen recognition sites, located in a variable region of the immunoglobulin molecule, and bind thereto. The term "antibody" used herein may refer to any type of antibody, which encompasses, but is not limited to, a monoclonal antibody; a polyclonal antibody; an "antigen-binding fragment" of an antibody possessing an ability of specifically binding to a specific antigen (e.g., Trx1), for example, Fab, Fab', F(ab')$_2$, Fd, Fv, Fc, etc.; an isolated complementarity-determining region (CDR); a bispecific antibody; a hetero-conjugated antibody, or a mutant thereof; an antibody, or a fusion protein having an antigen-binding fragment (e.g., a domain antibody); a single-chain variable fragment (ScFv) and a single domain antibody [e.g., shark and camelid antibodies]; a maxibody, a minibody, an intrabody, a diabody, a triabody, a tetrabody, v-NAR and bis-scFv; a humanized antibody; a chimeric antibody; and all other modified configurations of an immunoglobulin molecule including an antigen recognition site with required specificity (including glycosylated variants of an antibody, amino acid sequence variants of an antibody and a covalently modified antibody). The antibody may be derived from a mouse, a rat, a human, or any other origin (including a chimeric or humanized antibody).

An antibody or polypeptide which "specifically binds" to a specific target or antigen (e.g., Trx1 protein) is a term generally understood in the related art, and a method of determining such specific binding has also been widely known in the related art. A specific molecule is considered to have "specific binding" when reacting or linked to a special cell or material more frequently, more rapidly, more consistently and/or with higher affinity than that with another type of cells or material. A specific antibody "specifically binds" to a specific target or antigen with higher affinity, higher binding activity, more rapidly and/or more consistently than when binding to another material.

The term "binding affinity" or "$K_D$" used herein refers to an equilibrium dissociation constant of a particular antigen-antibody interaction. $K_D$ is a ratio of a dissociation rate (also referred to as "release rate" or "$k_d$") to a binding rate or an "operation rate" or "$k_a$ (association rate constant)". Therefore, $K_D$ is $k_d/k_a$, which is expressed as molar concentration (M). It concludes that the lower $K_D$, the higher binding affinity. Therefore, a $K_D$ of 1 μM indicates a lower binding affinity, compared with a $K_D$ of 1 nM. The $K_D$ value of the antibody may be determined using a method widely established in the art. One method of determining the $K_D$ of an antibody typically utilizes surface plasmon resonance using a biosensor system, for example, a Biacore® system (surface plasmon resonance (SPR) biosensor system).

The term "vector" includes a nucleic acid molecule capable of delivering a linked different nucleic acid. One type of vector is a "plasmid," and refers to a circular double-stranded DNA loop into which an additional DNA fragment can be ligated. A different type of vector is a viral vector, and here, an additional DNA fragment may be attached to a viral genome. Some vectors can be self-replicated in host cells into which they are introduced (e.g., a bacterial vector having a bacterial origin of replication and an episomal mammalian vector). Other vectors (e.g., a non-episomal mammalian vector) may be integrated into the genome of host cells when introduced into the host cells, and thus replicated in accordance with the host genome. In addition, some vectors may direct the expression of operatively linked genes. The vectors are referred to as "recombinant expression vectors" (or simply as "expression vectors") in the specification. Generally, the expression vector useful in the recombinant DNA technique is often present in the form of a plasmid. The "plasmid" and "vector" used herein are the types of vectors most generally used, and thus can be interchangeably used. However, the present invention is to include different types of expression vectors having the same function, for example, viral vectors (e.g., a replication-deficient retrovirus, an adenovirus, and an adeno-related virus).

The term "host cells" is used to express cells which are transformed, or transformed by a nucleic acid sequence to express a selected gene of interest. The term encompasses the descendants of mother cells whether or not the descendants are identical to the original parent in the morphological or genetic aspect, as long as the selected gene is present.

A monoclonal antibody of the present invention has excellent binding affinity to thioredoxin-1, thereby very specifically binding to thioredoxin-1, and has very high sensitivity and specificity, thereby being effectively used in screening a breast cancer patient. Further, detection of thioredoxin-1 using the monoclonal antibody specifically binding to thioredoxin-1 of the present invention, rather than detection using a conventional breast cancer diagnostic biomarker CA15-3, exhibits exceptionally high sensitivity and specificity, and thus the accuracy and reliability of breast cancer diagnosis can be significantly increased. An epitope region of a human Trx1 antigen to which an antibody binds according to the present invention can be effectively used in the development of an improved antibody to enhance the binding affinity of an anti-Trx1 antibody.

BRIEF DESCRIPTION OF THE DRAWINGS

FIG. 2 shows the amino acid sequences of a light chain (a) and a heavy chain (b) of a 9G7(AB1) antibody obtained in Example 1.

FIG. 3 shows the amino acid sequences of a light chain (a) and a heavy chain (b) of a 2B4(AB2) antibody obtained in Example 1.

FIGS. 8A to 8D show results of IMTG gap alignment for a light chain and a heavy chain of antibody B266-1 and a light chain and a heavy chain of antibody B264 in order.

FIG. 11 shows the comparison of amino acid sequence homology between human Trx1 and *Chrysochloris asiatica* Trx1.

FIG. 15A shows the comparison of amino acid sequences between CaTrx1 and hTrx1.

FIG. 15B shows the positioning of mutations according to the comparison of amino acid sequences between CaTrx1 and hTrx1.

FIGS. 18A to 18C show results of analyzing the binding strength of an anti-Trx1 antibody with respect to the 8 types of hTrx1 mutant proteins of the present invention.

FIGS. 21A to 21D are a heatmap diagram showing the extent of reaction of controls reacting with antibody samples and all probe peptides, in which the y axis represents the peptide sequences of a library, and the x axis represents the concentrations of the applied antibody samples. MMC2 values are represented by a color code range including white (0 or low intensity), yellow (medium intensity) and red (high intensity).

DETAILED DESCRIPTION OF THE INVENTION

Hereinafter, the present invention will be described in further detail.

As described above, the inventors confirmed through previous research that thioredoxin-1 is expressed in normal breast tissue at a low level, but expressed in breast cancer tissue at a very high level. Therefore, it is proved that thioredoxin-1 is useful as a marker for breast cancer diagnosis.

Therefore, through further research, the inventors developed a monoclonal antibody which very specifically binds to thioredoxin-1 and is useful in screening a breast cancer patient. The monoclonal antibody of the present invention very specifically binds to thioredoxin-1 due to excellent binding affinity to thioredoxin-1 and has very high sensitivity and specificity, such that it can be effectively used in screening a breast cancer patient. Further, the detection of thioredoxin-1 using the monoclonal antibody of the present invention, which specifically binds to thioredoxin-1, rather than the detection of CA15-3, which is another, conventionally used biomarker for breast cancer diagnosis, exhibits excellent sensitivity and specificity, such that the accuracy and reliability of the diagnosis of breast cancer can be significantly increased. In addition, an epitope region of a human Trx1 antigen to which the antibody binds may be effectively used in the development of an improved antibody to enhance the binding affinity of an anti-Trx1 antibody.

The present invention provides a monoclonal antibody binding to thioredoxin-1 (Trx1) or an antigen-binding fragment thereof.

The monoclonal antibody of the present invention may be prepared using a variety of methods known in the art such as hybridoma, recombination and phage display technologies, and a combination method thereof. For example, the monoclonal antibody may be prepared using a hybridoma technique, which is known in the art. The term "monoclonal antibody" used herein is not limited to an antibody produced using a hybridoma technique. The term "monoclonal antibody" refers to an antibody derived from a single clone of any eukaryote, prokaryote, or a phage clone, but does not refer to a method of producing the same.

A method of producing and screening a specific antibody using a hybridoma technique is common and well known in the art. As a non-limited example, a mouse can be immunized with a target antigen or cells expressing the same.

Figure 1:
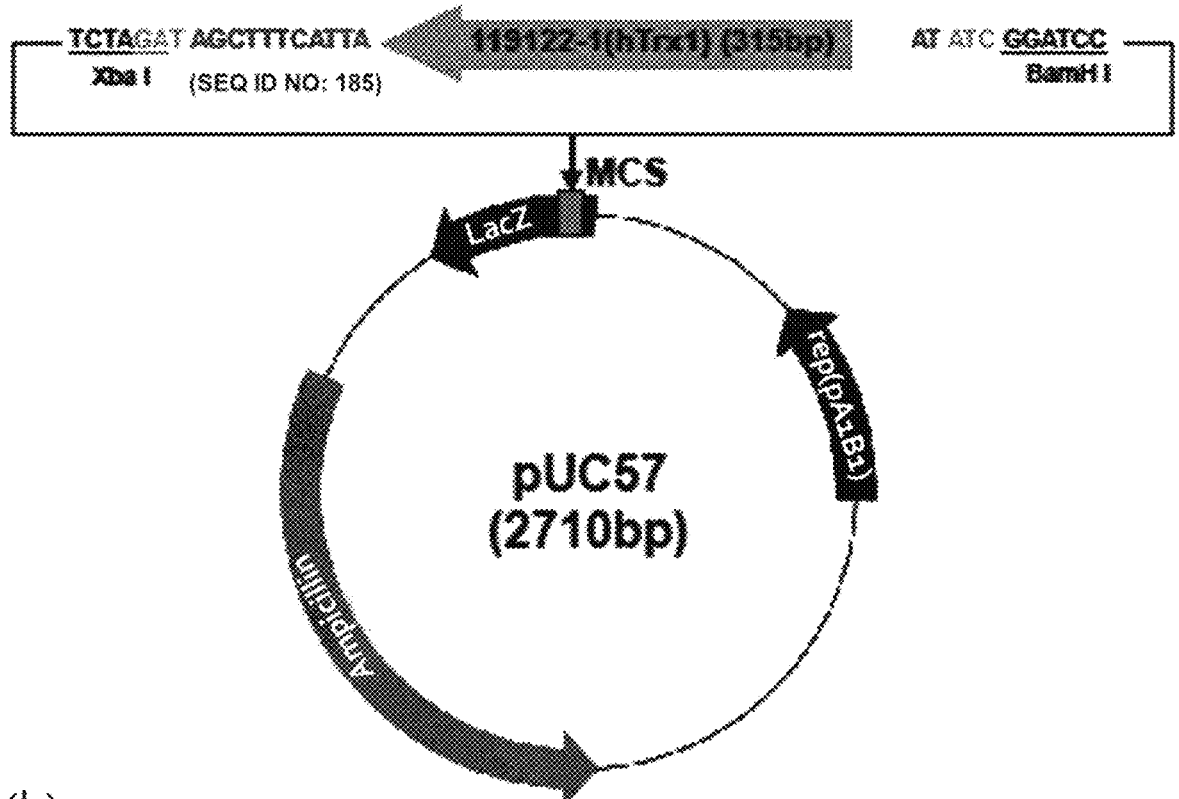
FIG. 1 shows the cleavage map of a recombinant vector expressing the thioredoxin-1 antigen and an isotyping result of an antibody obtained in Example 1.
Figure 4:
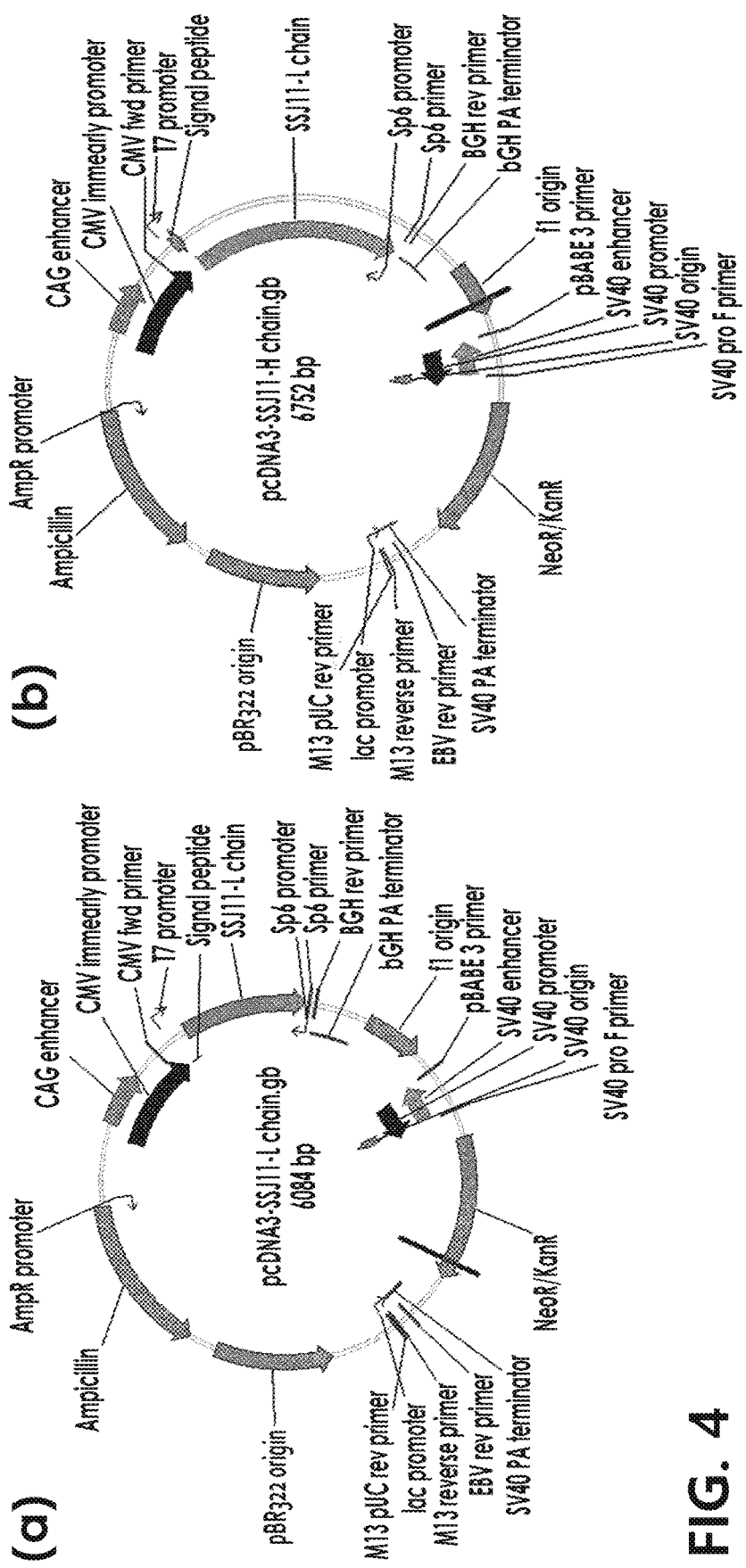
FIG. 4 shows a set of cleavage maps of a recombinant vector expressing a light chain (a) and a heavy chain (b) of a B264 antibody with high affinity.
Figure 5:
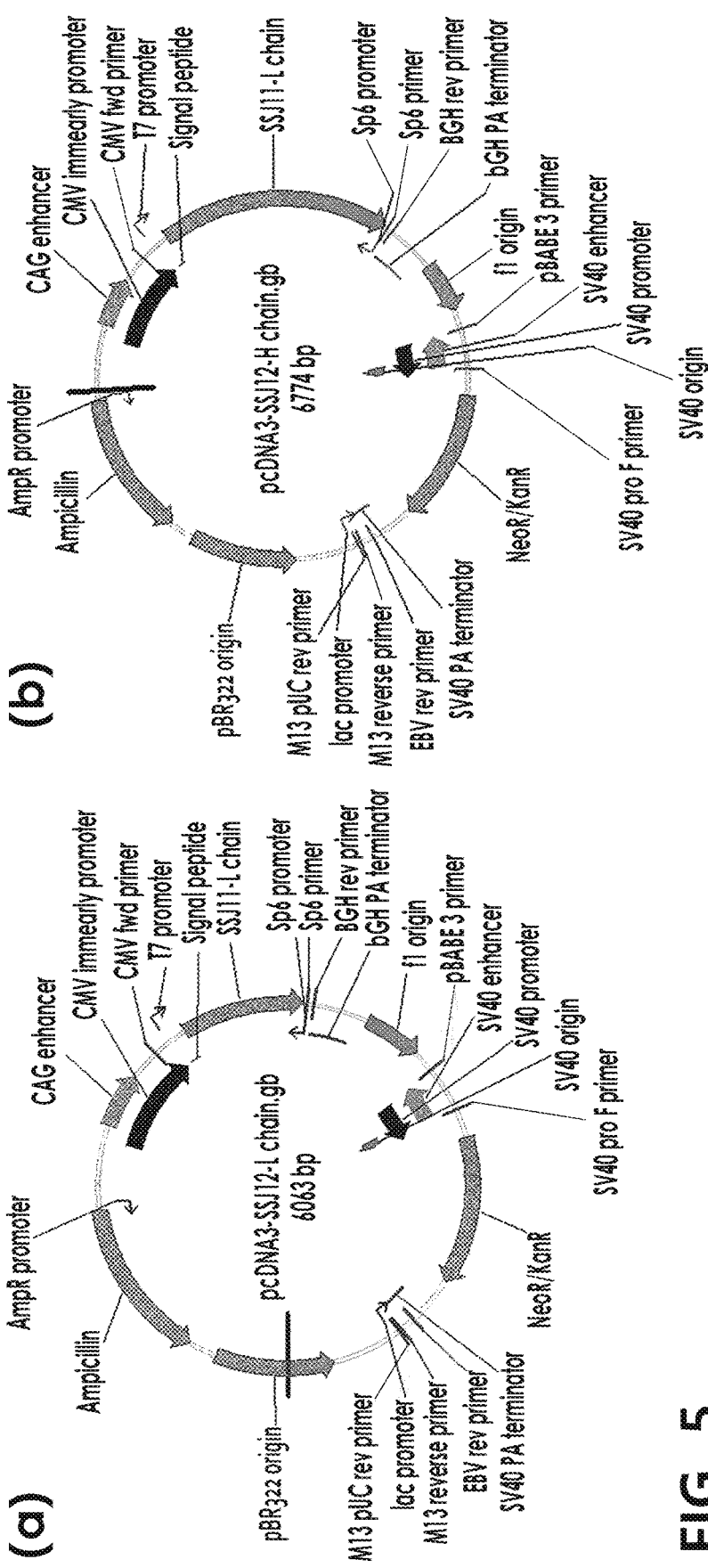
FIG. 5 shows a set of cleavage maps of a recombinant vector expressing a light chain (a) and a heavy chain (b) of a B266 antibody with high affinity.

When the immune reaction is detected, for example, an antibody specific to the antigen is detected from a mouse serum, a mouse spleen is collected to isolate spleen cells. Subsequently, the spleen cells are fused with any suitable myeloma cells, for example, P3U1, P3X63-Ag8, P3X63-Ag8-U1, P3NS1-Ag4, SP2/0-Ag14, or P3X63-Ag8-653 by a known method. A hybridoma is selected, and cloned by limiting dilution. Afterward, the hybridoma clone is evaluated for its ability to be a cell secreting an antibody capable of binding to an antigen by a method known in the art. Generally, ascites containing a high level of antibodies may be prepared by injecting positive hybridoma clones into the abdominal cavity of a mouse. In an exemplary embodiment of the present invention, a Trx1 antigen is prepared by transfecting *E. coli* with a recombinant vector having the cleavage map of FIG. 1(*a*). Afterward, the spleen of a rat immunized with the antigen is separated, and cells fused with myeloma cells (sp2/0) to produce an antibody reacting with Trx1 are identified by ELISA.

The exemplary monoclonal antibody of the present invention or antigen-binding fragment thereof may include (a) or (b) as follows, which may be referred to as B264 or B266-1, respectively:

(a) a light chain variable region including a light chain CDR1 consisting of the amino acid sequence of SEQ ID NO: 1, a light chain CDR2 consisting of the amino acid sequence of SEQ ID NO: 2 and a light chain CDR3 consisting of the amino acid sequence of SEQ ID NO: 3, and a heavy chain variable region including a heavy chain CDR1 consisting of the amino acid sequence of SEQ ID NO: 4, a heavy chain CDR2 consisting of the amino acid sequence of SEQ ID NO: 5 and a heavy chain CDR3 consisting of the amino acid sequence of SEQ ID NO: 6; or (b) a light chain variable region including a light chain CDR1 consisting of the amino acid sequence of SEQ ID NO: 7, a light chain CDR2 consisting of the amino acid sequence of SEQ ID NO: 8 and a light chain CDR3 consisting of the amino acid sequence of SEQ ID NO: 9, and a heavy chain variable region including a heavy chain CDR1 consisting of the amino acid sequence of SEQ ID NO: 10, a heavy chain CDR2 consisting of the amino acid sequence of SEQ ID NO: 11 and a heavy chain CDR3 consisting of the amino acid sequence of SEQ ID NO: 12.

The term "complementarity-determining region (CDR)" used herein refers to the amino acid sequence of a hypervariable region of the heavy chain or light chain in an immunoglobulin. Each of heavy chains (CDRH1, CDRH2 and CDRH3) and light chains (CDRL1, CDRL2 and CDRL3) has three CDRs, and these CDRs provide key contact residues when an antibody binds to an antigen or epitope.

The exemplary monoclonal antibody of the present invention or antigen-binding fragment thereof may include (c) or (d) as follows, and may be referred to as B264 or B266-1, respectively:

(c) a light chain variable region consisting of the amino acid sequence of SEQ ID NO: 13 and a heavy chain variable region consisting of the amino acid sequence of SEQ ID NO: 14; or (d) a light chain variable region consisting of the amino acid sequence of SEQ ID NO: 15 and a heavy chain variable region consisting of the amino acid sequence of SEQ ID NO: 16.

The exemplary monoclonal antibody of the present invention or antigen-binding fragment thereof may include (e) or (f) as follows, which may be referred to as B264 or B266, respectively:

(e) a light chain consisting of the amino acid sequence of SEQ ID NO: 17 and a heavy chain consisting of the amino acid sequence of SEQ ID NO: 18; or (f) a light chain consisting of the amino acid sequence of SEQ ID NO: 19 and a heavy chain consisting of the amino acid sequence of SEQ ID NO: 20.

The exemplary monoclonal antibody of the present invention is referred to as B264, B265, B266, B267, B268 or B269, and most preferably B264 or B266-1. B266-1 is a monoclonal antibody in which the Fc part of B266 is modified to human IgG1.

The structural unit of a naturally-occurring antibody generally includes a tetramer. The tetramer is generally composed of two pairs of identical polypeptide chains, and each pair has one full-length light chain (generally having a molecular weight of about 15 kDa) and one full-length heavy chain (generally having a molecular weight of about 50 to 70 kDa). The amino end of each of the light chain and heavy chain generally includes a variable region with about 100 to 110 or more amino acids, involved in antigen recognition. The carboxyl end of each chain defines a constant region generally involved in the function of an effector. A human light chain is generally classified into κ and λ light chains. A heavy chain is generally classified into μ, δ, γ, α and ε heavy chains, which define isotypes of an antibody, such as IgM, IgD, IgG, IgA and IgE, respectively. IgG has, but is not limited to, some subclasses including IgG1, IgG2, IgG3 and IgG4. IgM has, but is not limited to, subclasses including IgM1 and IgM2. Similarly, IgA is, but is not limited to, classified into subclasses including IgA1 and IgA2. In the full-length light and heavy chains, generally, variable and constant regions are connected by a "J" region with about 12 or more amino acids, and the heavy chain also includes a "D" region with about 10 or more amino acids. A variable region of each light chain/heavy chain pair generally forms an antigen-binding site. According to an exemplary embodiment of the present invention, in the monoclonal antibody of the present invention, the heavy chain may be an IgG1, IgG2a, IgG2b, IgG3, IgA or IgM isotype, and the light chain may be a κ chain or a λ chain, and preferably, a κ light chain and an IgG1 heavy chain.

In the monoclonal antibody of the present invention or antigen-binding fragment thereof, the "antigen-binding fragment thereof" means a fragment having an antigen-binding function, and includes Fab, F(ab'), F(ab')$_2$, Fv or a single-chain antibody molecule. Among the antibody-binding fragments, Fab is a structure having light and heavy chain variable regions and a light chain constant region and the first constant region (CH1) of a heavy chain, and includes one antigen-binding site. F(ab') is different from Fab in that it has a hinge region including one or more cysteine residues at the C-terminus of the heavy chain CH1 domain. F(ab')$_2$ is formed by a disulfide bond between cysteine residues in a hinge region of Fab'. Fv is the smallest antibody fragment only having a heavy chain variable region and a light chain variable region. Such an antibody fragment may be obtained using a protease, preferably gene recombination technology. For example, Fab may be obtained by, for example, digestion of the total antibody with papain, and a F(ab')$_2$ fragment may be obtained by digestion of the total antibody with pepsin.

The exemplary antibody of the present invention may be a chimeric antibody, a humanized antibody or a complete human antibody.

The chimeric antibody may be prepared by combining variable light chain and heavy chain (VL and VH) domains obtained from one type of antibody-producing cells and constant light chain and heavy chain domains obtained from another type of antibody using a recombination means. Generally, the chimeric antibody uses a rodent or rabbit variable domain and a human constant domain to produce an antibody usually having a human domain. The production of such a chimeric antibody is widely known in the art, and may be achieved by a standard means. It is further considered that the human constant region of the chimeric antibody of the present invention can be selected from an IgG1, IgG2, IgG3, IgG4, IgG5, IgG6, IgG7, IgG8, IgG9, IgG10, IgG11, IgG12, IgG13, IgG14, IgG15, IgG16, IgG17, IgG18 or IgG19 constant region.

The humanized antibody is engineered to contain an immunoglobulin domain further more similar to a human, and includes a complementarity-determining region of an animal-derived antibody. This is achieved by closely examining the sequence of a hypervariable loop of the variable region in a monoclonal antibody, and adapting the sequence to the structure of the human antibody chain.

The complete human antibody is an antibody molecule which includes CDRs such that the total sequences of both of a light chain and a heavy chain are derived from a human gene.

The present invention also provides a nucleic acid molecule(s) encoding a heavy chain and/or a light chain of a monoclonal antibody of the present invention or an antigen-binding fragment thereof.

The term "nucleic acid molecule" used herein encompasses DNA (gDNA and cDNA) and RNA molecules, and in the nucleic acid molecule, a nucleotide, which is a basic unit, also includes an analogue in which a sugar or base part is modified, as well as a natural nucleotide. The sequences of nucleic acid molecules encoding the heavy chain and light chain variable regions of the present invention may be modified. The modification includes additions, deletions, or non-conservative or conservative substitutions of nucleotides.

The nucleic acid molecule of the present invention is interpreted to also include a nucleotide sequence having substantial identity to the nucleotide sequence described above. The substantial identity refers to a nucleotide sequence exhibiting at least 80% homology, at least 90% homology in one specific example, or at least 95% homology in another specific example when the nucleotide sequence of the present invention is aligned to correspond to a different sequence as much as possible, and the aligned sequence is analyzed using an algorithm generally used in the art.

According to an exemplary embodiment of the present invention, the nucleic acid molecule encoding a light chain of the monoclonal antibody of the present invention may consist of the nucleotide sequence of SEQ ID NO: 21, and the nucleic acid molecule encoding a heavy chain of the monoclonal antibody of the present invention may consist of the nucleotide sequence of SEQ ID NO: 22.

According to another exemplary embodiment of the present invention, the nucleic acid molecule encoding a heavy chain of the monoclonal antibody of the present invention may consist of the nucleotide sequence of SEQ ID NO: 23, and the nucleic acid molecule encoding a light chain of the monoclonal antibody of the present invention may consist of the nucleotide sequence of SEQ ID NO: 24.

According to another exemplary embodiment of the present invention, a nucleic acid molecule encoding a light chain of the monoclonal antibody of the present invention may consist of a nucleotide sequence of SEQ ID NO: 27, and a nucleic acid molecule encoding a heavy chain thereof may consist of a nucleotide sequence of SEQ ID NO: 28.

The present invention also provides a recombinant vector, which includes the nucleic acid molecule encoding a heavy chain, the nucleic acid molecule encoding a light chain in the monoclonal antibody, or both of the nucleic acid molecules.

The recombinant vector system of the present invention may be constructed by various methods known in the art. The vector of the present invention may be typically constructed as a vector for cloning or a vector for expression. In addition, the vector of the present invention may be constructed using prokaryotic or eukaryotic cells as a host. For example, the vector of the present invention is an expression vector, and when prokaryotic cells are used as a host, the vector generally includes a potent promoter capable of performing transcription (e.g., a tac promoter, a lac promoter, a lacUV5 promoter, a lpp promoter, a pLλ promoter, a pRλ promoter, a rac5 promoter, an amp promoter, a recA promoter, an SP6 promoter, a trp promoter or a T7 promoter), a ribosome-binding site for the initiation of translation and transcription/translation termination sequences. When *E. coli* (e.g., HB101, BL21, DH5α, etc.) is used as a host cell, promoter and operator regions of an *E. coli* tryptophan biosynthesis pathway, and a pLλ promoter may be used as regulatory regions. When *Bacillus* is used as a host cell, the promoter of a toxic protein gene of *Bacillus thuringiensis* or any promoter capable of being expressed in *Bacillus* may be used as a regulatory region.

Meanwhile, the recombinant vector of the present invention may be manufactured by manipulating a plasmid used in the art (e.g., pCL, pSC101, pGV1106, pACYC177, ColE1, pKT230, pME290, pBR322, pUC8/9, pUC6, pBD9, pHC79, pIJ61, pLAFR1, pHV14, pGEX series, pET series or pUC19), a phage (e.g., λgt4·λB, λ-Charon, λΔz1 or M13) or a virus (e.g., SV40).

When the vector of the present invention is an expression vector and eukaryotic cells are used as a host, the vector generally has a promoter derived from the genome of mammalian cells (e.g., a metallothionine promoter, a β-actin promoter, a human hemoglobin promoter or a human muscle creatine promoter) or a promoter derived from a mammalian virus (e.g., an adenovirus late promoter, a vaccinia virus 7.5K promoter, SV40 promoter, a cytomegalovirus (CMV) promoter, a tk promoter of HSV, a mouse mammary tumor virus (MMTV) promoter, an LTR promoter of HIV, a Moloney virus promoter, an Epstein-Barr virus (EBV) promoter or a Rous sarcoma virus (RSV) promoter), and a polyadenylation sequence as a transcription termination sequence.

The recombinant vector of the present invention may be fused with a different sequence to facilitate the purification of an antibody expressed from the recombinant vector. The fused sequence may be, for example, a glutathione S-transferase (Amersham Pharmacia Biotech, USA); a maltose-binding protein (NEB, USA); FLAG (IBI, USA); a tag sequence such as 6×His (hexahistidine; Qiagen, USA), Pre-S1 or c-Myc; or a leading sequence such as ompA or pelB. In addition, since a protein expressed from the vector of the present invention is an antibody, the expressed antibody may be easily purified using a protein A column without an additional sequence for purification.

Meanwhile, the recombinant vector of the present invention includes an antibiotic-resistant gene generally used in the art as a selective marker, for example, a gene resistant to ampicillin, gentamicin, carbenicillin, chloramphenicol, streptomycin, kanamycin, geneticin, neomycin or tetracycline.

The vector expressing an antibody of the present invention may be a vector system expressing both of a light chain and a heavy chain using one vector, or a vector system respectively expressing a light chain and a heavy chain using two vectors. In the latter, two vectors are introduced into host cells through co-transformation and targeted transformation. The co-transformation is a method of selecting cells expressing both a light chain and a heavy chain after vector DNAs respectively encoding the light chain and the heavy chain are introduced into host cells. Targeted transformation is a method of selecting cells transformed by a vector including a light chain (or a heavy chain), transforming the selected cells expressing the light chain by a vector including a heavy chain (or a light chain), and finally selecting cells expressing both of the light chain and the heavy chain.

The present invention also provides host cells including a recombinant vector of the present invention. The host cells are cells transformed with the recombinant vector of the present invention. Host cells capable of stably and continuously cloning and expressing the vector of the present invention may be any host cells known in the art, and include prokaryotic host cells, for example, *Bacillus* sp. strains such as *Escherichia coli, Bacillus subtilis* and *Bacillus thuringiensis, Streptomyces, Pseudomonas* (e.g., *Pseudomonas putida*), *Proteus mirabilis* or *Staphylococcus* (e.g., *Staphylococcus carnosus*), but the present invention is not limited thereto.

As eukaryotic host cells suitable for the vector, multicellular fungi such as *Aspergillus* sp. strains belonging to the Phylum Ascomycota and *Neurospora crassa*, and unicellular fungi including enzymes such as yeasts such as *Pichia pastoris, Saccharomyces cerevisiae* and *Schizosaccharomyces*, other low eukaryotic cells, high eukaryotic cells such as insect-derived cells, and cells derived from a plant or mammal may be used.

The term "transfection" used herein refers to introduction of a gene of interest into host cells using the recombinant vector of the present invention, and is used with the same meaning as "transformation." Therefore, the "transfection" and/or "transformation" into host cells may be performed by suitable standard technology known in the art according to host cells, including methods of introducing a nucleic acid into an organism, cells, tissue or an organ. Such methods include electroporation, protoplast fusion, calcium phosphate ($CaPO_4$) precipitation, calcium chloride ($CaCl_2$) precipitation, stirring using a silicon carbide fiber, agrobacteria-mediated transformation, PEG, dextran sulfate, Lipofectamine and drying/inhibition-mediated transformation, but the present invention is not limited thereto.

The present invention also provides an epitope of a human Trx1 antigen consisting of any one amino acid sequence selected from the group consisting of SEQ ID NOs: 32 to 34 and 172 to 176.

Figure 15C:
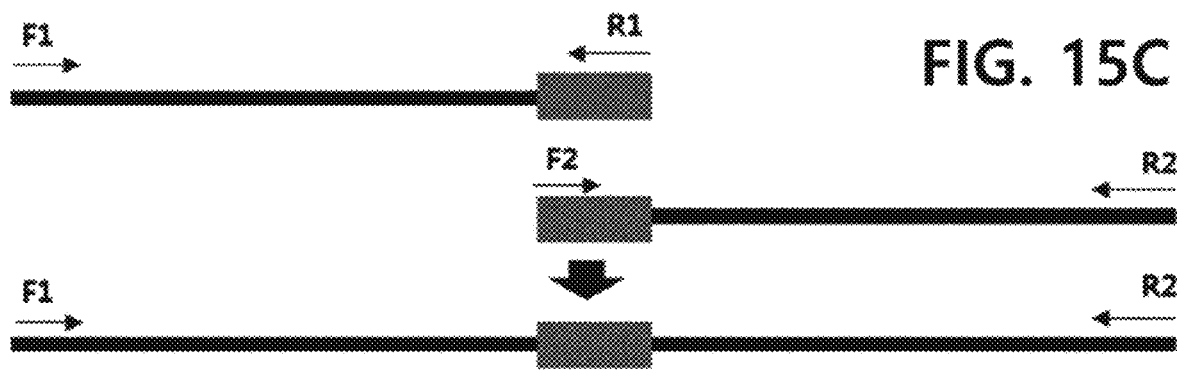
FIG. 15C is a schematic diagram of fusion PCR for manufacturing a hTrx1 mutant gene, which results from DNA fragment amplification and overlapping PCR, which are sequentially performed.

The inventors confirmed that although hTrx1 and CaTrx1 have an amino acid homology of 82%, two types of antibodies against hTrx1 according to the present invention do not bind to CaTrx1 (FIGS. 11 and 15A). Accordingly, eight parts at which the amino acid sequences of hTrx1 and CaTrx1 are different were identified (FIG. 15B), and gene cassettes for expressing hTrx1 mutant proteins were manufactured to clone the genes (FIGS. 15C to 15F). The cloned genes were transformed into an N293F cell line, the expression of 8 types of hTrx1 mutant proteins was confirmed (FIG. 16), and each mutant protein was purified (FIG. 17), followed by confirming the binding strengths with antibody B266-1 (hTrx1-hIgG1) and with antibody B264 (hTrx1-mIgG1).

Figure 18A:
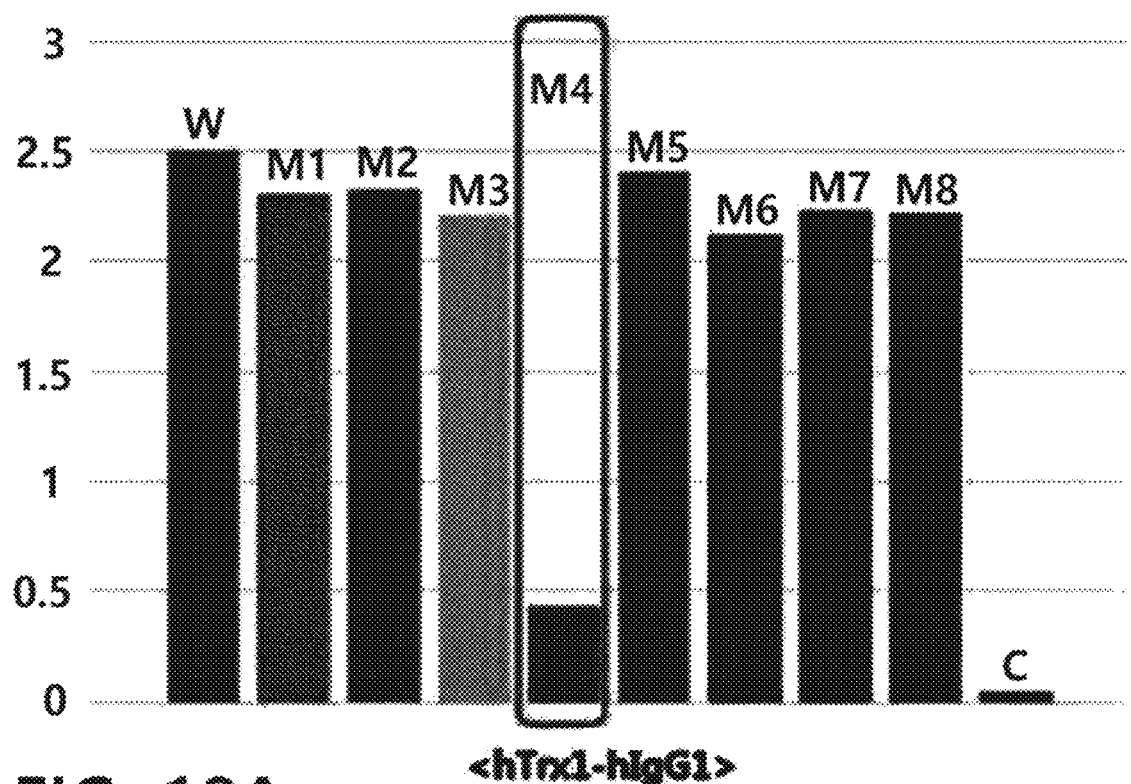
Figure 18B:
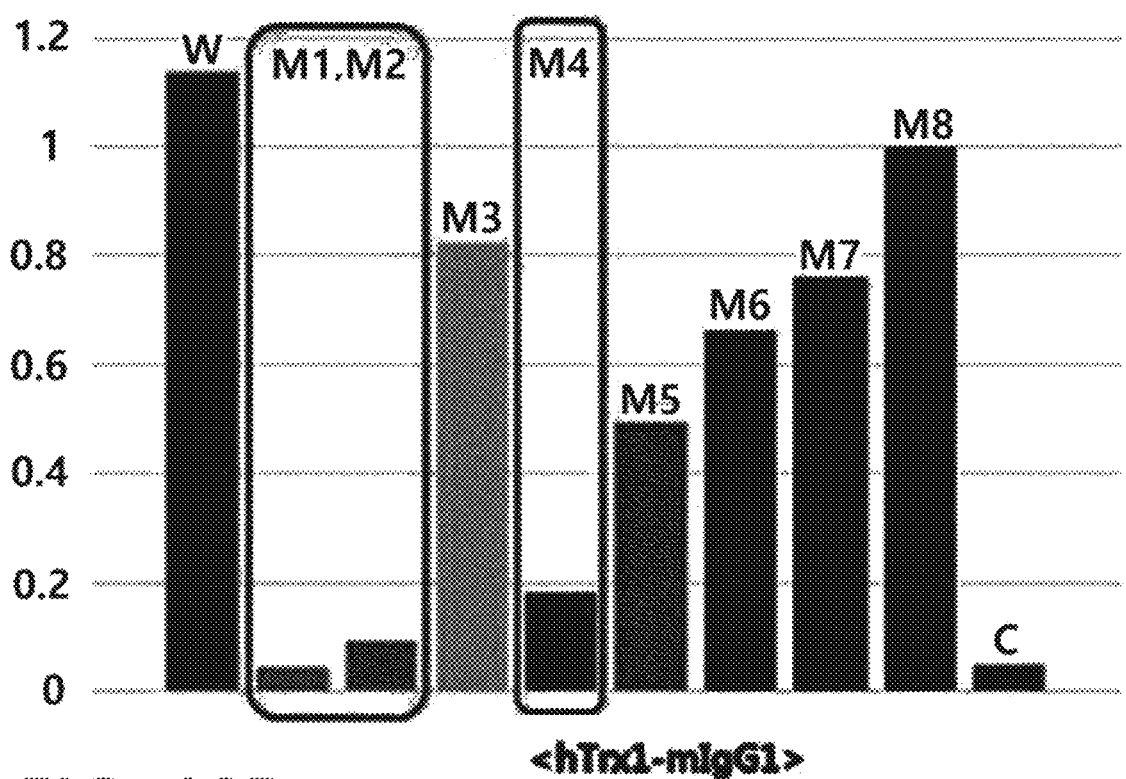

As shown in FIGS. 18A to 18C, it was confirmed that binding between the antibody B266-1 and a M4 mutant protein (YSNVIFGNMV; SEQ ID NO: 184) was decreased compared to hTrx1, and bindings between the antibody B264 and M1 (QIESKTAEIEGKED; SEQ ID NO: 182), M2 (QEALDAHAALSS; SEQ ID NO: 183) and M4 mutant proteins were decreased compared to hTrx1. Therefore, it was confirmed that the antibodies B266-1 and B264 are most likely to share an M4 site of the binding sites.

In addition, a microarray analysis was performed using 108 peptides manufactured by overlapping the amino acid sequence of a hTrx1 protein by one amino acid residue (FIGS. 19 and 20), and epitopes of the antibodies B266-1 and B264 were identified through heatmap evaluation, as shown in Table 25 (FIGS. 21A to 21D and 22A to 22F).

The present invention also provides a nucleic acid molecule encoding the above-described epitope of the Trx1 antigen, a recombinant vector containing the same, and a host cell containing the recombinant vector.

The nucleic acid molecule of the epitope of the Trx1 antigen according to the present invention may consist of any one amino acid sequence selected from the group consisting of SEQ ID NOs: 32 to 34 and 172 to 176.

Descriptions of the nucleic acid molecule encoding the above-described epitope, the recombinant vector containing the same, and the host cell containing the recombinant vector are the same as those of the antibody of the present invention described above, and thus will be omitted.

The present invention also provides a method of preparing a monoclonal antibody specifically binding to thioredoxin-1 or an antigen-binding fragment thereof, which includes culturing the host cells.

The culture of host cells to prepare an antibody or antigen-binding fragment thereof may be performed in a suitable medium known in the art under culture conditions. The culture process may be easily adjusted according to a strain by one of ordinary skill in the art. Cell culture is classified by suspension culture or attachment culture depending on a growth method, and batch culture, fed-batch culture or continuous culture according to a culture method. The medium used in culture has to suitably satisfy requirements for specific strains.

The medium used in animal cell culture includes various carbon sources, nitrogen sources, and trace elements. Examples of carbon sources used herein may be carbohydrates such as glucose, sucrose, lactose, fructose, maltose, starch and cellulose, lipids such as soybean oil, sunflower oil, castor oil and coconut oil, fatty acids such as palmitic acid, stearic acid and linoleic acid, alcohols such as glycerol and ethanol, and organic acids such as acetic acid. These carbon sources may be used independently or in combination. Examples of nitrogen sources used herein include organic nitrogen sources such as peptones, yeast extracts, beef stock, malt extracts, corn steep liquor (CSL) and soybean powder, and inorganic nitrogen sources such as urea, ammonium sulfate, ammonium chloride, ammonium phosphate, ammonium carbonate and ammonium nitrate. These nitrogen sources may be used independently or in combination. The medium may include potassium dihydrogen phosphate, dipotassium hydrogen phosphate and a corresponding sodium-containing salt as a phosphorus source.

In addition, the medium may contain a metal salt such as magnesium sulfate or iron sulfate. In addition, an amino acid, a vitamin, and a suitable precursor may be included.

During culture, compounds such as ammonium hydroxide, potassium hydroxide, ammonia, phosphoric acid and sulfuric acid may be added to a cell culture by a suitable method to adjust a pH of the cell culture. In addition, the generation of bubbles may be inhibited using a foaming agent such as fatty acid polyglycol ester during culture. In addition, to maintain an aerobic condition of the cell culture, oxygen or an oxygen-containing gas (e.g., air) is injected into the cell culture. The temperature of the cell culture is generally 20 to 45° C., and preferably 25 to 40° C.

The antibody obtained by culturing host cells may be used without purification, or may be used by purification with high purity using various conventional methods, for example, dialysis, salt precipitation, and chromatography. Among these methods, chromatography is most widely used, and the types and order of columns may be selected for ion exchange chromatography, size exclusion chromatography, or affinity chromatography according to the characteristic of an antibody or a culture method.

The present invention provides a breast cancer diagnostic kit which includes the monoclonal antibody of the present invention or antigen-binding fragment thereof, and a method of providing information necessary for breast cancer diagnosis using the same.

The term "diagnosis" used herein refers to confirmation of the presence or feature of a pathological state. For the purpose of the present invention, diagnosis is to confirm whether breast cancer occurs or not.

The thioredoxin-1 protein is a breast cancer diagnostic marker, and highly expressed in breast cancer tissue, compared with normal breast tissue.

According to an exemplary embodiment of the present invention, the breast cancer diagnostic kit may be an enzyme linked immunosorbent assay (ELISA) kit, and preferably, one or more selected from the group consisting of direct ELISA, indirect ELISA, direct sandwich ELISA and indirect sandwich ELISA. In an exemplary embodiment of the present invention, two types of antibodies included in the sandwich ELISA kit include a monoclonal antibody B266-1 as a coating antibody, and a monoclonal antibody B264 as a detection antibody.

The breast cancer diagnostic kit of the present invention may further include a tool or reagent known in the art, which is used in immunological analysis, in addition to an antibody against Trx1.

Here, the immunological analysis may be carried out with any of the methods capable of measuring the binding of an antibody to an antigen. Such methods are known in the art include, for example, western blotting, ELISA, radioimmunoprecipitation, radial immunodiffusion, an immunofluorescence assay, immunoblotting, Ouchterlony immunodiffusion, rocket immunoelectrophoresis, immunohistochemical staining, an immunoprecipitation assay, a complement fixation assay, an immunochromatographic assay, FACS, and a protein chip assay, but the present invention is not limited thereto.

As a tool or reagent used in immunological analysis, a suitable carrier or support, a marker capable of producing a detectable signal, a solubilizer, a cleaning agent, or a stabilizer may be included. When a marker is an enzyme, suitable carriers include a substrate capable of measuring enzyme activity, a suitable buffer solution, a secondary antibody labeled with a chromogenic enzyme or a fluorescent material, a chromogenic substrate or a reaction stopping agent, but the present invention is not limited thereto.

The antibody against Trx1 included in the kit of the present invention is preferably fixed to a suitable carrier or support using various methods disclosed in a document, and examples of suitable carriers and supports include PBS, polystyrene, polyethylene, polypropylene, polyester, polyacrylonitrile, a fluorine resin, agarose, cellulose, nitrocellulose, dextran, Sephadex, Sepharose, a liposome, carboxymethyl cellulose, polyacrylamide, polystyrene, gabbro, filter paper, an ion exchange resin, a plastic film, a plastic tube, a polyamine-methyl vinyl-ether-maleic acid copolymer, an amino acid copolymer, an ethylene-maleic acid copolymer, nylon, a metal, glass, a glass bead, and a magnetic particle. Other solid supports include a cell culture plate, an ELISA plate, a tube and a polymer film. The support may have any possible shape, for example, a spherical (bead), cylindrical (test tube or the inside of well), or a planar (sheet or test strip) shape.

The marker capable of producing a detectable signal is able to qualitatively or quantitatively measure the formation of an antigen-antibody complex, and may be, for example, an enzyme, a fluorescent material, a ligand, a luminous material, a microparticle, a redox molecule or a radioisotope. As an enzyme, β-glucuronidase, β-D-glucosidase, a urease, a peroxidase (e.g., horseradish peroxidase), alkaline phosphatase, acetylcholinesterase, glucose oxidase, a hexokinase, malate dehydrogenase, glucose-6-phosphate dehydrogenase, invertase, or a luciferase may be used. As a fluorescent material, fluorescein, isothiocyanate, rhodamine, phycoerythrin, phycocyanin, allophycocyanin, or fluorescein isothiocyanate may be used. As a ligand, a biotin derivative may be used, and as a luminous material, acridinium ester or a luciferin may be used. As a microparticle, colloidal gold or colored latex may be used, and as a redox molecule, ferrocene, a ruthenium complex, a viologen, a quinone, a Ti ion, a Cs ion, diimide, 1,4-benzoquinone or hydroquinone may be used. As a radioisotope, $^3$H, $^{14}$C, $^{32}$P, $^{35}$S, $^{36}$Cl, $^{51}$Cr, $^{57}$Co, $^{58}$Co, $^{59}$Fe, $^{90}$Y, $^{125}$I, $^{131}$I, or $^{186}$Re may be used. However, other than the materials listed above, any one capable of being used in immunological analysis may be used.

As an enzyme chromogenic substrate, for example, when horseradish peroxidase (HRP) is selected as an enzyme marker, a solution containing 3-amino-9-ethylcarbazole, 5-aminosalicylic acid, 4-chloro-1-naphthol, o-phenylenediamine, 2,2'-azino-bis(3-ethylbenzothiazoline-6-sulfonic acid), 3,3-diaminobenzidine, 3,3',5,5'-tetramethylbenzidine, o-dianisidine or 3,3-dimethoxybenzidine may be used as a substrate. In addition, when an alkaline phosphatase is selected as an enzyme marker, a solution containing 5-bromo-4-chloro-3-indolyl phosphate, nitroblue tetrazolium or p-nitrophenyl phosphate may be used as a substrate. In addition, when β-D-galactosidase is selected as an enzyme marker, a solution containing o-nitrophenyl-β-D-galactoside or 5-bromo-4-chloro-3-indolyl-β-D-galactopyranoside may be used as a substrate. Other than these, various enzymes and enzyme chromogenic substances, which are known in the art, may be used.

According to an exemplary embodiment of the present invention, the method of providing information necessary for breast cancer diagnosis of the present invention may be performed with the following steps:

(a) bringing any one type of monoclonal antibody of the present invention or antigen-binding fragment thereof into contact with a biological sample isolated from a subject suspected of having breast cancer;

(b) measuring an expression level of the thioredoxin-1 protein binding to the monoclonal antibody or an antigen-binding fragment thereof in the biological sample through the formation of an antigen-antibody complex; and (c) comparing the expression level of the thioredoxin-1 protein, measured in step (b) with that of a control and, if the protein expression level is higher than that of the control, determining the subject to be a breast cancer patient.

According to another exemplary embodiment of the present invention, a method of providing information necessary for the diagnosis of breast cancer may be performed with the following steps:

(a) coating a solid support with a monoclonal antibody or an antigen-binding fragment thereof, including light chains CDR1 to CDR3 and heavy chains CDR1 to CDR3 of antibody B266 or B266-1, a monoclonal antibody or an antigen-binding fragment thereof, including a light chain variable region and a heavy chain variable region of antibody B266 or B266-1, or antibody B266 or B266-1 or an antigen-binding fragment thereof;

(b) applying a biological sample isolated from a subject suspected of having breast cancer to the coated solid support;

(c) removing an unbound sample;

(d) applying a monoclonal antibody or an antigen-binding fragment thereof, including light chains CDR1 to CDR3 and heavy chains CDR1 to CDR3 of antibody B264, a monoclonal antibody or an antigen-binding fragment thereof, including a light chain variable region and a heavy chain variable region of antibody B264, or antibody B264 or an antigen-binding fragment thereof to the solid support;

(e) removing an unbound monoclonal antibody or antigen-binding fragment thereof;

(f) measuring an expression level of Trx1 protein; and (g) comparing the expression level of the Trx1 protein, measured in Step (f), with that of a control, and, if the protein expression level is higher than that of the control, determining the subject to be a breast cancer patient.

The term "isolated biological sample" used herein includes tissue (breast tissue), cells (breast cells), whole blood, plasma, serum, blood, saliva, synovial fluid, urine, sputum, lymphatic fluid, cerebrospinal fluid, a tissue autopsy sample (brain, skin, lymph nodes, spinal cord or the like), a cell culture supernatant, or ruptured eukaryotic cells, which is different in expression level of the Trx1 protein, which is a breast cancer marker, and includes a sample derived from a primary lesion or metastatic lesion. These biological samples, which are manipulated or not manipulated, may be reacted with the monoclonal antibody of the present invention to confirm an expression level of the Trx1 protein.

The term "subject" used herein includes mammals including a cow, a pig, sheep, a chicken, a dog and a human, birds, etc., and any subject suspected of having breast cancer without limitation.

Hereinafter, the present invention will be described in detail with reference to examples to help in understanding the present invention. However, examples according to the present invention may be modified into a variety of different forms, and it should not be construed that the scope of the present invention is limited to the following examples. The examples of the present invention are provided to more completely explain the present invention to those of ordinary skill in the art.

EXAMPLES

Example 1

Preparation of Human Thioredoxin-1 (Trx1) Antigen 1-1. Preparation of Trx1 Expression Vector A gene was synthesized based on the *E. coli* codon usage to express the gene encoding the human thioredoxin-1 protein in *E. coli*. A sequence of the synthesized human thioredoxin-1 gene is shown in Table 1 below.

TABLE 1

| | Base sequence |
|---|---|
| Trx 1 gene | ATGGTCAAACAGATCGAATCAAAAACCGCATTTCAAGAA GCCCTGGACGCCGCTGGTGACAAACTGGTCGTGGTGGAC TTTAGTGCTACCTGGTGCGGCCCGTGTAAAATGATTAAA CCGTTTTTCCATAGCCTGTCTGAAAAATACAGTAACGTT ATCTTTCTGGAAGTGGATGTTGATGACTGCCAGGACGTC GCGAGCGAATGCGAAGTGAAATGTATGCCGACGTTCCAG TTTTTCAAAAAAGGTCAAAAAGTCGGTGAATTTAGCGGT GCCAACAAAGAAAAACTGGAAGCCACGATTAACGAACTG GTG (SEQ ID NO: 29) |

A primer sequence used to amplify the human thioredoxin-1 gene is shown in Table 2 below.

TABLE 2

| hTrx1-For | TAATGGTCAAACAGATCGAATC (SEQ ID NO: 30) |
|---|---|
| hTrx1-Rev | CACCAGTTCGTTAATCGTGGTAATGAAAGCT (SEQ ID NO: 31) |

To amplify a gene for cloning in a plasmid, a polymerase chain reaction (PCR) was performed. 10 pmol of a gene synthesized as a template, 10 pmol each of primers (hTrx1-For and hTrx1-Rev), dNTPs (each 2.5 mM), Exprime taq polymerase, and a buffer solution were mixed. This solution was reacted for 35 cycles at 95° C. for 2 minutes, at 95° C. for 30 seconds, at 55° C. for 30 seconds, and at 70° C. for 20 seconds, and further reacted at 70° C. for 2 minutes, and then the reaction was terminated. The amplified gene was purified, and then to clone an EcoRV site present in the multi-cloning site (MCS) of a pUC57 plasmid, the plasmid was treated with the corresponding restriction enzyme and purified. The plasmid treated with the purified gene and the restriction enzyme, a ligase and a buffer solution were mixed and reacted. To transform *E. coli* DH5α with the plasmid, a *E. coli* DH5α competent cell line was warmed at 4° C., mixed with a plasmid-mixed solution, and reacted at 4° C. for 30 minutes. After the reaction, the cells were subjected to heat shock at 42° C. for 30 seconds, stabilized at 4° C. for 2 minutes, dispensed on a Luria-Bertani (LB) solid medium containing an antibiotic (50 ug/mL of ampicillin) for uniform absorption, and cultured at 37° C. for 16 hours or more. A plasmid having the human thioredoxin-1 gene was screened from colonies grown in the cultured medium.

1-2. Trx1 Expression and Purification

The screened plasmid having the human thioredoxin-1 gene was purified, and then to express the protein, an *E. coli*

BL21 strain was transformed with the purified plasmid according to the method described above. To express the thioredoxin-1 protein from the transformed strain, the strain was cultured in an LB broth containing an antibiotic to $OD_{600}$=0.5 at 37° C., and further cultured for 3 hours by adding isopropyl β-D-thiogalactopyranoside (IPTG) so that a concentration became 1 mM. Afterward, SDS-PAGE was performed to confirm protein expression. To purify the protein, the obtained cell line was disrupted using ultrasonication and then centrifuged (12,000 rpm, 30 min, 4° C.), thereby obtaining a supernatant. A commercially available anti-thioredoxin I antibody (LF-MA0055, Abfrontier) was added to the obtained supernatant to bind to the expressed thioredoxin-1, Protein A/G PLUS-Agarose® (sc-2003, Santa Cruz, Protein A/G agarose resin) which bound to the antibody was added to react therewith, and then centrifugation and purification were performed. Afterward, the purity and molecular weight of the resulting product were confirmed through SDS-PAGE.

Example 2

Production and Purification of Trx1-Specific Monoclonal Antibody 2-1. Immunization of Mouse The purified human thioredoxin-1 protein was mixed with an adjuvant and then injected into a mouse (BALB/c), and the mouse blood was collected and subjected to ELISA to confirm antibody production. After two immunizations, it was confirmed that an antibody titer (1:5,000) increases properly.

2-2. Cell Fusion and Preparation of Hybridoma

A B lymphocyte was isolated from the spleen extracted from the immunized mouse, and fused with cultured myeloma cells (sp2/0). The fused cells were cultured in a medium (HAT medium) containing hypoxanthine, aminopterin and thymidine, and cells (hybridomas) in which only a myeloma cell and a B lymphocyte are fused were selectively cultured.

2-3. Selection of Hybridoma Cells Producing Trx1-Specific Monoclonal Antibody

In the obtained hybridoma cells, three types of antibodies that react with the human thioredoxin-1 protein were confirmed through ELISA. The hybridoma producing an antibody that reacts with an antigen was selected from the ELISA-positive cells using a limiting dilution method.

2-4. Production and Purification of Monoclonal Antibody

The obtained three types of hybridomas were injected into mice, and then ascites was obtained from each mouse and purified using protein A affinity chromatography. The purified antibody was identified by SDS-PAGE.

Example 3

Identification of Isotype of Monoclonal Antibody

The three antibody isotypes obtained in Example 2 were confirmed using a Pierce™ Rapid ELISA Mouse mAb Isotyping Kit (Pierce, Cat. 37503, mouse monoclonal antibody isotyping kit).

As a result, as shown in FIG. 1(b), it was confirmed that the heavy chain of a monoclonal antibody 2B4 is IgG1, the heavy chain of a monoclonal antibody 8F3 is IgG12a, and the heavy chain of a monoclonal antibody 9G7 is IgG2b, and the light chains are all kappa types.

Example 4

Analyses of Amino Acid Sequences of Monoclonal Antibodies 9G7(AB1) and 2B4(AB2)

The heavy chain and light chain amino acid sequences of the monoclonal antibodies 9G7(AB1) and 2B4(AB2) of the three types of monoclonal antibodies obtained in Example 2 were analyzed. As a sequence capable of being fused with an Fc region, which is suitable for back-translation and recombination expression, an amino acid sequence was determined. The sequence determined by IMTG gap alignment was aligned, and hypermutated and complete CDR3 parts were found using a hypermutation table. The sequences were identified using accurate mass peptide maps (FIGS. 2 and 3), and hypermutation and CDR3s were confirmed using MS/MS spectra.

Example 5

Comparison of Affinity and Determination of Antibody Using ELISA

A hypermutation-available position was determined in the amino acid sequence obtained through the above-described process, and therefore, genes were synthesized by altering amino acid sequences of four types (B266, B297, B268 and B269) of 9G7(AB1) and two types (B264 and B265) of 2B4(AB2). The six types of antibodies obtained above (B264~B269) were expressed, and then affinity of each antibody to an antigen was confirmed through ELISA (the numbers after "T" in Tables 3 to 5 represent production batch numbers, respectively).

Affinities to three types of antigens, that is, naked Trx1, Fc-binding Trx1 (Trx1-Fc) and His-tagged Trx1 (Trx1-His) were determined through direct ELISA, and the results are sequentially shown in Tables 3 to 5. As shown in Tables 3 to 5, B264 as IgG1(κ) and B266 as IgG2b(κ) exhibited the highest affinity to three types of antigens.

TABLE 3

| Results of reactions to naked Trx1 antigens | |
|---|---|
| Antibody ID | 5000X(OD Value) |
| AB264-T150514-7 | 2.0575 |
| B265-T150514-10 | 1.3225 |
| AB264-T150514-8 | 1.1635 |
| B265-T150514-9 | 0.9515 |
| B267-T150519-5 | 0.8155 |
| B269-T150519-9 | 0.735 |
| B268-T150519-8 | 0.716 |
| B268-T150519-7 | 0.670 |
| B266-T150519-3 | 0.6625 |
| B266-T150519-4 | 0.6615 |
| B269-T150519-10 | 0.626 |
| B267-T150519-6 | 0.522 |

TABLE 4

| Results of reactions to Trx1-Fc antigens | |
|---|---|
| Antibody ID | 5000X(OD Value) |
| AB264-T150514-7 | 1.171 |
| AB264-T150514-8 | 0.494 |
| B265-T150514-10 | 0.378 |
| B265-T150514-9 | 0.273 |
| B266-T150519-3 | 0.198 |

TABLE 4-continued

Results of reactions to Trx1-Fc antigens

| Antibody ID | 5000X(OD Value) |
|---|---|
| B266-T150519-4 | 0.181 |
| B267-T150519-5 | 0.043 |
| B267-T150519-6 | 0.023 |
| B268-T150519-8 | 0.015 |
| B268-T150519-7 | 0.003 |
| B269-T150519-9 | 0.002 |
| B269-T150519-10 | −0.001 |

TABLE 5

Results of reactions to Trx1-His antigens

| Antibody ID | 5000X(OD Value) |
|---|---|
| AB264-T150514-7 | 1.996 |
| B265-T150514-10 | 1.465 |
| AB264-T150514-8 | 1.142 |
| B265-T150514-9 | 1.03 |
| B267-T150519-5 | 0.857 |
| B268-T150519-8 | 0.783 |
| B269-T150519-9 | 0.77 |
| B268-T150519-7 | 0.761 |
| B269-T150519-10 | 0.717 |
| B266-T150519-3 | 0.696 |
| B266-T150519-4 | 0.667 |
| B267-T150519-6 | 0.554 |

The amino acid sequences of the antibodies B264 and B266 with high affinity are shown in Table 6 below.

TABLE 6

| | Amino acid sequence |
|---|---|
| B264 light chain | DVLMTQTPLSLPVSLGDQASISCRSSQSIVHSNGNTY LEWYLQKPGQSPKLLIYKVSNRFSGVPDRFSGSGSGT DFTLKISRVEAEDLGVYYCFQGSHVPYTFGGGTKLEI KRADAAPTVSIFPPSSEQLTSGGASVVCFLNNFYPKD INVKWKIDGSERQNGVLNSWTDQDSKDSTYSMSSTLT LTKDEYERHNSYTCEATHKTSTSPIVKSFNRNEC (SEQ ID NO: 17) |
| B264 heavy chain | QVQLQQSGAELARPGASVKMSCKASGYTFTSYTMHWV KQRPGQGLEWIGYINPTSDYTNYNQKFKDKATLTADK SSSTAYMQLSSLTSEDSAVYFCASEGGFLYYFDYWGQ GTTLTVSSASTTPPSVYPLAPGSAAQTNSMVTLGCLV KGYFPEPVTVTWNSGSLSSGVHTFPAVLQSDLYTLSS SVTVPSSTWPSETVTCNVAHPASSTKVDKKIVPRDCG CKPCICTVPEVSSVFIFPPKPKDVLTITLTPKVTCVV VDISKDDPEVQFSWFVDDVEVHTAQTQPREEQFNSTF RSVSELPIMHQDWLNGKEFKCRVNSAAFPAPIEKTIS KTKGRPKAPQVYTIPPPKEQMAKDKVSLTCMITDFFP EDITVEWQWNGQPAENYKNTQPIMDTDGSYFVYSKLN VQKSNWEAGNTFTCSVLHEGLHNHHTEKSLSHSPGK (SEQ ID NO: 18) |
| B266 light chain | QIVLTQSPAIMSASPGEKVTMTCSASSRISYMYWYQQ KPGTSPKRWIYDTSKLASGVPARFSGSGSGTSYSLTI STMEAEDAATYYCHQRSSYPTFGAGTKLELKRADAAP TVSIFPPSSEQLTSGGASVVCFLNNFYPKDINVKWKI DGSERQNGVLNSWTDQDSKDSTYSMSSTLTLTKDEYE RHNSYTCEATHKTSTSPIVKSFNRNEC (SEQ ID NO: 19) |
| B266 heavy chain | EVQLQQSGAELVKPGASVKLSCTASGFNIKDTFMHWV KQRPEQGLEWIGRIDPANGNTKYDPKFQGKATITADT SSNTAYLQLSSLTSEDTAVYYCALLQYSAMDYWGQGT SVTVSSAKTTPPSVYPLAPGCGDTTGSSVTLGCLVKG YFPESVTVTWNSGSLSSSVHTFPALLQSGLYTMSSSV TVPSSTWPSQTVTCSVAHPASSTTVDKKLEPSGPIST INPCPPCKECHKCPAPNLEGGPSVFIFPPNIKDVLMI SLTPKVTCVVVDVSEDDPDVQISWFVNNVEVHTAQTQ |

TABLE 6-continued

| | Amino acid sequence |
|---|---|
| | THREDYNSTIRVVSTLPIQHQDWMSGKEFKCKVNNKD LPSPIERTISKIKGLVRAPQVYILPPPAEQLSRKDVS LTCLVVGFNPGDISVEWTSNGHTEENYKDTAPVLDSD GSYFIYSKLNMKTSKWEKTDSFSCNVRHEGLKNYYLK KTISRSPG (SEQ ID NO: 20) |

Example 6

Production of Antibodies B264 and B266

6-1. Preparation of Plasmids Expressing Antibodies B264 and B266

Since the amino acid sequences of the antibodies B264 and B266 are identified as shown in Table 6, genes corresponding to the light chain and heavy chain of the respectively antibodies can be chemically synthesized. The synthesized gene sequences are shown in Table 7 below. The synthesized genes were cloned in pcDNA3.0.

TABLE 7

| | Gene sequence |
|---|---|
| B264 light chain | GACGTGCTGATGACACAGACACCACTCAGCCTCCCTGTGAGC CTGGGCGACCAGGCCTCTATTTCTTGCCGGTCTAGCCAGAGC ATCGTGCACTCCAACGGCAACACATACTTGGAGTGGTATCTA CAGAAGCCCGGCCAGTCCCCTAAGCTGCTGATATACAAGGT GTCTAACCGCTTCTCCGGCGTGCCCGACAGGTTCTCTGGCAG CGGCTCTGGCACCGACTTCACCCTCAAAATATCTAGGGTGGA GGCCGAGGACCTGGGCGTGTACTACTGCTTCCAGGGCTCCCA CGTTCCATACACATTCGGCGGCGGCACAAAGTTGGAAATTA AGCGCGCTGACGCAGCCCCAACAGTGAGCATCTTTCCTCCAT CCTCTGAACAACTTCACCTCTGGAGGAGCCTCTGTGGTGTGTT TCCTGAACAACTTCTACCCAAAGGACATCAATGTGAAGTGG AAGATTGATGGCTCTGAGAGACAGAATGGAGTGCTGAACTC CTGGACAGACCAGGACAGCAAGGACAGCACCTACAGTATGA GTAGCACCCTCACCCTGACCAAGGATGAATATGAGAGACAC AACTCCTACACTTGTGAGGCTACCCACAAGACCAGCACCAG CCCAATTGTCAAATCCTTCAACAGGAATGAGTGTTAA (SEQ ID NO: 21) |
| B264 heavy chain | CAGGTGCAGCTCCAGCAGTCCGGCGCCGAACTGGCCAGACCT GGCGCCAGCGTGAAGATGAGCTGCAAGGCCTCCGGCTACACA TTCACATCTTACACCATGCACTGGGTGAAGCAGAGACCCGGC CAGGGCCTGGAGTGGATTGGCTACATTAACCCAACATCCGAC TACAACTACAACCAGAAGTTCAAGGACAAGGCCACACTC ACCCTGACAAGTCTTCTAGCACAGCCTACATGCAGCTGTCT AGCCTGACAAGCGAGGACTCTGCCGTGTACTTCTGCGCCTCT GAGGGCGGCTTCCTGTACTACTTCGACTACGGGGCCAGGGC ACCACCCTGACCGTGTCCTCTGCCAAAACGACACCCCCATCT GTCTATCCACTGGCCCCTGGATCTGCTGCCCAAACTAACTCC ATGGTGACCCTGGGATGCCTGGTCAAGGGCTATTTCCCTGAG CCAGTGACAGTGACCTGGAACTCTGGATCCCTGTCCAGCGGT GTGCACACCTTCCCAGCTGTCCTGCAGTCTGACCTCTACACT CTGAGCAGCTCAGTGACTGTCCCCTCCAGCACCTGGCCCAGC GAGACCGTCACCTGCAACGTTGCCCACCCGGCCAGCAGCACC AAGGTGGACAAGAAATTGTGCCCAGGGATTGTGGTTGTAAG CCTTGCATATGTACAGTCCCAGAAGTATCATCTGTCTTCATC TTCCCCCCAAAGCCCAAGGATGTGCTCACCATTACTCTGACT CCTAAGGTCACGTGTGTTGTGGTAGACATCAGCAAGGATGAT CCCGAGGTCCAGTTCAGCTGGTTTGTAGATGATGTGGAGGTG CACACAGCTCAGACGCAACCCCGGGAGGAGCAGTTCAACAGC ACTTTCCGCTCAGTCAGTGAACTTCCCATCATGCACCAGGAC TGGCTCAATGGCAAGGAGTTCAAATGCAGGGTCAACAGTGCA GCTTTCCCTGCCCCCATCGAGAAAACCATCTCCAAAACCAAA GGCAGACCGAAGGCTCCACAGGTGTACACCATTCCACCTCCC AAGGAGCAGATGGCCAAGGATAAAGTCAGTCTGACCTGCATG ATAACAGACTTCTTCCCTGAAGACATTACTGTGGAGTGGCAG TGGAATGGGCAGCCAGCGGAGAACTACAAGAACACTCAGCCC ATCATGGACACAGATGGCTCTTACTTCGTCTACAGCAAGCTC AATGTGCAGAAGAGCAACTGGGAGGCAGGAAATACTTTCACC |

TABLE 7-continued

| | Gene sequence |
|---|---|
| | TGCTCTGTGTTACATGAGGGCCTGCACAACCACCATACTGAG<br>AAGAGCCTCTCCCACTCTCCTGGTAAATAA (SEQ ID NO: 22) |
| B266<br>light<br>chain | CAGATCGTGCTCACACAGTCTCCAGCCATCATGAGCGCCTCT<br>CCTGGCGAGAAGGTGACAATGACCTGCTCTGCCTCTAGCCGC<br>ATTTCTTACATGTACTGGTATCAGCAGAAGCCAGGCACCTCC<br>CCTAAGAGGTGGATATACGACACATCCAAGCTGGCCTCCGG<br>CGTGCCCGCCCGGTTCAGCGGCTCTGGCAGCGGCACAAGCT<br>ACTCCCTGACAATTAGCACGATGGAGGCCGAGGACGCCGCC<br>ACATACTACTGCCACCAGCGCTCGTCTACCCAACATTCGGC<br>GCCGGCACAAAATTGGAACTGAAGAGAGCTGACGCAGCCCC<br>AACAGTGAGCATCTTTCCTCCATCCTCTGAACAACTTACCTC<br>TGGAGGAGCCTCTGTGGTGTGTTTCCTGAACAACTTCTACCC<br>AAAGGACATCAATGTGAAGTGGAAGATTGATGGCTCTGAGA<br>GACAGAATGGAGTGCTGAACTCCTGGACAGACCAGGACAGC<br>AAGGACAGCACCTACAGTATGAGTAGCACCCTGACCCTGAC<br>CAAGGATGAATATGAGAGACACAACTCCTACACTTGTGAGG<br>CTACCCACAAGACCAGCACCAGCCCAATTGTCAAATCCTTCA<br>ACAGGAATGAGTGTTAA (SEQ ID NO: 23) |
| B266<br>heavy<br>chain | GAGGTGCAGTTACAACAGTCCGGCGCCGAGCTAGTGAAGCCA<br>GGCGCCAGCGTGAAGCTGTCTTGCACAGCCAGCGGCTTCAAC<br>ATTAAGGACACCTTCATGCACTGGGTGAAGCAGAGACCTGAG<br>CAGGGCTTAGAGTGGATTGGCCGGATCGACCCCGCCAACGGC<br>AACACAAAGTACGACCCAAAGTTCCAGGGCAAGGCCACAATT<br>ACCGCCGACACATCTTCCAACACAGCCTACCTCCAGCTGTCG<br>TCTCTCACCAGCGAGGACACCGCCGTGTACTACTGCGCCCTG<br>CTCCAGTACTCCGCGATGGACTACTGGGGCCAGGGCACATCT<br>GTGACCGTGTCTAGCGCCAAGACCACCCCACCATCCGTGTAC<br>CCACTCGCCCCAGGCTGCGGCGACACCACAGGCTCTAGCGTG<br>ACACTGGGCTGCCTGGTGAAGGGCTACTTCCCCGAGTCTGTG<br>ACAGTGACCTGGAACTCTGGCTCTCTGTCTAGCTCTGTGCAC<br>ACCTTCCCCGCCCTGCTGCAATCCGGCCTGTACACAATGTCT<br>TCTTCTGTGACAGTGCCTAGCTCTACATGGCCATCTCAGACA<br>GTGACATGCTCTGTGGCCCACCCCGCCTCTAGCACAACCGTG<br>GACAAGAAGCTGGAGCCATCCGGCCCTATTTCTACAATTAAC<br>CCTTGCCCTCCTTGCAAAGAATGCCACAAGTGCCCCGCCCCA<br>AACCTGGAGGGCGGCCCTTCTGTGTTCATTTTCCCTCCTAAC<br>ATTAAGGACGTGCTGATGATCAGCCTCACCCCAAAGGTGACA<br>TGCGTGGTGGTGGACGTGTCCGAGGACGACCCTGACGTGCAG<br>ATTTCTTGGTTCGTGAACAACGTGGAGGTGCACACCGCCCAG<br>ACCCAGACCCACCGGGAGGACTACAACTCCACCATTCGGGTG<br>GTGTCTACACTGCCTATTCAGCACCAGGACTGGATGAGCGGC<br>AAAGAGTTCAAGTGCAAGGTGAACAACAAGGACCTGCCATCT<br>CCTATTGAGAGAACAATTTCTAAGATTAAGGGCCTGGTGCGC<br>GCCCCTCAGGTGTACATTCTGCCTCCTCCCGCCGAGCAGCTG<br>AGCCGGAAGGACGTGTCCCTCACATGCCTCGTGGTGGGCTTC<br>AACCCTGGCGACATTAGCGTGGAGTGGACATCTAACGGCCAC<br>ACAGAAGAAAACTACAAGGACACAGCCCCTGTGCTCGACTCC<br>GACGGCTCTTACTTCATATACTCTAAGCTGAACATGAAAACA<br>TCTAAGTGGGAAAAGACCGACTCTTTCTCTTGCAACGTGCGG<br>CACGAGGGCCTGAAGAACTACTACCTCAAGAAAACCATTAGC<br>AGAAGTCCAGGCTAA (SEQ ID NO: 24) |

6-2. Expression and Purification of Antibodies B264 and B266

A HEK293 cell line was co-transfected with pcDNA3-SSJ11-L and pcDNA3-SSJ11-H to express a B264 antibody or pcDNA3-SSJ12-L and pcDNA3-SSJ12-H to express a B266 antibody, and cultured for 7 days. The cell line was cultured, and recombinant monoclonal antibodies secreted into the culture medium were collected and purified through protein A chromatography. An eluent containing the recombinant monoclonal antibodies was concentrated by ultrafiltration, and the antibodies were obtained with high purity using a 0.2-μm sterile filter.

Figure 6:
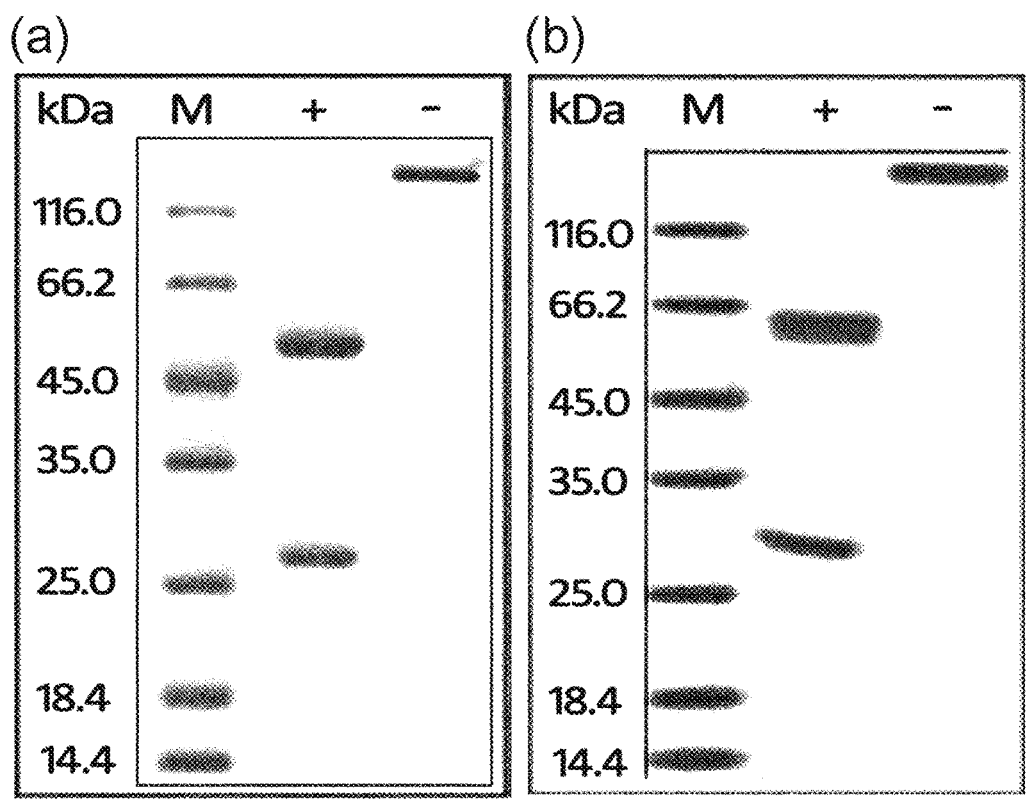
FIG. 6 shows results of identifying the reduced (+) and non-reduced (−) states of antibodies using SDS-PAGE, where (a) is the result for the antibody B264, and (b) is the result for the antibody B266.

The purity and size of the purified antibodies were determined through SDS-PAGE. As a result of SDS-PAGE, as shown in FIG. 6, it was confirmed that the antibodies B264 and B266 are expressed with sizes, for example, 47 kDa for the heavy chain and 25 kDa for the light chain under a reducing condition, and 150 kDa under a non-reducing condition, suggesting that the sizes correspond to estimated sizes.

Example 7

Confirmation of Pairing of Two Types of Monoclonal Antibodies Obtained Through Sandwich ELISA 100 μl of a coating buffer (0.015 M $Na_2CO_3$, 0.035 M $NaHCO_3$, 0.003 M $NaN_3$, pH9.6) and 100 ng of a coating antibody (B266) were mixed and dispensed to each well, and an O/N reaction was performed at 4° C. 200 μl of 1% BSA-containing PBS (PBSA; blocking buffer) per well was dispensed, and subjected to a reaction at room temperature for 60 minutes. Afterward, 20 μl of an antigen (50, 25, 12.5 or 0 ng) was dispensed, 80 μl of a detection antibody (biotin-labeled B264; B264-B) was dispensed, and the resulting mixture was reacted at 37° C. for 90 minutes. A reaction solution was removed, and washing was performed by dispensing 200 μl of PBS containing 0.05% Tween 20 (PBST; washing buffer) to each well. The above-described process was performed three times.

100 μl of streptavidin-HRP diluted 1:200 was treated in each well and reacted at 37° C. for 30 minutes. After a reaction solution was removed, washing was performed by dispensing 200 μl of PBS containing 0.05% Tween 20 (PBST; washing buffer) to each well. The above-described process was performed three times.

100 μl of a TMB solution was dispensed to each well and reacted under a dark condition at room temperature for 10 minutes, 100 μl of a 2.5 M sulfuric acid solution ($H_2SO_4$; stop buffer) was treated in each well, and the result was confirmed at 450 nm.

As a result, as shown in Table 8, the reaction value increases according to the concentration of an antigen, showing the detection of the antigen by these antibodies. However, since the O.D. value is high when there is no antigen, a performance improvement experiment using an antibody is needed.

TABLE 8

| Sandwich ELISA using B266 as coating antibody and B264 as detection antibody | | | | |
|---|---|---|---|---|
| Trx1 (ng/mL) | 0 | 12.5 | 25 | 50 |
| O.D.$_{450nm}$ | 0.828 | 1.226 | 1.506 | 2.257 |

Example 8

Alteration of Isotype of Fc Part for Improving Antibody Performance

Since the expression system of an antibody is transient transfection using a recombinant plasmid, rather than a hybridoma, among these recombinant plasmids, a plasmid having a heavy chain was co-transfected with a plasmid having a different isotype of heavy chain. That is, a plasmid having a gene encoding a different heavy chain, rather than pcDNA3-SSJ12-H of pcDNA3-SSJ12-L and pcDNA3-SSJ12-H used to express 9G7(AB1), was co-transfected.

Figure 7:
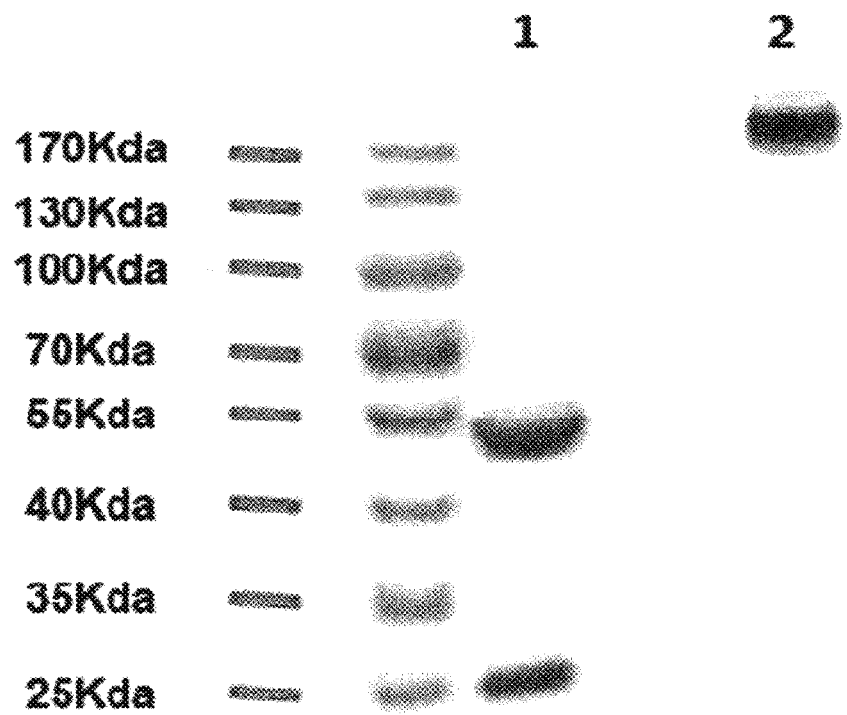
FIG. 7 shows results of identifying the reduced (+) and non-reduced (−) states of an antibody B266-1 using SDS-PAGE, in which the antibody B266-1 is prepared by modifying an Fc part of the antibody B266 to human IgG1.
Figure 8B:
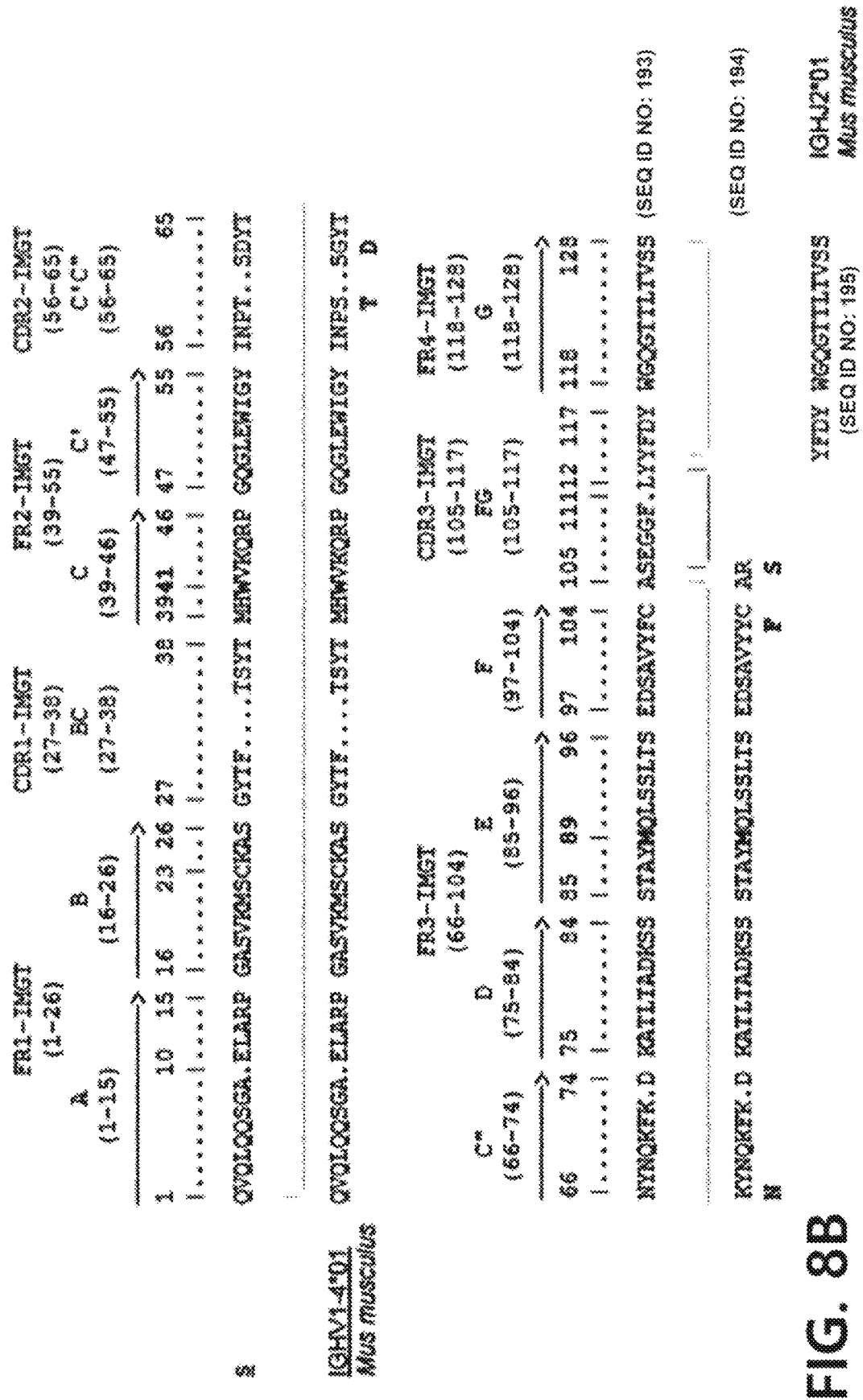
Figure 8D:
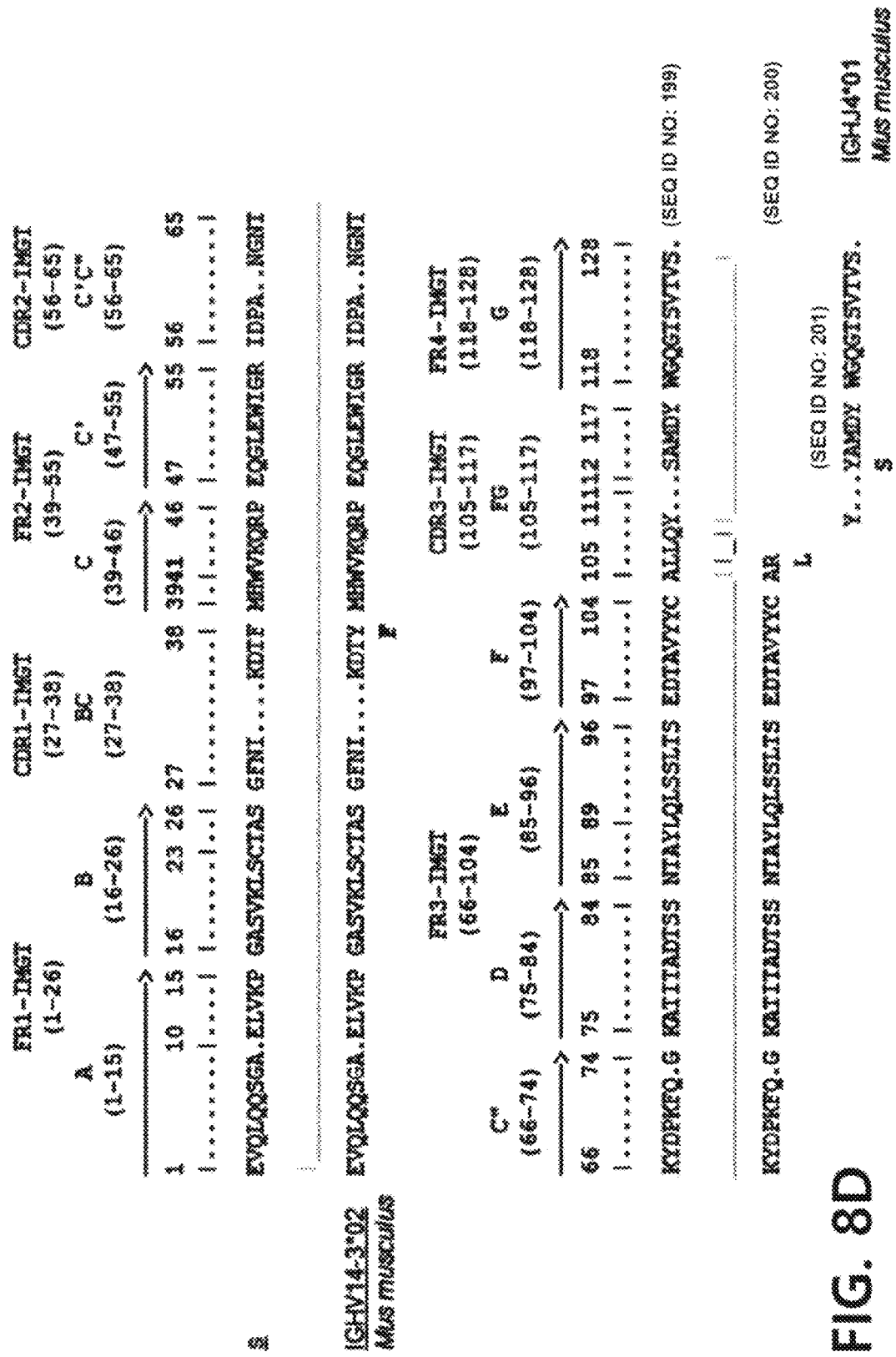

An antibody (B266-1) in which the Fc part of B266 is changed to human IgG1 was obtained by the above-described method. The characteristics of the antibody were determined through SDS-PAGE (FIG. 7).

CDR sequences of the finally selected monoclonal antibodies B264 and B266-1 were determined by fusion with an Fc region suitable for back translation and recombinant expression.

IMTG-gap alignment is IMTG database and "determined sequence" alignment, and the closest germline sequence and hypermutation were identified by a database search. The IMTG-gap alignment results for the light chain and heavy chain of each of the antibodies B266-1 and B264 are shown in FIGS. 8A to 8D, amino acid sequences of light chains CDR1 to CDR3 and heavy chains CDR1 to CDR3 are shown in Table 9, and amino acid sequences of a light chain variable region and a heavy chain variable region are shown in Table 10. In addition, the amino acid sequences and gene sequences of the light chains and heavy chains of B266-1 are shown in Table 11.

TABLE 9

|  | Amino acid sequence |
|---|---|
| Light chain CDR1 of B264 | QSIVHSNGNTY (SEQ ID NO: 1) |
| Light chain CDR2 of B264 | KVS (SEQ ID NO: 2) |
| Light chain CDR3 of B264 | CFQGSHVPYT (SEQ ID NO: 3) |
| Heavy chain CDR1 of B264 | GYTFTSYT (SEQ ID NO: 4) |
| Heavy chain CDR2 of B264 | INPTSDYTN (SEQ ID NO: 5) |
| Heavy chain CDR3 of B264 | FCASEGGFLYYFDY (SEQ ID NO: 6) |
| Light chain CDR1 of B266-1 | SRISY (SEQ ID NO: 7) |
| Light chain CDR2 of B266-1 | DTS (SEQ ID NO: 8) |
| Light chain CDR3 of B266-1 | CHQRSSYPTF (SEQ ID NO: 9) |
| Heavy chain CDR1 of B266-1 | GFNIKDTF (SEQ ID NO: 10) |
| Heavy chain CDR2 of B266-1 | IDPANGNT (SEQ ID NO: 11) |
| Heavy chain CDR3 of B266-1 | CALLQYSAMDY (SEQ ID NO: 12) |

TABLE 10

|  | Amino acid sequence |
|---|---|
| Light chain variable region of B264 | DVLMTQTPLSLPVSLGDQASISCRSSQSIVHSNGNT YLEWYLQKPGQSPKLLIYKVSNRFSGVPDRFSGSGS GTDFTLKISRVEAEDLGVYYCFQGSHVPYTFGGGTK LEIK (SEQ ID NO: 13) |
| Heavy chain variable region of B264 | QVQLQQSGAELARPGASVKMSCKASGYTFTSYTMHW VKQRPGQGLEWIGYINPTSDYTNYNQKFKDKATLTA DKSSSTAYMQLSSLTSEDSAVYFCASEGGFLYYFDY WGQGTTLTVSS (SEQ ID NO: 14) |
| Light chain variable | QIVLTQSPAIMSASPGEKVTMTCSASSRISYMYWYQ QKPGTSPKRWIYDTSKLASGVPARFSGSGSGTSYSL |

TABLE 10-continued

|  | Amino acid sequence |
|---|---|
| region of B266-1 | TISTMEAEDAATYYCHQRSSYPTFGAGTKLELK (SEQ ID NO: 15) |
| Heavy chain variable region of B266-1 | EVQLQQSGAELVKPGASVKLSCTASGFNIKDTFMHW VKQRPEQGLEWIGRIDPANGNTKYDPKFQGKATITA DTSSNTAYLQLSSLTSEDTAVYYCALLQYSAMDYWG QGTSVTVSS (SEQ ID NO: 16) |

TABLE 11

|  | Sequence |
|---|---|
| Amino acid sequence of B266-1 light chain | QIVLTQSPAIMSASPGEKVTMTCSASSRISYMYWYQQKP GTSPKRWIYDTSKLASGVPARFSGSGSGTSYSLTISTME AEDAATYYCHQRSSYPTFGAGTKLELKSVAAPSVFIFPP SDEQLKSGTASVVCLLNNFYPREAKVQWKVDNALQSGNS QESVTEQDSKDSTYSLSSTLTLSKADYEKHKVYACEVTH QGLSSPVTKSFNRGEC (SEQ ID NO: 25) |
| Amino acid sequence of B266-1 heavy chain | EVQLQQSGAELVKPGASVKLSCTASGFNIKDTFMHWVKQ RPEQGLEWIGRIDPANGNTKYDPKFQGKATITADTSSNT AYLQLSSLTSEDTAVYYCALLQYSAMDYWGQGTSVTVSS ASTKGPSVFPLAPSSKSTSGGTAALGCLVKDYFPEPVTV SWNSGALTSGVHTFPAVLQSSGLYSLSSVVTVPSSSLGT QTYICNVNHKPSNTKVDKKVEPKSCDKTHTCPPCPAPEL LGGPSVFLFPPKPKDTLMISRTPEVTCVVVDVSHEDPEV KFNWYVDGVEVHNAKTKPREEQYNSTYRVVSVLTVLHQD WLNGKEYKCKVSNKALPAPIEKTISKAKGQPREPQVYTL PPSREEMTKNQVSLTCLVKGFYPSDIAVEWESNGQPENN YKTTPPVLDSDGSFFLYSKLTVDKSRWQQGNVFSCSVMH EALHNHYTQKSLSLSPGK (SEQ ID NO: 26) |
| Gene sequence of B266-1 light chain | CAGATCGTGCTCACACAGTCTCCAGCCATCATGAGCGCC TCTCCTGGCGAGAAGGTGACAATGACCTGCTCTGCCTCT AGCCGCATTTCTTACATGTACTGGTATCAGCAGAAGCCA GGCACCTCCCCTAAGAGGTGGATATACGACACATCCAAG CTGGCCTCCGGCGTGCCCGCCCGGTTCAGCGGCTCTGGC AGCGGCACAAGCTACTCCCTGACAATTAGCACGATGGAG GCCGAGGACGCCGCCACATACTACTGCCACCAGCGCTCG TCCTACCCAACATTCGGCGCCGGCACAAAATTGGAACTG AAGGTGGCTGCACCATCTGTCTTCATCTTCCCGCCATCT GATGAGCAGTTGAAATCTGGAACTGCCTCTGTTGTGTGC CTGCTGAATAACTTCTATCCCAGAGAGGCCAAAGTACAG TGGAAGGTGGATAACGCCCTCCAATCGGGTAACTCCCAG GAGAGTGTCACAGAGCAGGACAGCAAGGACAGCACCTAC AGCCTCAGCAGCACCCTGACGCTGAGCAAAGCAGACTAC GAGAAACACAAAGTCTACGCCTGCGAAGTCACCCATCAG GGCCTGAGCTCGCCCGTCACAAAGAGCTTCAACAGGGGA GAGTGTTAG (SEQ ID NO: 27) |
| Gene sequence of B266-1 heavy chain | GAGGTGCAGTTACAACAGTCCGGCGCCGAGCTAGTGAAG CCAGGCGCCAGCGTGAAGCTGTCTTGCACAGCCAGCGGC TTCAACATTAAGGACACCTTCATGCACTGGGTGAAGCAG AGACCTGAGCAGGGCTTAGAGTGGATTGGCCGGATCGAC CCCGCCAACGGCAACACAAAGTACGACCCAAAGTTCCAG GGCAAGGCCACAATTACCGCCGACACATCTTCCAACACA GCCTACCTCCAGCTGTCGTCTCTCACCAGCGAGGACACC GCCGTGTACTACTGCGCCCTGCTCCAGTACTCCGCGATG GACTACTGGGGCCAGGGCACATCTGTGACCGTGTCTAGA CCAAGGGCCCATCGGTCTTCCCCCTGGCACCCTCCTCCA AGAGCACCTCTGGGGGCACAGCGGCCCTGGGCTGCCTGG TCAAGGACTACTTCCCCGAACCGGTGACGGTGTCGTGGA ACTCAGGCGCCCTGACCAGCGGCGTGCACACCTTCCCGG CTGTCCTACAGTCCTCAGGACTCTACTCCCTCAGCAGCG TGGTGACCGTGCCCTCCAGCAGCTTGGGCACCCAGACCT ACATCTGCAACGTGAATCACAAGCCCAGCAACACCAAGG TGGACAAGAAAGTTGAGCCCAAATCTTGTGACAAAACTC ACACATGCCCACCGTGCCCAGCACCTGAACTCCTGGGGG GACCGTCAGTCTTCCTCTTTCCCCCAAAACCCAAGGACA CCCTCATGATCTCCCGGACCCCTGAGGTCACATGCGTGG TGGTGGACGTGAGCCACGAAGACCCTGAGGTCAAGTTCA ACTGGTACGTGGACGGCGTGGAGGTGCATAATGCCAAGA CAAAGCCGCGGGAGGAGCAGTACAACAGCACGTACCGTG TGGTCAGCGTCCTCACCGTCCTGCACCAGGACTGGCTGA ATGGCAAGGAGTACAAGTGCAAGGTCTCCAACAAAGCCC |

TABLE 11-continued

Sequence

TCCCAGCCCCCATCGAGAAAACCATCTCCAAAGCCAAAG
GGCAGCCCCGAGAACCACAGGTGTACACCCTGCCCCCAT
CCCGGGAGGAGATGACCAAGAACCAGGTCAGCCTGACCT
GCCTGGTCAAAGGCTTCTATCCCAGCGACATCGCCGTGG
AGTGGGAGAGCAATGGGCAGCCGGAGAACAACTACAAGA
CCACGCCTCCCGTGCTGGACTCCGACGGCTCCTTCTTCC
TCTACAGCAAGCTCACCGTGGACAAGAGCAGGTGGCAGC
AGGGGAACGTCTTCTCATGCTCCGTGATGCATGAGGCTC
TGCACAACCACTACACGCAGAAGAGCCTCTCCCTGTCTC
CGGGTAAATGA (SEQ ID NO: 28)

Example 9

Confirmation of Pairing of Monoclonal Antibodies B266-1 and B264 Obtained Through Sandwich ELISA 100 µl of a coating buffer and 100 ng of a coating antibody (B266-1) were mixed and dispensed to each well, and an O/N reaction was performed at 4° C. Washing was performed by dispensing 200 µl of a washing buffer. The above-described process was performed two times.

200 µl of PBSA was dispensed to each well and reacted at room temperature for 120 minutes, and then 20 µl of an antigen (25 or 0 ng) was dispensed, 80 µl of a detection antibody (B264-B) was dispensed, and a reaction was performed at 37° C. for 90 minutes. A reaction solution was removed, and then washing was performed by dispensing 200 µl of a washing buffer to each well. The above-described process was performed three times.

100 µl of streptavidin-HRP diluted 1:200 was treated in each well, a reaction was performed at 37° C. for 30 minutes, a reaction solution was removed, and then washing was performed by dispensing 200 µl of washing buffer to each well. The above-described process was performed three times.

100 µl of a TMB solution was dispensed to each well, a reaction was performed under a dark condition at room temperature for 10 minutes, 100 µl of a stop buffer was treated in each well, and the result was confirmed at 450 nm.

As a result, as shown in Table 12, it was confirmed that the antibodies are suitably reacted with antigens, and a blank value was decreased as compared with the antibodies used in Example 6.

TABLE 12

| Sandwich ELISA using B266-1 as coating antibody and B264 as detection antibody | | | | |
|---|---|---|---|---|
| Trx1 (ng/mL) | 0 | | 25 | |
| O.D.$_{450nm}$ | 0.425 | 0.415 | 1.571 | 1.426 |

Example 10

Analysis of Affinity of Monoclonal Antibody to Antigen

Two types of monoclonal antibodies specifically acting on the antigen Trx1 were expressed using a transient transfection system using a plasmid, and thus stably produced. To confirm the affinity to an antigen, analysis was performed through ELISA (FIG. 8(a)).

100 µl of a coating buffer and 100 ng of Trx1 were mixed and dispensed to each well, and then reacted at 4° C. for 16 hours or more. After the reaction solution was removed, 200 µl of PBSA was dispensed to each well and reacted at 37° C. for 120 minutes. After the reaction solution was removed, the produced antibody B266-1 or B264 was diluted ⅕ from 0.1 µM, and dispensed to each well at 100 µl, and then reacted at 37° C. for 120 minutes. After the reaction solution was removed, washing was performed by dispensing 200 µl of a washing buffer to each well. The above-described process was performed two times.

100 µl of human IgG-HRP (diluted to 1:4000) as the antibody B266-1 was reacted with 100 µl of mouse IgG-HRP (diluted to 1:4000) as the antibody B264 at 37° C. for 60 minutes. After the reaction solution was removed, washing was performed by dispensing 200 µl of a washing buffer to each well. The above-described process was performed three times.

100 µl of a TMB solution was dispensed to each well, a reaction was performed under a dark condition at room temperature for 10 minutes, 100 µl of a stop buffer was treated in each well, and the result was confirmed at 450 nm. The resulting values were analyzed using a GraphPad Prism® (graphing and statistical analysis software) (FIG. 8(b)).

As a result of analyzing the affinity of the coating antibody B266-1 and the detection antibody B264, it was confirmed that a blank value is high due to the reactivity of B266-1, but B266-1 and B264 are increased in binding degree according to an increased concentration of an antigen. This shows that B266-1 and B264 are bound with an antigen. When an equilibrium dissociation constant ($K_D$) value is calculated through analysis using the Prism program, the $K_D$ of B266-1 was $1.1 \times 10^{-11}$, and the $K_D$ of B264 was $1.3 \times 10^{-10}$. When the $K_D$ value is between 10-10 and 10-12, it was evaluated that the antibody has a picomole (pM) level of sensitivity to an antigen, showing that B266-1 and B264 have a high level of sensitivity to an antigen.

Example 11

Sandwich ELISA of Serum of Breast Cancer Patient

Sandwich ELISA using a coating antibody (B266-1) was prepared in a process as follows.

A 1 µg/mL coating antibody solution was prepared by adding 100 ml of a coating buffer and 0.1 mL of 1 mg/mL B266-1. 100 µl of the prepared coating antibody solution was dispensed to each well of a 96-well plate, and reacted at 4° C. for 12 hours. The antibody solution was removed, and washing was performed by dispensing 200 µl of 0.05% PBST to each well. The washing was performed three times. 200 µl of PBSA was treated in each well, and a reaction (blocking process) was performed at 4° C. for 4 hours. The PBSA was removed, and then the 96-well plate was dried in a thermo-hygrostat (20° C., 30% R.H.) for 3 hours.

Afterward, the detection antibody (B264) was biotinylated with a process as follows.

Dimethyl sulfoxide (DMSO) is mixed with 20 mg/mL biotin-7-NHS, thereby preparing 2 mg/mL biotin-7-NHS. 15 µl (30 pg) of 2 mg/mL biotin-7-NHS was added to the 1 mg/mL B264 antibody, and reacted at 15 to 25° C. for 2 hours. A reaction solution was added to an Amicon® Ultra-15 (Millipore, centrifugal ultrafiltration device), filled with a PBS solution to the final volume, and centrifuged at 3,600×g until it remained at 0.5 mL. The process was performed three times. The antibody solution (biotinylated B264; B264-B) remaining in the Amicon® Ultra-15 (ultrafiltration membrane filter) was transferred to a 1.5 mL tube, and filled with PBSA to the final concentration of 0.3 mg/mL.

Subsequently, human Trx1 antigen detection from the serum of a breast cancer patient was performed as follows.

A standard antigen solution was dispensed to the first column of a 96-well plate coated with a coating antibody. 20 µl of the serum obtained from a breast cancer was dispensed, and then 80 µl (0.3 mg/mL) of a B264-B solution was dispensed. Afterward, after a reaction at 37° C. for 60 minutes, an antigen-antibody reaction solution was removed, and then washing was performed by dispensing 200 µl of PBST to each well. The washing process was performed three times. 100 µl of a 1:400-dilution of streptavidin-HRP (R & D Systems) was dispensed, and a reaction was performed at 37° C. for 30 minutes. After the reaction, a reaction solution was removed, and washing was performed by dispensing 200 µl of PBST to each well. The washing process was performed three times. 100 µl of a Sure Blue™ (TMB solution) was treated, and a reaction was performed at room temperature for 15 minutes under a dark condition. 100 µl of a 2N $H_2SO_4$ solution was dispensed, and an absorbance was measured at 450 nm using a microplate reader.

Finally, ROC analysis was performed as follows.

Figure 9:
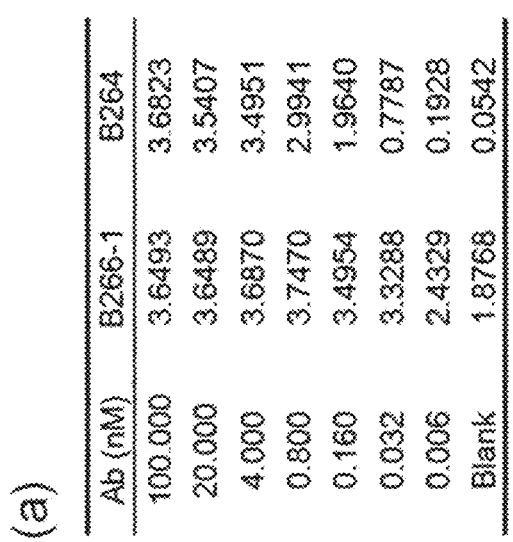
FIG. 9 shows results of analyzing the affinity of the antibodies B266-1 and B264, where (A) shows a reaction value according to an antibody concentration and a graph thereof, and (B) shows the result of analyzing the affinity of antibodies using a GraphPad Prism® (graphing and statistical analysis software).

Sensitivity and specificity were calculated by analyzing a result of ELISA using monoclonal antibodies B266-1 and B264 against Trx1. When a cut-off value was 10.8 ng/ml, the sensitivity was 93.0%, and the sensitivity was 97.4% (FIG. 9).

Example 12

Comparative Analysis With Another ELISA Kit for Breast Cancer Diagnosis

In this example, to evaluate the performance of recombinant monoclonal antibodies B266-1 and B264, another ELISA kit for detecting another biomarker CA15-3 for breast cancer diagnosis was comparatively analyzed (Table 13).

As a result, as shown in Table 13, when a monoclonal antibody specifically binding to Trx1 is used, sensitivity and specificity were exceptionally higher than those of CA15-3.

TABLE 13

| Comparison of kit of the present invention with AxSYM CA15-3 kit | | |
|---|---|---|
| | Trx1 | CA15-3 (AxSYM) |
| Sensitivity (%) | 93 | 54 |
| Specificity (%) | 97.4 | 94 |
| Test sample | Serum | Serum and plasma |

Example 13

Expression of *Chrysochloris asiatica* Trx1 Protein 13-1. Comparison of Sequences of Human Trx1 (hTrx1) and *Chrysochloris asiatica* Trx1 (CaTrx1)

Figure 10:
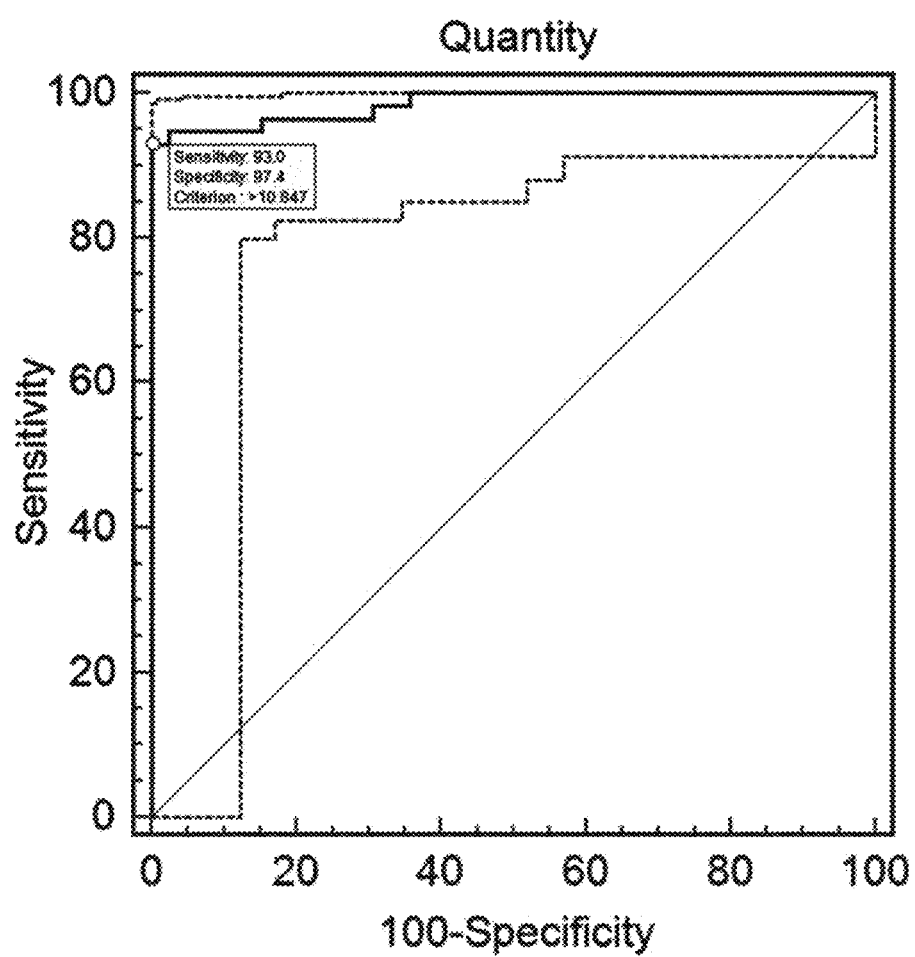
FIG. 10 is a graph showing sensitivity and specificity through ROC analysis of ELISA results using the antibodies B266-1 and B264.

As a result of the comparison of amino acid sequences between hTrx1 and *Chrysochloris asiatica* Trx1, which is structurally similar but has low amino acid sequence similarity to hTrx1, it was confirmed that they have a homology of 82% (FIG. 10).

Figure 12:
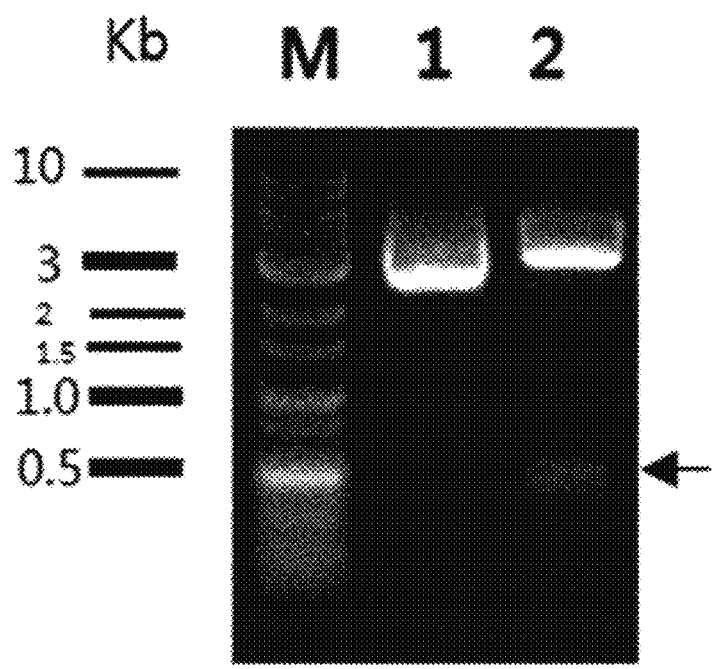
FIG. 12 shows the result of electrophoresis to confirm whether cloning succeeded through a CaTrx1-cloning plasmid and treatment with restriction enzymes (Sfi I and Xho I), where Lane 1 indicates a CaTrx1-cloning plasmid, and Lane 2 indicates a restriction enzyme-treated plasmid.

A gene was synthesized using a known base sequence of CaTrx1 (NCBI Accession Number XM_006863001.1), and to store the gene in *E. coli*, the gene was cloned into a pUCIDT-AMT plasmid. The gene-cloning plasmid was treated with restriction enzymes Sfi I and Xho I, followed by electrophoresis. As a result, as shown in FIG. 12, in the restriction enzyme-treated plasmid (lane 2), a 357-bp DNA fragment cleaved from the plasmid was identified, indicating that the CaTrx1 gene was synthesized (arrow of FIG. 12).

13-2. Expression of CaTrx1 Protein

Figure 13:
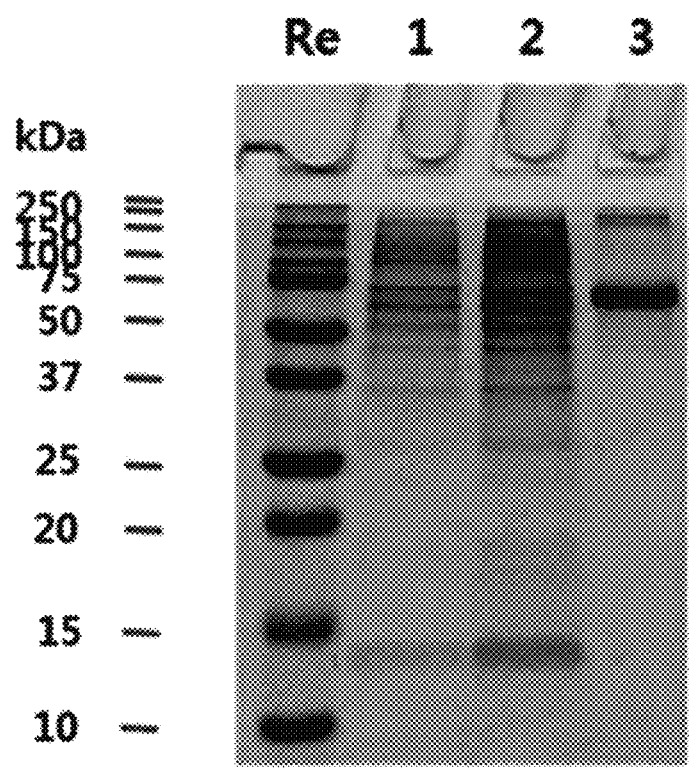
FIG. 13 shows the result of analyzing the extent of the expression of CaTrx1 protein secreted from a cell line by transfecting an animal cell with a CaTrx1 plasmid.

Following the transfection of an animal cell with the CaTrx1 plasmid prepared in Example 13-1, CaTrx1 secreted from the cell line was purified, and the protein was confirmed by 15% SDS-PAGE, and the result is shown in FIG. 13. In FIG. 13, in lanes 1 and 2, amounts of a total protein in a CaTrx1 transformant cell culture solution were 5 µg and 10 µg, respectively, in lane 3, an amount of a control protein (BSA; bovine serum albumin) was 3 µg, confirming that the productivity of the purified CaTrx1 protein was 28.75 mg/L.

Example 14

Confirmation of Affinity of Two Types of Antibodies for hTrx1 and CaTrx1

In this example, the CaTrx1 binding affinity of two types of antibodies B266-1 (Trx1-hIgG1) and B264 (Trx1-mIgG1) was examined.

To confirm the binding affinity of B266-1 (Trx1-hIgG1) and B264 (Trx1-mIgG1) for hTrx1 and CaTrx1, a 96-well ELISA plate was coated with each of 200 ng of hTrx1 and 10 µg of CaTrx1, 200 µL of a blocking buffer (4% Skim milk/1×PBS) was dispensed into each well, followed by a reaction for 1 hour at 37° C. After the removal of a reaction solution, 100 µL each of B266-1 (Trx1-hIgG1) and B264 (Trx1-mIgG1) was dispensed into each well coated with each antigen, and allowed to react at 37° C. for 2 hours. A reaction solution was removed, followed by washing five times with 200 µL of 1×PBST. 100 µL each of anti-human Fc-HRP and mouse-HRP, diluted 1:4,000, was dispensed into each of the B266-1 (Trx1-hIgG1)-treated wells and each of the B264 (Trx1-mIgG1)-treated wells, respectively, followed by a reaction at 37° C. for 2 hours. A reaction solution was removed, and washed five times with 200 µL of 1×PBST. 100 µL of a color reagent was dispensed into each well, and after a 10-minute reaction, 50 µL of 2.5 M $H_2SO_4$ was dispensed into each well. After color development, the extent of the color development was assessed using an ELISA reader.

As a result of confirmation of the hTrx1 binding affinity of B266-1 (Trx1-hIgG1) and B264 (Trx1-mIgG1), as shown in Table 14 below, for 200 ng of the antigen, it was confirmed that KD=$2.1 \times 10^{-10}$ M for B266-1, and the affinity of was detected at KD=$1.7 \times 10^{-10}$ M for B264. In addition, referring to FIG. 14A, it was seen that, compared to B266-1, the reaction value (OD 490) by B264 binding is as low as approximately 50%.

Figure 14:
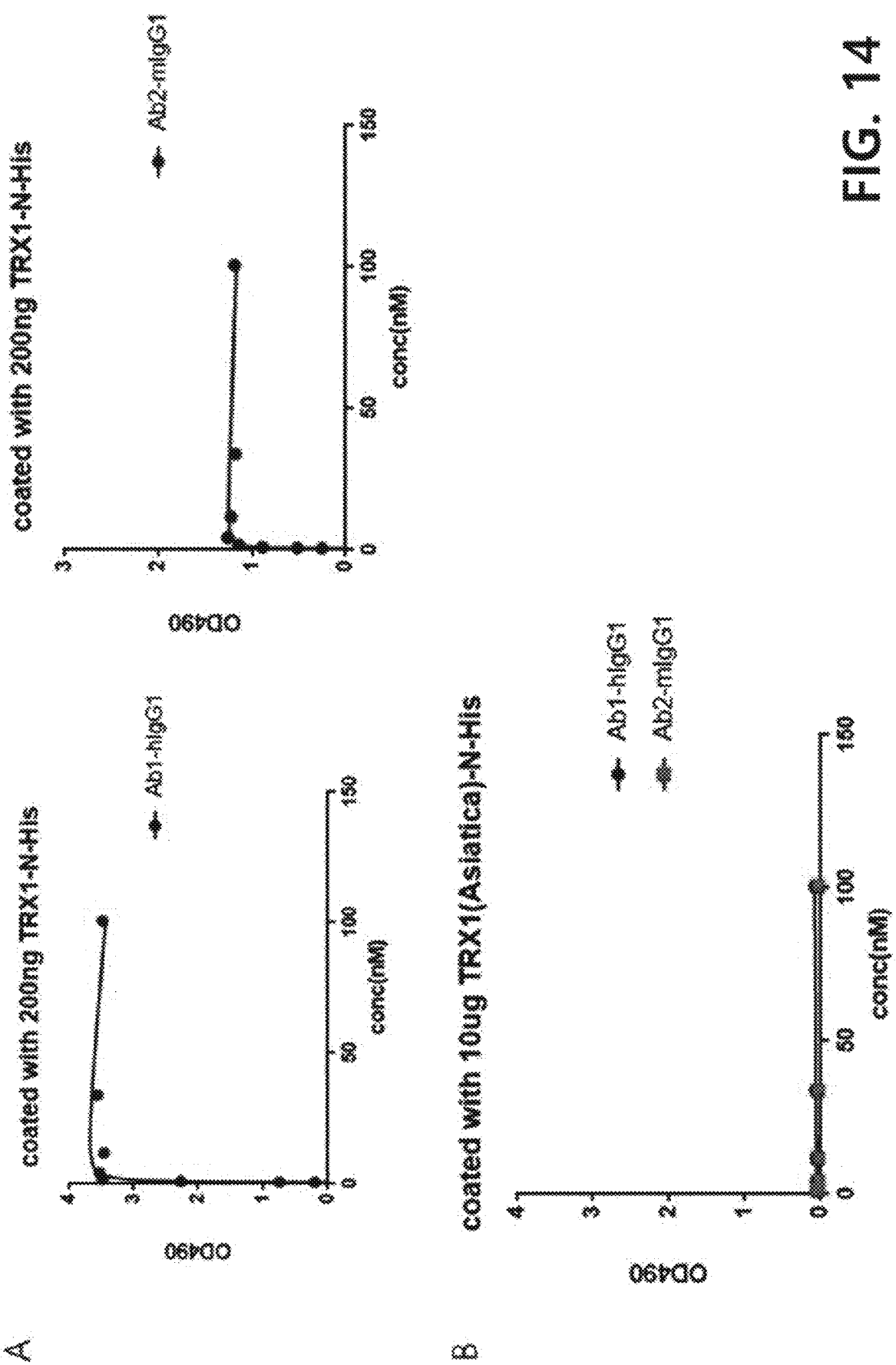
FIG. 14 shows results of analyzing the affinity of the antibodies B266-1 and B264 for hTrx1 and CaTrx1.

As a result of confirmation of the binding affinity of antibodies B266-1 and B264 for 10 µg of CaTrx1, as shown in FIG. 14B and Table 14, it was seen that none of the two types of antibodies bind to CaTrx1.

TABLE 14

| | hTRX1 | | CaTRX1 | |
|---|---|---|---|---|
| | $K_D$ (M) | $R^2$ | $K_D$ (M) | $R^2$ |
| B266-1 | $2.1 \times 10^{-10}$ | 0.99 | Not binding | Not binding |
| B264 | $1.7 \times 10^{-10}$ | 0.99 | Not binding | Not binding |

Example 15

Manufacture of Mutant Antigen for hTrx1

15-1. Positioning of Mutations Through Amino Acid Sequencing Between hTrx1 and CaTrx1

A known amino acid sequence of hTrx1 (NCBI Accession Number NP_003320.2) was compared with that of CaTrx1 (NCBI Accession Number XP_006863063.1). As shown in FIG. 15A, although the amino acid sequence homology between hTrx1 and CaTrx1 was 82%, the binding affinity of the antibodies for an antigen was significantly different, and thus there were 8 different parts in which hTrx1 and CaTrx1 have different amino acid sequences (FIG. 15B).

15-2. Fusion PCR and Cloning for Expressing Mutant Proteins

A) Fragment PCR

Figure 15D:
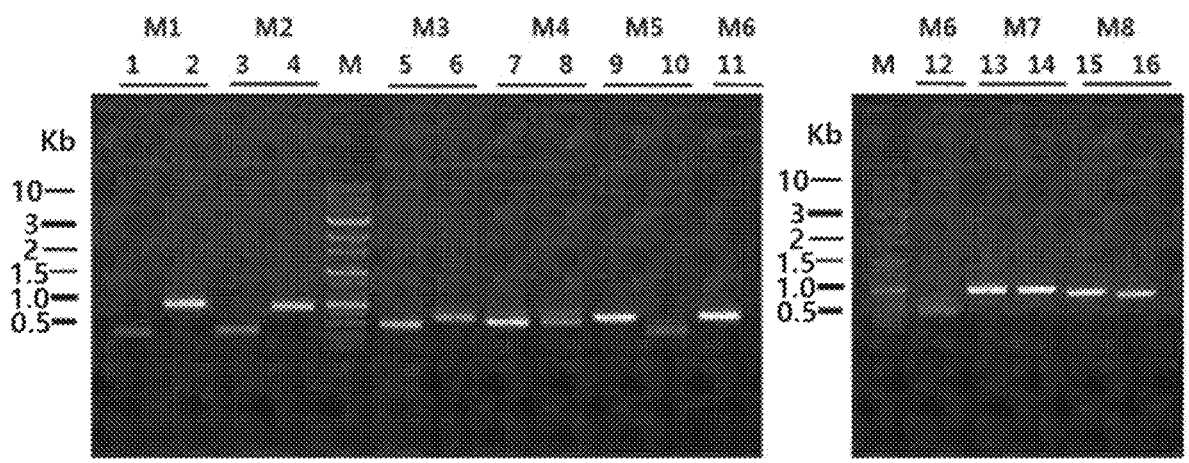
FIG. 15D shows the result of the amplification of DNA fragments for positioning of mutations.

In the 8 parts in which hTrx1 and CaTrx1 have different amino acid sequences, identified in Example 15-1, a hTrx1 sequence was substituted with a CaTrx1 sequence, and then a DNA fragment of a cassette for manufacturing a mutant was amplified (FIG. 15D).

Specifically, to manufacture a gene for expressing each mutant protein, two DNA fragments for fusion PCR have to be amplified. Therefore, two types of primers (F2 and R1; FIG. 15C and Table 15) containing a part requiring mutation of a base sequence were manufactured, and DNA fragments were amplified using two pairs of primers F1 and R1 and F2 and R2. To amplify the DNA fragments, template DNA (100-200 ng) and 1 µL each of forward and reverse primers (10 pmol each) were added to 25 µL of Solg™ 2×EF-Taq PCR Smart Mix (0.5× Band Doctor) (Solgent, SEF02-M50h, Taq DNA polymerase-based PCR premix), and the final volume was adjusted with sterile purified water, followed by stirring well and amplification using a T100™ Thermal Cycler (PCR device).

TABLE 15

| Purpose | Primer name | Sequence (5'->3') | Role of primer in FIG. 15C | SEQ ID NO: |
|---|---|---|---|---|
| Fragment amplification | Vector-F | GGCGTGTACGGTGGGAGGT | F1 | SEQ ID NO: 46 |
| | Vector-R | AGCAGCGTATCCACATAGCG | R2 | SEQ ID NO: 47 |
| TRX1-M1 mutation | TRX M1-F | CATCACGTCAAAGAGATCGAA GGCAAAGAAGATTTTCAAGAA GCCCTGGACGCCGCT | F2 | SEQ ID NO: 48 |
| | TRX M1-R | GGCTTCTTGAAAATCTTCTTTG CCTTCGATCTCTTTGACGTGAT GATGATGATGATGAT | R1 | SEQ ID NO: 49 |
| TRX1-M2 mutation | TRX M2-F | AAAACCGCATTTCATGCTGCCC TGAGCAGTGCTGGTGACAAAC TGGTCGTGG | F2 | SEQ ID NO: 50 |
| | TRX M2-R | TTTGTCACCAGCACTGCTCAGG GCAGCATGAAATGCGGTTTTG ATTCGATCTG | R1 | SEQ ID NO: 51 |
| TRX1-M3 mutation | TRX-M3-OV-F | ATTAAACCGTTTTATCATAGCC TGTCTGAAAAATACAGTAACG TTATCTTTCTGGAAG | F2 | SEQ ID NO: 52 |
| | TRX-M3-OV-R | AGACAGGCTATGATAAAACGG TTTAATCATTTTACACGGGCCG CACCAGG | R1 | SEQ ID NO: 53 |
| TRX1-M4 mutation | TRX-M4-OV-F | CTGTCTGAAAAATTTGGCAACA TGGTGTTCCTGGAAGTGGATGT TGATGACTGCCAGGACGTCGC | F2 | SEQ ID NO: 54 |
| | TRX-M4-OV-R | ATCCACTTCCAGGAACACCATG TTGCCAAATTTTCAGACAGGC TATGAAAAACGGTTTAATCAT TTTACAC | R1 | SEQ ID NO: 55 |
| TRX1-M5 mutation | TRX-M5-OV-F | GTGAAATGTATGATAACGTTCC AGTTTTTCAAAAAAGGTCAAA AAGTCGGTGAAT | F2 | SEQ ID NO: 56 |
| | TRX-M5-OV-R | AAACTGGAACGTTATCATACAT TTCACTTCGCATTCGCTCGCGA CGTCC | R1 | SEQ ID NO: 57 |
| TRX1-M6 mutation | TRX-M6-OV-F | ACGTTCCAGTTTTATAAAAAAA GGGAAAAAGTCGGTGAATTTA GCGGTGCCAACAAAGAAAAACT | F2 | SEQ ID NO: 58 |
| | TRX-M6-OV-R | TTCACCGACTTTTTCCCTTTTTT TATAAAACTGGAACGTCGGCA TACATTTCACTTCGCATTCG | R1 | SEQ ID NO: 59 |

TABLE 15-continued

| Purpose | Primer name | Sequence (5'->3') | Role of primer in FIG. 15C | SEQ ID NO: |
|---|---|---|---|---|
| TRX1-M7 mutation | TRX-M7-Xho-R | GAATTCTCGAGCTATCACACCA GTTCGTTAATCGTGGCTTCCAG TTTTTCTTTGTTAACACCGCTA AATTCACCGACTTTTTGA | F2 | SEQ ID NO: 60 |
| TRX1-M8 mutation | TRX-M8-Xho-R | GAATTCTCGAGCTATCAACACA GTTCGTTAATGATGGCTTCCAG TTTTTCTTTGTTGGC | R1 | SEQ ID NO: 61 |
| Colony PCR | N293F-colo-F | GGCGTGTACGGTGGGAGGT | — | SEQ ID NO: 62 |
| | N293F-colo-R | AGCAGCGTATCCACATAGCG | — | SEQ ID NO: 63 |

PCR was carried out under conditions of 1 cycle of pre-denaturation at 95° C. for 2 min, 30 cycles of 3-step amplification at 95° C. for 20 sec; at 62° C. for 40 sec; and at 72° C. for 1 min, and 1 cycle of post-extension at 72° C. for 5 min, and then the reaction was terminated. The amplified DNA fragment was confirmed using a 1% agarose gel (FIG. 15D). Purification of a gene was carried out using a QIAquick® Gel Extraction Kit (QIAGEN, 28704, DNA gel extraction kit) according to the manufacturer's protocol.

Figure 15E:
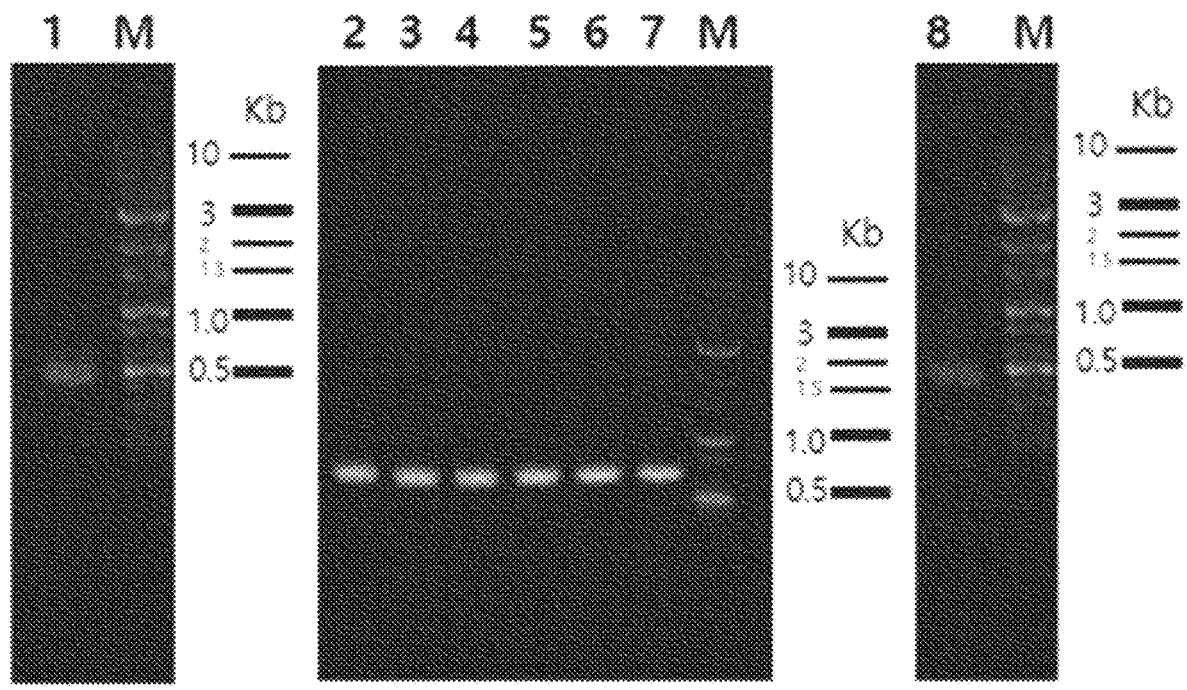
FIG. 15E shows the result of manufacturing cassettes through overlapping PCR using the manufactured DNA fragments.

B) Fusion PCR for Fusing Two Types of DNA Fragments and Purification of PCR Product To fuse the amplified DNA fragments, PCR was carried out using two DNA fragments and primers F1 and R2 (FIG. 15C). A PCR mixture for fusion PCR was prepared by adding 100 to 150 ng each of the two types of DNA fragments and 1 µL each of forward and reverse primers (10 pmol each) to 25 µL 2×EF-Taq PCR Smart mix (0.5× Band Doctor) (Solgent, SEF02-M50h), and the final volume was adjusted with sterile purified water, followed by stirring well and amplification with a PCR device. PCR was carried out under conditions of 1 cycle of pre-denaturation at 95° C. for 2 min, 30 cycles of 3-step amplification at 95° C. for 20 sec; at 62° C. for 40 sec; and at 72° C. for 1 min, and 1 cycle of post-extension at 72° C. for 5 min, and then the reaction was terminated. After the termination of the reaction, a PCR product was confirmed using a 1% agarose gel (FIG. 15E).

After the termination of the fusion PCR, the produced PCR product was purified using ethanol precipitation. 3 M sodium acetate (pH 5.2) and 100% ethanol were respectively added to the amplified PCR product at ⅒-fold and 2-fold of the total volume of the PCR product, and well stirred, reacted in a −70° C. ultra-low temperature freezer for 10 minutes. Afterward, the resulting mixture was centrifuged at 13,000 rpm for 10 minutes, a supernatant was removed, 1 mL of 70% ethanol was added, and then the resulting mixture was stirred, followed by centrifugation at 13,000 rpm for 10 minutes. A supernatant was removed and residual ethanol was removed by a reaction in a 70° C. heat block for 3 minutes, and a DNA pellet was dissolved well in 50 µL of distilled water.

C) Cloning of PCR Product

To clone the purified PCR product into a N293F plasmid, a restriction enzyme was treated. Specifically, 50 µL of the PCR product and the N293F plasmid was treated with each of 7 µL of Kpn I and 8 µL of a 10× buffer, and a total volume was adjusted to 80 µL. After stirring well, the resulting mixture was reacted in a 37° C. water bath for 3 hours. After the termination of the reaction, the resulting mixture was purified by ethanol precipitation. Afterward, the purified mixture was treated with 7 µL of Xho I and 8 µL of a 10× buffer, and the total volume was adjusted to 80 µL. After stirring well, the resulting product was reacted in a 37° C. water bath for 3 hours. To purify the reaction-terminated DNA, an experiment was carried out using a QIAquick® Gel Extraction Kit (QIAGEN, 28704, DNA gel extraction kit) according to the manufacturer's protocol.

To clone the purified DNA fragment into N293F, 20 ng of N293F which was treated with a DNA fragment (100 ng; 1 Kb or less, 300 ng; 3 kb or less) and the restriction enzymes, was treated with 1 µL of a T4 DNA ligase (Thermo Scientific™, EL0011) and 1 µL of a 10× buffer were added, and the total volume was adjusted to 10 µL with distilled water. The resulting mixture was reacted for 16 hours at 22° C. After termination of the reaction, DH5 competent cells were extracted to be transformed into E. coli, and dissolved on ice. 2 µL of a ligation product was well mixed with DH5a competent cells, and then reacted on ice for 30 minutes. Subsequently, the reaction product was reacted in a 42° C. water bath for 90 seconds, and further reacted on ice for 3 minutes. 500 µL of an SOC medium (20 g of Bacto Tryptone, 5 g of Bacto Yeast Extract, and 0.5 g of NaCl per liter) were added to the reaction product, and incubated in a 37° C. shaking incubator for 30 minutes. After incubation, 100 µL of the reaction product was sprayed and spread on a 100 µg/mL ampicillin-added LB medium (10 g of Bacto Tryptone, 5 g of Bacto Yeast Extract, and 10 g of NaCl per liter), and incubated in a 37° C. incubator for 12 to 16 hours.

D) Colony PCR and Sequencing to Confirm Transformation

To confirm the presence or absence of a cloning plasmid, colony PCR was performed. A PCR mixture for fusion PCR was prepared by adding 0.5 mL each of forward and reverse primers (10 pmol each) to 12.5 µL 2×EF-Taq PCR Smart mix (0.5× Band Doctor) (Solgent, SEF02-M50h), and the final volume was adjusted with sterile distilled water, followed by stirring well and amplification by PCR. PCR was performed under conditions of 1 cycle of pre-denaturation at 95° C. for 2 min, 25 cycles of 3-step amplification at 95° C. for 20 sec; at 62° C. for 40 sec; and at 72° C. for 1 min, and 1 cycle of post-extension at 72° C. for 5 min, and then the reaction was terminated.

Figure 15F:
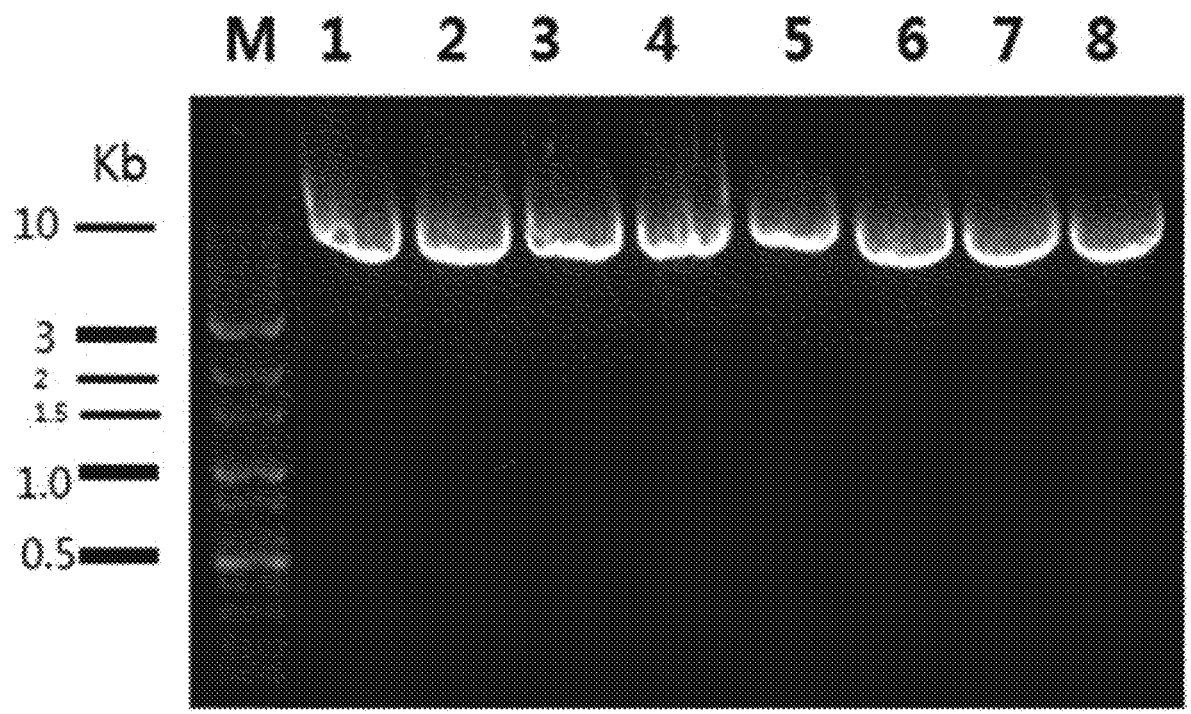
FIG. 15F shows the expression of 8 types of hTrx1 mutant genes by transforming 293F with plasmids cloning each hTrx1 mutant gene.

After the termination of the reaction, the amplified product was confirmed using a 1% agarose gel (FIG. 15F). The amplified product was purified, and Neoprobe Corp was commissioned to carry out sequencing. Sequencing data is shown in Table 16 below. Sequences underlined in bold type indicate sequences that have been mutated.

TABLE 16

| Name | Base sequence data | SEQ ID NO: |
|---|---|---|
| TRX-N-His-M1 | GTCAAAGAGATCGAAGGCAAAGAAGATTTT CAAGAAGCCCTGGACGCCGCTGGTGACAAAC TGGTCGTGGTGGACTTTAGTGCTACCTGGTG CGGCCCGTGTAAAATGATTAAACCGTTTTTC CATAGCCTGTCTGAAAAATACAGTAACGTTA TCTTTCTGGAAGTGGATGTTGATGACTGCCA GGACGTCGCGAGCGAATGCGAAGTGAAATG TATGCCGACGTTCCAGTTTTTCAAAAAAGGT CAAAAAGTCGGTGAATTTAGCGGTGCCAACA AAGAAAAACTGGAAGCCACGATTAACGAAC TGGTG | SEQ ID NO: 38 |
| TRX-N-His-M2 | GTCAAACAGATCGAATCAAAAACCGCATTTC ATGCTGCCCTGAGCAGTGCTGGTGACAAAC TGGTCGTGGTGGACTTTAGTGCTACCTGGTG CGGCCCGTGTAAAATGATTAAACCGTTTTTC CATAGCCTGTCTGAAAAATACAGTAACGTTA TCTTTCTGGAAGTGGATGTTGATGACTGCCA GGACGTCGCGAGCGAATGCGAAGTGAAATG TATGCCGACGTTCCAGTTTTTCAAAAAAGGT CAAAAAGTCGGTGAATTTAGCGGTGCCAACA AAGAAAAACTGGAAGCCACGATTAACGAAC TGGTG | SEQ ID NO: 39 |
| TRX-N-His-M3 | GTCAAACAGATCGAATCAAAAACCGCATTTC AAGAAGCCCTGGACGCCGCTGGTGACAAACT GGTCGTGGTGGACTTTAGTGCTACCTGGTGC GGCCCGTGTAAAATGATTAAACCGTTTTATC ATAGCCTGTCTGAAAAATACAGTAACGTTAT CTTTCTGGAAGTGGATGTTGATGACTGCCAG GACGTCGCGAGCGAATGCGAAGTGAAATGT ATGCCGACGTTCCAGTTTTTCAAAAAAGGTC AAAAAGTCGGTGAATTTAGCGGTGCCAACAA AGAAAAACTGGAAGCCACGATTAACGAACT GGTG | SEQ ID NO: 40 |
| TRX-N-His-M4 | GTCAAACAGATCGAATCAAAAACCGCATTTC AAGAAGCCCTGGACGCCGCTGGTGACAAACT GGTCGTGGTGGACTTTAGTGCTACCTGGTGC GGCCCGTGTAAAATGATTAAACCGTTTTTCC ATAGCCTGTCTGAAAATTTGGCAACATGG TGTTCCTGGAAGTGGATGTTGATGACTGCCA GGACGTCGCGAGCGAATGCGAAGTGAAATG TATGCCGACGTTCCAGTTTTTCAAAAAAGGT CAAAAAGTCGGTGAATTTAGCGGTGCCAACA AAGAAAAACTGGAAGCCACGATTAACGAAC TGGTG | SEQ ID NO: 41 |
| TRX-N-His-M5 | GTCAAACAGATCGAATCAAAAACCGCATTTC AAGAAGCCCTGGACGCCGCTGGTGACAAACT GGTCGTGGTGGACTTTAGTGCTACCTGGTGC GGCCCGTGTAAAATGATTAAACCGTTTTTCC ATAGCCTGTCTGAAAAATACAGTAACGTTAT CTTTCTGGAAGTGGATGTTGATGACTGCCAG GACGTCGCGAGCGAATGCGAAGTGAAATGT ATGATAACGTTCCAGTTTTTCAAAAAAGGTC AAAAAGTCGGTGAATTTAGCGGTGCCAACAA AGAAAAACTGGAAGCCACGATTAACGAACT GGTG | SEQ ID NO: 42 |
| TRX-N-His-M6 | GTCAAACAGATCGAATCAAAAACCGCATTTC AAGAAGCCCTGGACGCCGCTGGTGACAAACT GGTCGTGGTGGACTTTAGTGCTACCTGGTGC GGCCCGTGTAAAATGATTAAACCGTTTTTCC ATAGCCTGTCTGAAAAATACAGTAACGTTAT CTTTCTGGAAGTGGATGTTGATGACTGCCAG GACGTCGCGAGCGAATGCGAAGTGAAATGT ATGCCGACGTTCCAGTTTTATAAAAAAGGG AAAAAGTCGGTGAATTTAGCGGTGCCAACAA AGAAAAACTGGAAGCCACGATTAACGAACT GGTG | SEQ ID NO: 43 |
| TRX-N-His-M7 | GTCAAACAGATCGAATCAAAAACCGCATTTC AAGAAGCCCTGGACGCCGCTGGTGACAAACT GGTCGTGGTGGACTTTAGTGCTACCTGGTGC GGCCCGTGTAAAATGATTAAACCGTTTTTCC ATAGCCTGTCTGAAAAATACAGTAACGTTAT CTTTCTGGAAGTGGATGTTGATGACTGCCAG | SEQ ID NO: 44 |

TABLE 16-continued

| Name | Base sequence data | SEQ ID NO: |
|---|---|---|
| | GACGTCGCGAGCGAATGCGAAGTGAAATGT<br>ATGCCGACGTTCCAGTTTTTCAAAAAAGGTC<br>AAAAAGTCGGTGAATTTAGCGGTGTTAACAA<br>AGAAAAACTGGAAGCCACGATTAACGAACT<br>GGTG | |
| TRX-N-His-M8 | GTCAAACAGATCGAATCAAAAACCGCATTTC<br>AAGAAGCCCTGGACGCCGCTGGTGACAAACT<br>GGTCGTGGTGGACTTTAGTGCTACCTGGTGC<br>GGCCCGTGTAAAATGATTAAACCGTTTTTCC<br>ATAGCCTGTCTGAAAAATACAGTAACGTTAT<br>CTTTCTGGAAGTGGATGTTGATGACTGCCAG<br>GACGTCGCGAGCGAATGCGAAGTGAAATGT<br>ATGCCGACGTTCCAGTTTTTCAAAAAAGGTC<br>AAAAAGTCGGTGAATTTAGCGGTGCCAACAA<br>AGAAAAACTGGAAGCCATCATTAACGAACT<br>GTGT | SEQ ID NO: 45 |

E) Plasmid Preparation (Midi-Preparation)

Colonies containing plasmids that have been sequenced were inoculated into 100 mL of a 2×YT medium (17 g of tryptone, 10 g of a yeast extract, and 5 g of NaCl per liter) containing 100 μg/mL of ampicillin, and incubated at 37° C. and 210 rpm for 16 hours. The incubated bacteria were obtained by centrifugation at 4,500 rpm for 8 minutes. To obtain a purified plasmid, NucleoBond® Xtra Midi (Macherey-Nagel, Cat. 740410.100, plasmid DNA midiprep kit) was used, and an experiment was carried out according to the manufacturer's protocol.

F) Animal Cell Culture 19.4 g of Freestyle™ 293 Expression Medium AGT™ powder (AG 100009, Thermo Scientific, dry powder serum-free medium for HEK293 cell expression) was dissolved in 1 L of deionized water and sterilized. 35 mL of the Freestyle™ 293 expression medium AGT™ media (dry powder serum-free medium for HEK293 cell expression), which was heated in a 37° C. water bath for 30 minutes, was put into a 125 mL Erlenmeyer flask (CC-431143, Corning®, Erlenmeyer culture flask). After thawing a frozen cell line 293F (510029, Invitrogen) in a 37° C. water bath for approximately 1 to 2 minutes, the thawed cell line was mixed with 5 mL of Freestyle™ 293 expression medium AGT™ media (dry powder serum-free medium for HEK293 cell expression), and dispensed into a 125 mL Erlenmeyer flask (CC-431143, Corning®, Erlenmeyer culture flask) containing 35 mL of the medium, followed by incubation in an 8% CO2 shaking incubator at 37° C. and 85 rpm. After 2 to 3 days of incubation, 10 μL of the cell line was mixed with 10 μL of trypan blue, and 10 μL of the resulting mixture was added to a Luna™ Cell Counting slide (L12002, Logos Biosystems, disposable cell counting slide), and cell viability and a cell count were confirmed using a Luna™ Automated Cell™ automated cell counter Counter (L10001, Logos Biosystems, automated cell counter). After 4 to 7×10$^5$ cells/mL of the cells were suspended in a 40 mL medium, the resulting suspension was centrifuged at 100×g for 5 minutes to remove a supernatant. After removal of the supernatant, the cell pellet was mixed with 10 mL of a medium to resuspend the pellet, and then 30 mL of the medium was inoculated into a 125 mL Erlenmeyer flask (CC-431143, Corning®, Erlenmeyer culture flask). The cells were incubated in an 8% CO2 shaking incubator at 37° C. and 85 rpm, and the above-described process was performed two or more times.

G) Transfection Into Animal Cells

A 40 mL aliquot of 5.5×10$^5$ cells/mL of cells were put into a tube, and centrifuged at 100×g for 5 minutes. After removal of a culture solution, a pellet was suspended using 10 mL of Freestyle™ 293 expression medium AGT™ media (dry powder serum-free medium for HEK293 cell expression), and inoculated into a 125 mL Erlenmeyer flask (CC-431143, Corning® Erlenmeyer culture flask). The cells were incubated in an 8% CO2 shaking incubator at 37° C. and 85 rpm. The cell count and viability were confirmed to be 1×10$^6$ cells/mL and 90% or more, respectively, using a Luna™ automated cell counter. Based on 40 mL of the culture solution, each of 25 μg DNA for transfection and 100 μg PEI (23966, Polysciences) was stirred by vortexing, followed by centrifugation at 10,000 rpm for 1 second. DNA and PEI mixed in 800 μL of Freestyle™ 293 expression medium AGT™ were stirred, and allowed to react at room temperature for 20 minutes. The reacted DNA-PEI mixture was reacted in the 125 mL flask in which the cell line was incubated. After 24 hours, supplements were added to 5 g/L. Subsequently, the cells were further incubated for 5 days, and the culture solution was collected.

H) Experiment for Confirming Expression in Culture Medium

Figure 16:
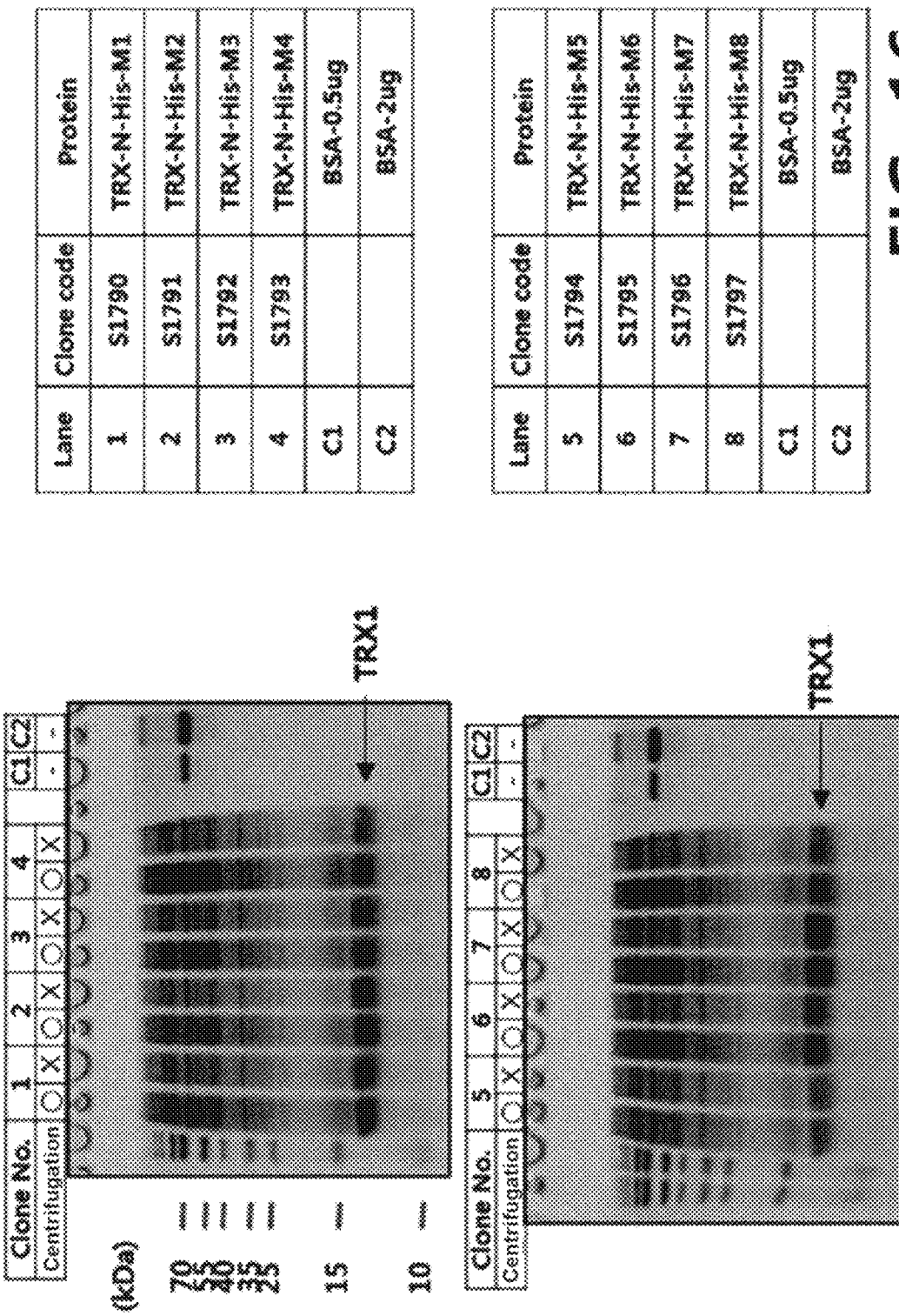
FIG. 16 shows proteins secreted in a culture solution after the genes obtained through transformation in FIG. 15 are transduced into HEK293 human cells and cultured, which are detected by SDS-PAGE. Since the size of Trx1 is approximately 12 kDa, a protein with the corresponding size is detected, confirming that the 8 types of transformed genes are expressed and secreted as proteins in a culture solution.

After 5-day culture, 500 μL of the collected culture solution was dispensed into tubes. One of the tubes was placed in a centrifuge tube rack for 20 minutes, a supernatant (sample that had not been centrifuged) was used, and the other tubes were centrifuged at 10,000 rpm for 2 minutes to remove the cells, and only a supernatant (sample that had been centrifuged) was used. 10 μL of a 5× reduction sample buffer was mixed with 40 μL of the supernatant, followed by boiling at 100° C. for 5 minutes. The prepared sample was confirmed by 15% SDS-PAGE using Mini-PROTEAN® Tetra Cell (BR165-8029, Bio-Rad, mini vertical gel electrophoresis apparatus) (FIG. 16).

I) Purification Using Affinity Chromatography (Ni-NTA)

Figure 17:
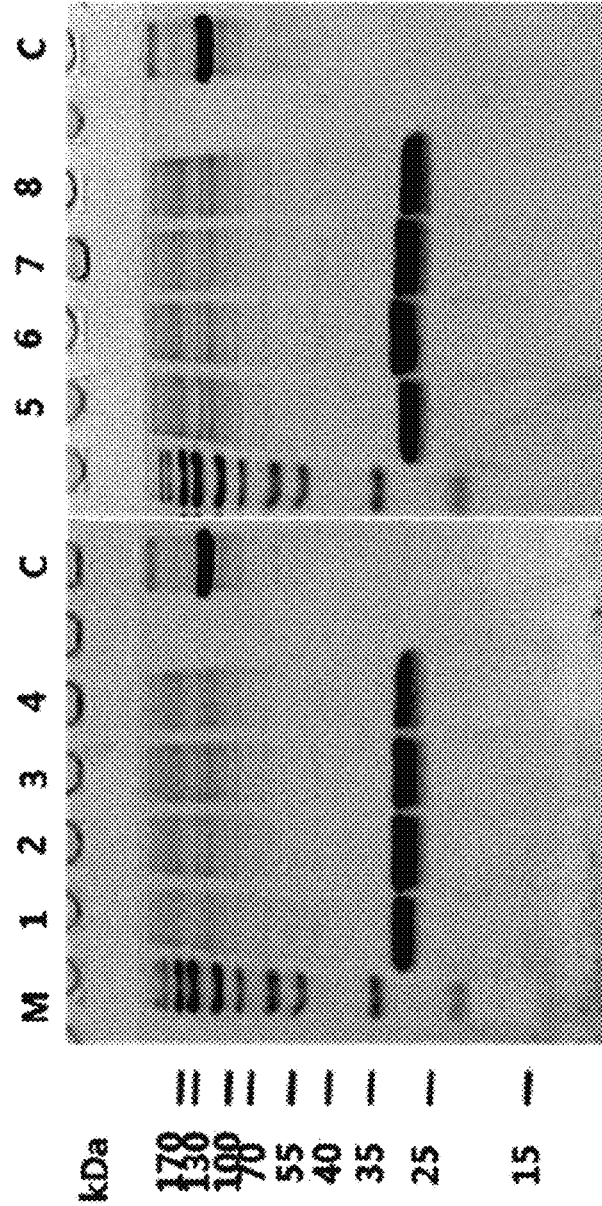
FIG. 17 shows a result of analyzing the extent of expression of 8 types of hTrx1 mutant proteins detected in FIG. 16 after purification.

A transformed cell line was incubated for 6 days, and centrifuged at 4,800 rpm for 30 minutes to remove a supernatant. A Poly-Prep® Column (731-1553, Bio-rad, gravity-flow chromatography column) was washed using a 10 mM imidazole washing buffer (pH 7.4), and packed with a Ni-Sepharose™ 6 Fast Flow (17-5318-02, GE Healthcare, nickel affinity chromatography resin). Afterward, the column was washed with a 10 mM imidazole washing buffer (pH 7.4) twice. When approximately 2 to 3 mL of a 10 mM imidazole washing buffer (pH 7.4) remained in the column, the column was washed again with 20 mL of a 10 mM imidazole washing buffer (pH 7.4). A medium was added to the washed column. The beads were washed with a 10 mM imidazole washing buffer (pH 7.4), and elusion was performed with a 500 mM imidazole elution buffer (pH 7.4). 10 µL of the sample was mixed with 200 µL of a Coomassie Plus™ Protein Detection reagent (1856210, Thermo Scientific, Bradford-based protein assay reagent) and eluted until the sample did not turn blue. A purification solution for the eluted protein was concentrated using an Amicon® Ultra Centrifuge Filter Unit (UFC901096, Millipore, centrifugal ultrafiltration device), and the buffer was exchanged by repeating reconcentration with a PBS solution at least twice. A protein concentration was measured using a Nano-drop, and diluted to be 0.3 to 0.5 mg/mL. 3 µg of each protein was confirmed by SDS-PAGE (FIG. 17).

In addition, the concentrations and productivity of the 8 types of hTrx1 mutant proteins were assessed, and the results are shown in Table 17 below. Referring to Table 17, it can be seen that the 8 types of the hTrx1 mutant proteins are expressed at concentrations ranging from 3.15 to 5.31 mg/mL.

TABLE 17

| ID | hTrx1 mutant protein | Concentration (mg/mL) | Protein (mg) | Productivity (mg/L) |
|---|---|---|---|---|
| S1790 | TRX-N-His-M1 | 4.76 | 4.71 | 117.75 |
| S1791 | TRX-N-His-M2 | 4.12 | 4.28 | 107.0 |
| S1792 | TRX-N-His-M3 | 3.81 | 3.73 | 93.25 |
| S1793 | TRX-N-His-M4 | 3.99 | 3.63 | 90.75 |
| S1794 | TRX-N-His-M5 | 3.15 | 3.30 | 82.50 |
| S1795 | TRX-N-His-M6 | 3.98 | 4.33 | 108.25 |
| S1796 | TRX-N-His-M7 | 5.31 | 5.15 | 128.75 |
| S1797 | TRX-N-His-M8 | 3.07 | 3.07 | 76.75 |

Example 16

ELISA for Confirming Binding Affinity

In this example, the binding affinity of each of the B266-1 and B264 antibodies for the 8 types of hTrx1 mutant proteins prepared in Example 15 was confirmed.

The 8 types of hTrx1 mutant proteins prepared in Example 3 were dissolved in a coating buffer (DPBS; LB001-02, Welgene) at a concentration of 2 µg/mL, thereby preparing antigen solutions, each antigen solution was dispensed into a 96-well plate at 100 µL per well, and the plate was covered with a sealing tape, followed by a reaction at 4° C. for 16 hours.

After removal of the antigen solution, 200 µL of a blocking buffer (1×PBS w/4% skim milk) was dispensed into each well, and the plate was covered with a sealing tape, followed by a reaction in a 37° C. incubator for 1 hour. After the completion of the reaction, the blocking buffer was removed, 100 µL of the antibody solution diluted to a certain concentration was dispensed into each well, and the plate was covered with a sealing tape, followed by a reaction in a 37° C. incubator for 2 hours. The antibody solution was removed, a process of treating and discarding 200 µL of a washing buffer (1×PBST) solution per well was repeated a total of 5 times. HRP-binding antibodies (anti-human Fc-HRP against B266, anti-mouse Fc-HRP against B264) were diluted 1:4000 in an antibody dilution solution (1×PBS w/1% Skim milk), 100 µL of the resulting dilution was dispensed into each well, and the plate was covered with a sealing tape, followed by a reaction in a 37° C. incubator for 2 hours. The antibody solution was removed, and a process of treating and discarding 200 µL of a washing buffer (1×PBST) solution was repeated a total of five times. 10 µL of $H_2O_2$ was added to a color reagent [one OPD tablet, 10 mL PC buffer (5.1 g of $C_6H_8O_7 \cdot H_2O$ and 7.3 g of $Na_2HPO_4$ per liter], and then 100 µL of the resulting mixture was dispensed into each well, followed by a reaction in a dark place for 10 minutes. 50 µL per well of a stop buffer (2.5 M $H_2SO_4$) was treated, and OD at 490 nm was measured.

As a result, as shown in FIGS. 18A to 18C, it was confirmed that the B266-1 (hTrx1-hIgG1) antibody was decreased in binding strength with a protein having a mutation at an M4 site (YSNVIFGNMV), and the B264 (hTrx1-mIgG1) antibody was decreased in binding strength with a protein having mutations at M1, M2 and M4 sites (M1: QIESKTAEIEGKED, M2: QEALDAHAALSS, and M3: YSNVIFGNMV).

Tables 18 and 19 below show original amino acid sequences and base sequences of the M1, M2 and M4 sites having mutations in hTrx1.

TABLE 18

| hTrx1 site | Amino acid sequence | SEQ ID NO: |
|---|---|---|
| M1 | QIEGSTA | SEQ ID NO: 32 |
| M2 | QEALDA | SEQ ID NO: 33 |
| M4 | YSNVI | SEQ ID NO: 34 |

TABLE 19

| hTrx1 site | Base sequence | SEQ ID NO: |
|---|---|---|
| M1 | CAGATCGAATCAAAAACCGCA | SEQ ID NO: 35 |
| M2 | CAAGAAGCCCTGGACGCC | SEQ ID NO: 36 |
| M4 | TACAGTAACGTTATC | SEQ ID NO: 37 |

From the above result, it was confirmed that the B266-1 antibody and the B264 antibody are likely to share the M4 part (YSNVI) of an antigen-binding site.

Example 17

Antibody Profiling Using Peptide Microarrays

Figure 19:
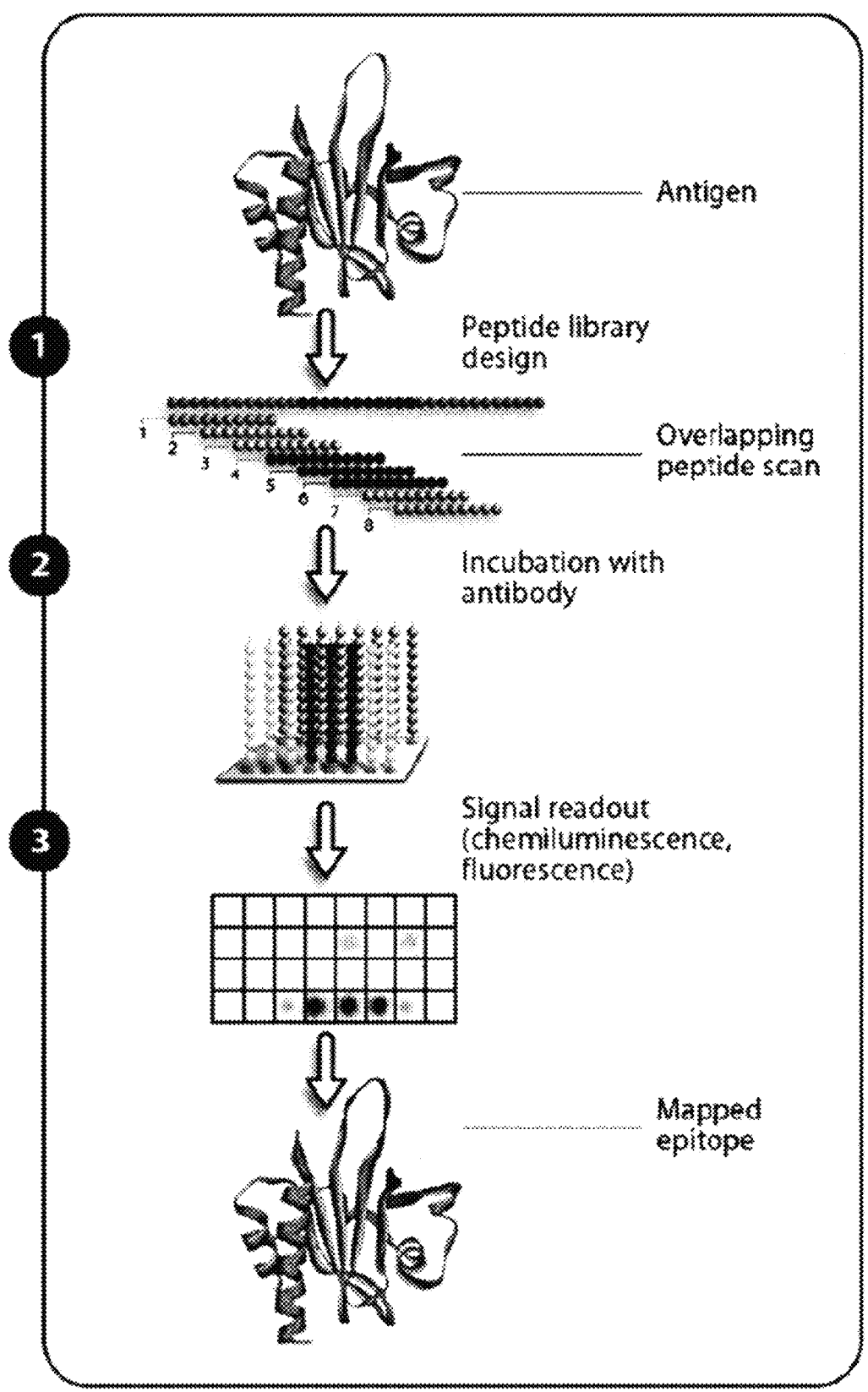
FIG. 19 is a schematic diagram illustrating the general principle of epitope detection using an overlapping peptide scan used in Example 17.

In this example, an accurate amino acid sequence was identified through Trx1 antigen epitope mapping analysis using antibodies B266-1 and B264. Specifically, PepStar™ peptide microarray technology (JPT Peptide Technologies (Germany)) was used, and as shown in FIG. 19, an epitope was detected using an overlapping peptide scan.

17-1. Sequences

Antibody profiling experiments were performed on a peptide library consisting of 108 peptides. The complete list of the peptides is shown in Tables 20 to 22 below. Here, SEQ ID NOs: 64 to 81 corresponding to Peptide_001 to Peptide_018 are not native forms, and include recombinant insert regions. For a known amino acid sequence of the hTrx1 protein, GenBank Accession No. AAF87085.1 was referenced.

TABLE 20

Peptides immobilized on microarrays

| SEQ ID NO: | Amino acid sequence | Name |
|---|---|---|
| 64 | VATAADVHSQHHHHH | Peptide_001 |
| 65 | ATAADVHSQHHHHHH | Peptide_002 |
| 66 | TAADVHSQHHHHHHH | Peptide_003 |
| 67 | AADVHSQHHHHHHHH | Peptide_004 |
| 68 | ADVHSQHHHHHHHHV | Peptide_005 |
| 69 | DVHSQHHHHHHHVK | Peptide_006 |
| 70 | VHSQHHHHHHHVKQ | Peptide_007 |
| 71 | HSQHHHHHHHVKQI | Peptide_008 |
| 72 | SQHHHHHHHVKQIE | Peptide_009 |
| 73 | QHHHHHHHVKQIES | Peptide_010 |
| 74 | HHHHHHHVKQIESK | Peptide_011 |
| 75 | HHHHHHVKQIESKT | Peptide_012 |
| 76 | HHHHHVKQIESKTA | Peptide_013 |
| 77 | HHHHVKQIESKTAF | Peptide_014 |
| 78 | HHHVKQIESKTAFQ | Peptide_015 |
| 79 | HHVKQIESKTAFQE | Peptide_016 |
| 80 | HVKQIESKTAFQEA | Peptide_017 |
| 81 | VKQIESKTAFQEAL | Peptide_018 |
| 82 | KQIESKTAFQEALD | Peptide_019 |
| 83 | QIESKTAFQEALDA | Peptide_020 |
| 84 | IESKTAFQEALDAA | Peptide_021 |
| 85 | ESKTAFQEALDAAG | Peptide_022 |
| 86 | SKTAFQEALDAAGD | Peptide_023 |
| 87 | KTAFQEALDAAGDK | Peptide_024 |
| 88 | TAFQEALDAAGDKL | Peptide_025 |
| 89 | AFQEALDAAGDKLV | Peptide_026 |
| 90 | FQEALDAAGDKLVV | Peptide_027 |
| 91 | QEALDAAGDKLVVV | Peptide_028 |
| 92 | EALDAAGDKLVVVD | Peptide_029 |
| 93 | ALDAAGDKLVVVDF | Peptide_030 |
| 94 | LDAAGDKLVVVDFS | Peptide_031 |
| 95 | DAAGDKLVVVDFSA | Peptide_032 |
| 96 | AAGDKLVVVDFSAT | Peptide_033 |
| 97 | AGDKLVVVDFSATW | Peptide_034 |
| 98 | GDKLVVVDFSATWC | Peptide_035 |
| 99 | DKLVVVDFSATWCG | Peptide_036 |
| 100 | DKLVVVDFSATWCGP | Peptide_037 |
| 101 | KLVVVDFSATWCGPC | Peptide_038 |

TABLE 21

Peptides immobilized on microarrays

| SEQ ID NO: | Amino acid sequence | Name |
|---|---|---|
| 102 | LVVVDFSATWCGPCK | Peptide_039 |
| 103 | VVVDFSATWCGPCKM | Peptide_040 |
| 104 | VVDFSATWCGPCKMI | Peptide_041 |
| 105 | VDFSATWCGPCKMIK | Peptide_042 |
| 106 | DFSATWCGPCKMIKP | Peptide_043 |
| 107 | FSATWCGPCKMIKPF | Peptide_044 |
| 108 | SATWCGPCKMIKPFF | Peptide_045 |
| 109 | ATWCGPCKMIKPFFH | Peptide_046 |
| 110 | TWCGPCKMIKPFFHS | Peptide_047 |
| 111 | WCGPCKMIKPFFHSL | Peptide_048 |
| 112 | CGPCKMIKPFFHSLS | Peptide_049 |
| 113 | GPCKMIKPFFHSLSE | Peptide_050 |
| 114 | PCKMIKPFFHSLSEK | Peptide_051 |
| 115 | CKMIKPFFHSLSEKY | Peptide_052 |
| 116 | KMIKPFFHSLSEKYS | Peptide_053 |
| 117 | MIKPFFHSLSEKYSN | Peptide_054 |
| 118 | IKPFFHSLSEKYSNV | Peptide_055 |
| 119 | KPFFHSLSEKYSNVI | Peptide_056 |
| 120 | PFFHSLSEKYSNVIF | Peptide_057 |
| 121 | FFHSLSEKYSNVIFL | Peptide_058 |
| 122 | FHSLSEKYSNVIFLE | Peptide_059 |
| 123 | HSLSEKYSNVIFLEV | Peptide_060 |
| 124 | SLSEKYSNVIFLEVD | Peptide_061 |
| 125 | LSEKYSNVIFLEVDV | Peptide_062 |
| 126 | SEKYSNVIFLEVDVD | Peptide_063 |
| 127 | EKYSNVIFLEVDVDD | Peptide_064 |
| 128 | KYSNVIFLEVDVDDC | Peptide_065 |
| 129 | YSNVIFLEVDVDDCQ | Peptide_066 |
| 130 | SNVIFLEVDVDDCQD | Peptide_067 |
| 131 | NVIFLEVDVDDCQDV | Peptide_068 |
| 132 | VIFLEVDVDDCQDVA | Peptide_069 |

TABLE 21-continued

Peptides immobilized on microarrays

| SEQ ID NO: | Amino acid sequence | Name |
|---|---|---|
| 133 | IFLEVDVDDCQDVAS | Peptide_070 |
| 134 | FLEVDVDDCQDVASE | Peptide_071 |
| 135 | LEVDVDDCQDVASEC | Peptide_072 |
| 136 | EVDVDDCQDVASECE | Peptide_073 |
| 137 | VDVDDCQDVASECEV | Peptide_074 |
| 138 | DVDDCQDVASECEVK | Peptide_075 |
| 139 | VDDCQDVASECEVKC | Peptide_076 |

TABLE 22

Peptides immobilized on microarrays

| SEQ ID NO: | Amino acid sequence | Name |
|---|---|---|
| 140 | DDCQDVASECEVKCM | Peptide_077 |
| 141 | DCQDVASECEVKCMP | Peptide_078 |
| 142 | CQDVASECEVKCMPT | Peptide_079 |
| 143 | QDVASECEVKCMPTF | Peptide_080 |
| 144 | DVASECEVKCMPTFQ | Peptide_081 |
| 145 | VASECEVKCMPTFQF | Peptide_082 |
| 146 | ASECEVKCMPTFQFF | Peptide_083 |
| 147 | SECEVKCMPTFQFFK | Peptide_084 |
| 148 | ECEVKCMPTFQFFKK | Peptide_085 |
| 149 | CEVKCMPTFQFFKKG | Peptide_086 |
| 150 | EVKCMPTFQFFKKGQ | Peptide_087 |
| 151 | VKCMPTFQFFKKGQK | Peptide_088 |
| 152 | KCMPTFQFFKKGQKV | Peptide_089 |
| 153 | CMPTFQFFKKGQKVG | Peptide_090 |
| 154 | MPTFQFFKKGQKVGE | Peptide_091 |
| 155 | PTFQFFKKGQKVGEF | Peptide_092 |
| 156 | TFQFFKKGQKVGEFS | Peptide_093 |
| 157 | FQFFKKGQKVGEFSG | Peptide_094 |
| 158 | QFFKKGQKVGEFSGA | Peptide_095 |
| 159 | FFKKGQKVGEFSGAN | Peptide_096 |
| 160 | FKKGQKVGEFSGANK | Peptide_097 |
| 161 | KKGQKVGEFSGANKE | Peptide_098 |
| 162 | KGQKVGEFSGANKEK | Peptide_099 |
| 163 | GQKVGEFSGANKEKL | Peptide_100 |
| 164 | QKVGEFSGANKEKLE | Peptide_101 |
| 165 | KVGEFSGANKEKLEA | Peptide_102 |
| 166 | VGEFSGANKEKLEAT | Peptide_103 |
| 167 | GEFSGANKEKLEATI | Peptide_104 |
| 168 | EFSGANKEKLEATIN | Peptide_105 |
| 169 | FSGANKEKLEATINE | Peptide_106 |
| 170 | SGANKEKLEATINEL | Peptide_107 |
| 171 | GANKEKLEATINELV | Peptide_108 |

Full-length mouse IgG was co-immobilized on a microarray slide as an assay control, and an additional sequence was included in the peptide library by JPT as an inner process control.

17-2. Assay Conditions

Profiling experiments were performed using a total of two antibody samples (B266-1 and B264) diluted in a blocking buffer (Pierce International, Superblock TBS T20, order #37536). 5, 1, 0.2, 0.04, 0.008 and 0.0016 µg/mL serial dilutions were incubated on a single multi-well microarray slide at 30° C. for 1 hour. The slide includes 21 individual mini-arrays (one mini-array per sample dilution).

After sample incubation, 1 µg/ml of a fluorescence-labeled secondary anti-mouse-IgG antibody (anti-mouse IgG(H+L) (Thermo 84545)) was added to a corresponding well, followed by a reaction for 1 hour. DyLight™ 650 (fluorescent dye) DyLight 650 was used as a label. False-positive binding to a peptide was evaluated by performing one additional control incubation in which only a secondary antibody was applied on the same microarray slide. Before performing each step, the microarrays were washed with a washing buffer.

After washing and drying, the slide was scanned using a 635-nm Axon GenePix® 4300 SL50 microarray scanner (high-resolution laser microarray scanner) to obtain fluorescence intensity profiles, and the obtained image was quantified using a GenePix® (Spot-recognition software), to calculate the average pixel value for each peptide. For each spot, the average signal intensity was extracted (light units between 0 and 65535).

17-3. Image of Processed Arrays

Figure 20:
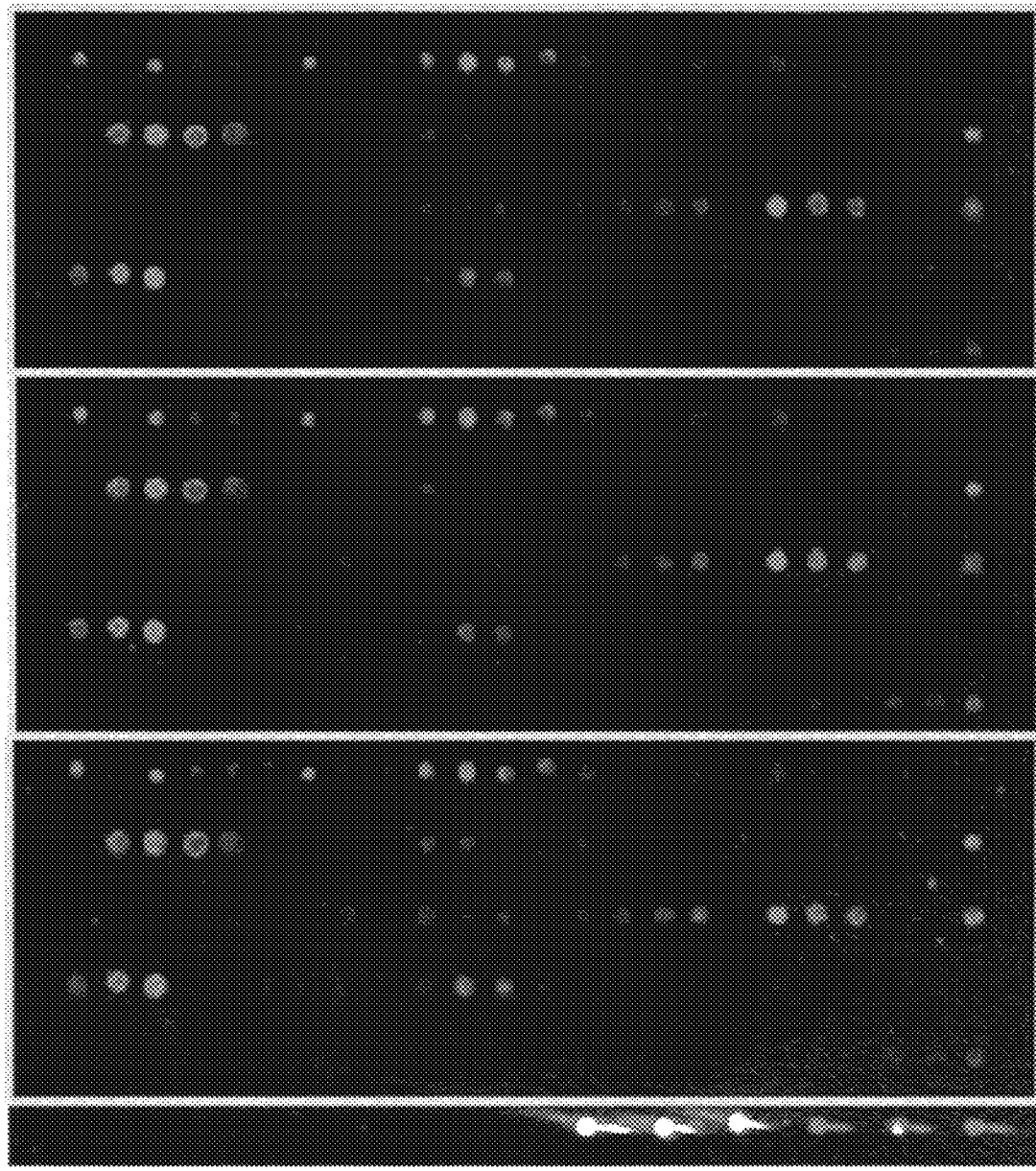
FIG. 20 is an image of mini-arrays cultured with one of the antibody samples described in Example 17.
Figure 21A:
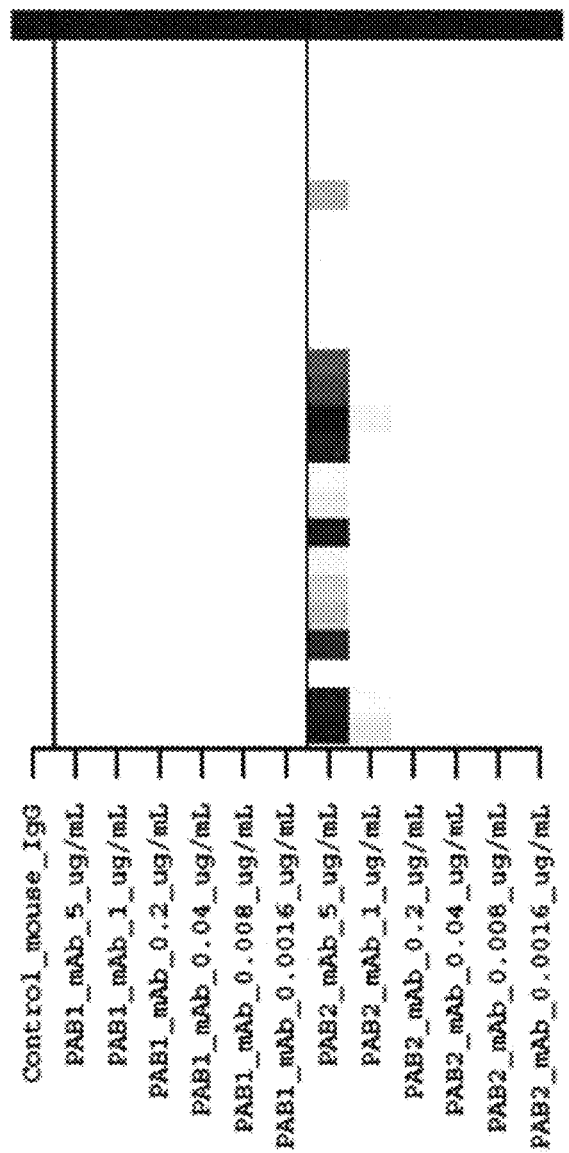
Figure 21C:
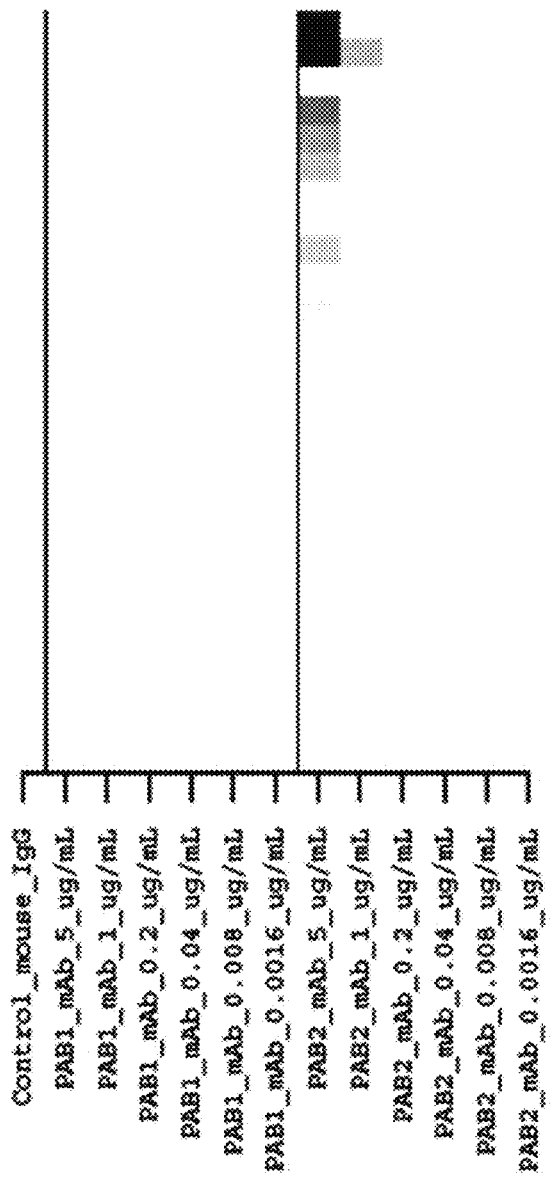
Figure 21D:
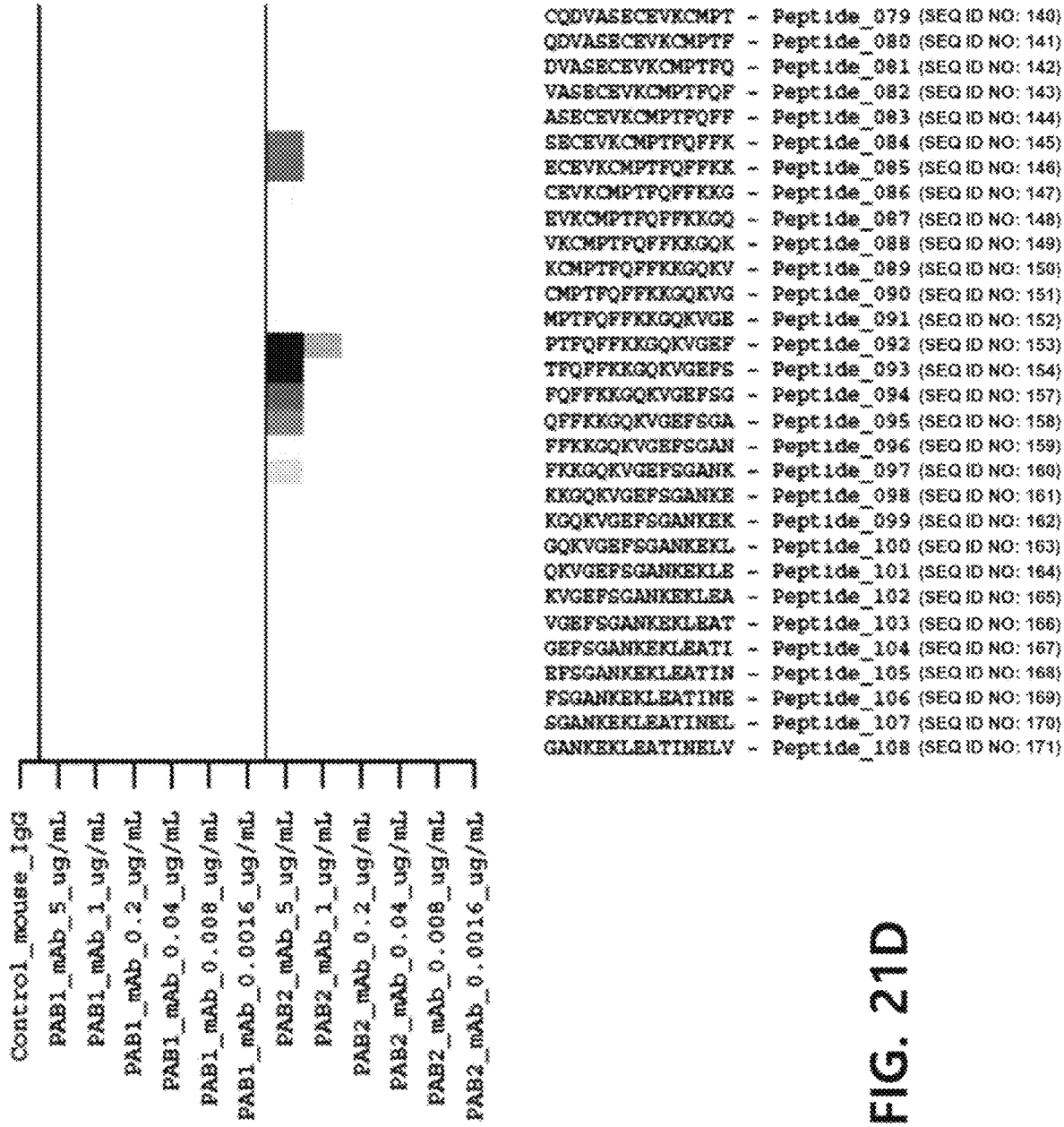

An exemplary fluorescence readout image of a mini-array cultured with one of the antibody samples is shown in FIG. 20. Low background levels were observed in all samples. Black indicates no signal, red shadow indicates an increase in detected signal intensity, white indicates detector saturation, and each individual subarray is outlined in green.

17-4. Heatmap Evaluation

To visualize the obtained results and compare binding regions across individual cultures, as shown in FIGS. 21A to 21D, heatmap diagrams were calculated. In FIGS. 21A to 21D, the fluorescence intensity is expressed in a color-coded manner, white indicates no binding, and red indicates strong binding. For all evaluations, the MMC2-value of the average pixel fluorescence for each peptide was calculated.

MMC2 is the same as the average value of all three cases on a microarray except when the coefficient of variation (CV), which is the standard deviation divided by the average value, is larger than 0.5. In this case, the average of the two closest values (MC2) is assigned to MMC2. The thick black line in the heatmap indicates the culture of a control only using a secondary anti-mouse IgG antibody. The culture of individual antibody samples is indicated by a thin blue line.

In the case of the antibody B266-1, as shown in Table 23, the highest signal, approximately 8-fold the average background level, was detected for Peptide_004 and Peptide_005 (SEQ ID NOs: 67 and 68). However, since Peptide_004 and Peptide_005 are not native forms, these peptides were excluded from an epitope candidate group.

TABLE 23

B266-1 (Ab1)

| Description | ID | NAME | Control IgG | 5 ug | 1 ug | 0.2 ug | 0.04 ug | 0.08 ug | 0.0016 ug |
|---|---|---|---|---|---|---|---|---|---|
| Negative control | AA | blank-control | 1 | 1 | 1 | 1 | 1 | 1 | 1 |
| Positive Control | Human_IgG | Control-Spot | 46.60 | 35.79 | 52.82 | 49.65 | 49.71 | 47.85 | 35.43 |
|  | Mouse_IgG | Control-Spot | 54.60 | 46.96 | 65.38 | 71.40 | 79.65 | 74.60 | 84.79 |
| It is not native form but recombinant insert region. | AADVHSQHHHHHHHH | Peptide_004 | 0.87 | 6.78 | 2.71 | 1.41 | 1.14 | 1.00 | 0.99 |
|  | ADVHSQHHHHHHHV | Peptide_005 | 1.07 | 7.63 | 3.58 | 1.78 | 1.60 | 1.28 | 1.60 |
|  | ATWCGPCKMIKPFFH | Peptide_046 | 1.56 | 6.41 | 3.18 | 2.00 | 1.96 | 1.64 | 1.79 |
|  | TWCGPCKMIKPFFHS | Peptide_047 | 1.11 | 5.58 | 2.25 | 1.58 | 1.50 | 1.11 | 1.18 |
|  | WCGPCKMIKPFFHSL | Peptide_048 | 4.63 | 6.10 | 6.00 | 5.99 | 6.57 | 7.25 | 7.61 |
|  | CGPCKMIKPFFHSLS | Peptide_049 | 1.25 | 2.89 | 1.96 | 1.45 | 1.51 | 1.31 | 1.37 |
|  | GPCKMIKPFFHSLSE | Peptide_050 | 0.42 | 2.19 | 1.09 | 0.65 | 0.68 | 0.52 | 0.62 |
|  | PCKMIKPFFHSLSEK | Peptide_051 | 0.47 | 1.24 | 0.81 | 0.61 | 0.62 | 0.60 | 0.83 |
|  | CKMIKPFFHSLSEKY | Peptide_052 | 1.18 | 3.84 | 2.38 | 1.38 | 1.23 | 1.12 | 1.37 |
|  | KMIKPFFHSLSEKYS | Peptide_053 | 1.16 | 2.45 | 2.13 | 1.66 | 1.35 | 1.44 | 1.42 |
|  | MIKPFFHSLSEKYSN | Peptide_054 | 0.64 | 2.36 | 1.15 | 0.84 | 0.71 | 0.71 | 0.73 |
|  | IKPFFHSLSEKYSNV | Peptide_055 | 0.83 | 2.08 | 1.38 | 1.04 | 1.41 | 0.85 | 1.05 |
|  | KPFFHSLSEKYSNVI | Peptide_056 | 1.09 | 2.89 | 1.84 | 1.24 | 1.11 | 1.07 | 1.18 |
|  | PFFHSLESKYSNVIF | Peptide_057 | 1.83 | 2.39 | 2.07 | 1.94 | 1.87 | 2.09 | 1.93 |
|  | PTFQFFKKGQKVGEF | Peptide_092 | 2.28 | 3.50 | 2.62 | 1.86 | 1.62 | 1.33 | 1.75 |

The antibody B264 showed a concentration-dependent signal profile, and considerably strong interactions with some peptides. The most significant binding was obtained with peptides listed in Table 24 below, particularly at two highest culture sample concentrations.

As shown in Table 24, the highest signal, approximately 7-fold the average background level, was measured for Peptide_012 and Peptide_018 (SEQ ID NOs: 75 and 81). However, since the Peptide_012 and Peptide_018 are not native forms, they were excluded from an epitope candidate group.

Subsequently, the peptides of SEQ ID NOs: 82 to 88, corresponding to Peptide_019 to Peptide_025 for which the strongest signal was measured were expected to be antibody B264-binding sites, and "VKQIESKTAFQEALD-AAGDKL" (SEQ ID NO: 174) was finally determined as an epitope of the antibody B264.

Afterward, the peptides of SEQ ID NO: 109 to SEQ ID NO: 120, corresponding to Peptide_046 to Peptide_057 for which the strongest signal was measured were expected to be antibody B264-binding sites, which has the same epitope as a B266-1-binding site.

TABLE 24

B264 (Ab2)

| Description | ID | NAME | Control IgG | 5 ug | 1 ug | 0.2 ug | 0.04 ug | 0.08 ug | 0.0016 ug |
|---|---|---|---|---|---|---|---|---|---|
| Negative control | AA | blank-control | 1 | 1 | 1 | 1 | 1 | 1 | 1 |
| Positive Control | Human_IgG | Control Spot | 46.60 | 6.70 | 20.77 | 36.30 | 48.06 | 52.63 | 45.73 |
|  | Mouse_IgG | Control-Spot | 54.60 | 7.16 | 24.51 | 46.01 | 69.54 | 76.34 | 74.50 |
| It is not native form but recombinant insert region. | HHHHHHHVKQIESKT | Peptide_012 | 0.74 | 4.49 | 3.65 | 1.72 | 1.15 | 0.88 | 0.81 |
|  | HHHHHHVKQIESKTA | Peptide_013 | 0.88 | 4.87 | 4.05 | 1.85 | 1.40 | 0.95 | 0.75 |
|  | HHHHHVKQIESKTAF | Peptide_014 | 0.83 | 6.90 | 6.71 | 3.16 | 1.49 | 1.14 | 0.69 |
|  | HHHHVKQIESKTAFQ | Peptide_015 | 0.54 | 5.96 | 5.11 | 2.50 | 1.69 | 0.79 | 0.58 |
|  | HVKQIESKTAFQEAL | Peptide_018 | 0.74 | 6.15 | 5.52 | 3.49 | 1.64 | 0.85 | 0.68 |
|  | VKQIESKTAFQEALD | Peptide_019 | 0.96 | 1.98 | 1.67 | 1.48 | 1.20 | 1.02 | 0.85 |
|  | KQIESKTAFQEALDA | Peptide_020 | 0.82 | 2.41 | 2.30 | 1.84 | 1.33 | 0.80 | 0.71 |
|  | QIESKTAFQEALDAA | Peptide_021 | 0.80 | 2.69 | 2.48 | 2.08 | 1.35 | 0.84 | 0.73 |
|  | IESKTAFQEALDAAG | Peptide_022 | 0.76 | 5.54 | 5.88 | 4.20 | 2.89 | 1.00 | 0.72 |

TABLE 24-continued

B264 (Ab2)

| Description | ID | NAME | Control IgG | 5 ug | 1 ug | 0.2 ug | 0.04 ug | 0.08 ug | 0.0016 ug |
|---|---|---|---|---|---|---|---|---|---|
| | ESKTAFQEALDAAGD | Peptide_023 | 1.02 | 1.26 | 1.19 | 1.12 | 1.15 | 0.91 | 0.78 |
| | SKTAFQEALDAAGDK | Peptide_024 | 0.87 | 6.09 | 6.50 | 4.00 | 2.38 | 1.00 | 0.72 |
| | KTAFQEALDAAGDKL | Peptide_025 | 1.00 | 6.49 | 7.24 | 4.90 | 2.39 | 1.03 | 0.88 |
| | FSATQCGPCKMIKPF | Peptide_044 | 1.73 | 3.33 | 2.93 | 2.30 | 2.12 | 1.87 | 1.60 |
| | SATWCGPCKMIKPFF | Peptide_045 | 4.14 | 4.90 | 5.11 | 4.58 | 4.59 | 5.89 | 4.08 |
| | ATWCGPCKMIKPFFH | Peptide_046 | 1.56 | 6.20 | 5.62 | 3.44 | 2.87 | 2.11 | 1.69 |
| | TWCGPCKMIKPFFHS | Peptide_047 | 1.11 | 4.89 | 4.07 | 2.52 | 1.97 | 1.52 | 1.15 |
| | WCGPCKMIKPFFHSL | Peptide_048 | 4.63 | 2.15 | 3.91 | 4.61 | 6.34 | 7.68 | 7.46 |
| | CGPCKMIKPFFHSLS | Peptide_049 | 1.25 | 1.11 | 1.20 | 1.34 | 1.48 | 1.43 | 1.18 |
| | GPCKMIKPFFHSLSE | Peptide_050 | 0.42 | 0.54 | 0.47 | 0.46 | 0.64 | 0.65 | 0.51 |
| | PCKMIKPFFHSLSEK | Peptide_051 | 0.47 | 4.28 | 3.91 | 2/32 | 1.41 | 0.70 | 0.58 |
| | CKMIKPFFHSLSEKY | Peptide_052 | 1.18 | 5.14 | 4.43 | 2.56 | 2.02 | 1.23 | 1.15 |
| | KMIKPFFHSLSEKYS | Peptide_053 | 1.16 | 6.49 | 8.52 | 4.75 | 2.54 | 1.76 | 1.41 |
| | MIKPFFHSLSEKYSN | Peptide_054 | 0.64 | 1.46 | 1.43 | 0.89 | 0.99 | 0.63 | 0.55 |
| | IKPFFHSLSEKYSNV | Peptide_055 | 0.83 | 3.57 | 3.26 | 2.21 | 1.51 | 0.99 | 0.81 |
| | KPFFHSLSEKYSNVI | Peptide_056 | 1.09 | 2.86 | 2.58 | 1.72 | 1.35 | 1.11 | 0.99 |
| | PFFHSLSEKYSNVIF | Peptide_057 | 1.83 | 2.44 | 2.19 | 2.08 | 2.15 | 2.27 | 1.73 |
| | SECEVKCMPTFQFFK | Peptide_084 | 0.99 | 3.79 | 3.26 | 2.36 | 1.83 | 1.33 | 0.97 |
| | ECEVKCMPTFQFFKK | Peptide_085 | 0.64 | 3.87 | 3.56 | 2.23 | 1.48 | 0.90 | 0.65 |
| | CEVKCMPTFQFFKKG | Peptide_086 | 0.79 | 1.90 | 1.56 | 1.16 | 1.14 | 1.02 | 0.82 |
| | PTFQFFKKGQKVGEF | Peptide_092 | 2.28 | 6.78 | 9.76 | 6.81 | 5.18 | 3.07 | 1.86 |
| | TFQFFKKGQKVGEFS | Peptide_093 | 1.21 | 6.18 | 5.33 | 3.72 | 2.46 | 1.53 | 1.12 |
| | FQFFKKGQKVGEFSG | Peptide_094 | 0.63 | 4.13 | 3.26 | 2.11 | 1.49 | 1.00 | 0.62 |
| | QFFKKGQKVGEFSGA | Peptide_095 | 1.44 | 3.44 | 3.52 | 2.13 | 1.66 | 1.15 | 1.07 |
| | FFKKGQKVGEFSGAN | Peptide_096 | 1.18 | 1.90 | 2.04 | 1.37 | 1.44 | 0.94 | 0.82 |
| | FKKGQKVGEFSGANK | Peptide_097 | 1.34 | 2.26 | 2.18 | 1.68 | 1.31 | 1.08 | 0.91 |

No significant binding was detected in culture of a secondary antibody control. Strong signals up to the saturation level were obtained at a spot of the control containing full-length mouse IgG during all cultures, indicating excellent analysis performance.

The epitope regions obtained through the above-described procedures are shown in Table 25 below, and as a result of confirming tertiary (3D) structures by 3D filing by downloading the NMR sequence of hTrx1 certified through a protein database (PDB), as shown in FIGS. 22A to 22F, when native forms, their sequences are present at the outside thereof, confirming that the peptides can serve as epitopes.

TABLE 25

Figure 22A:
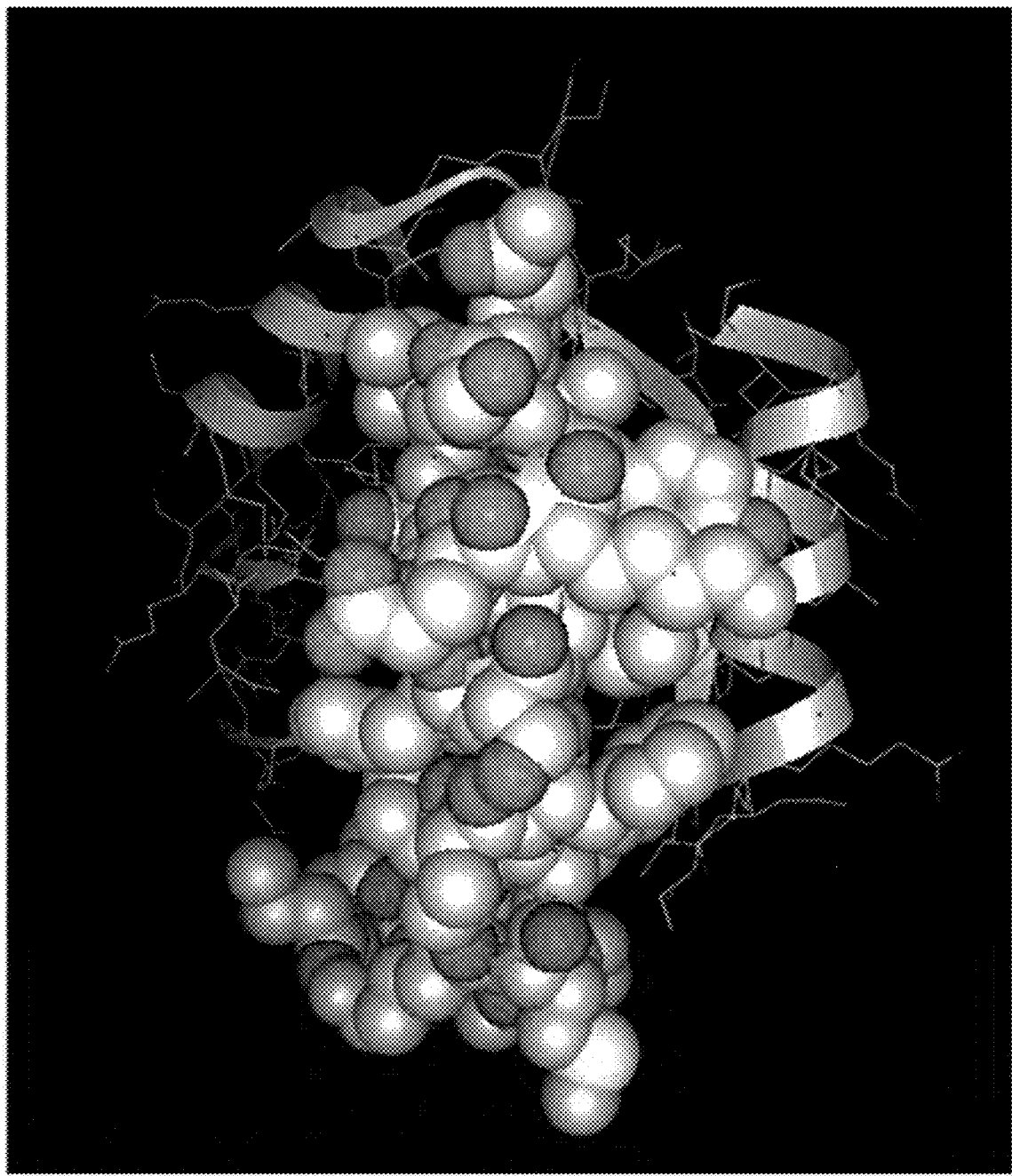
FIGS. 22A to 22F are images of confirming the position of an epitope in the three-dimensional structure of a hTrx1 protein.
Figure 22B:
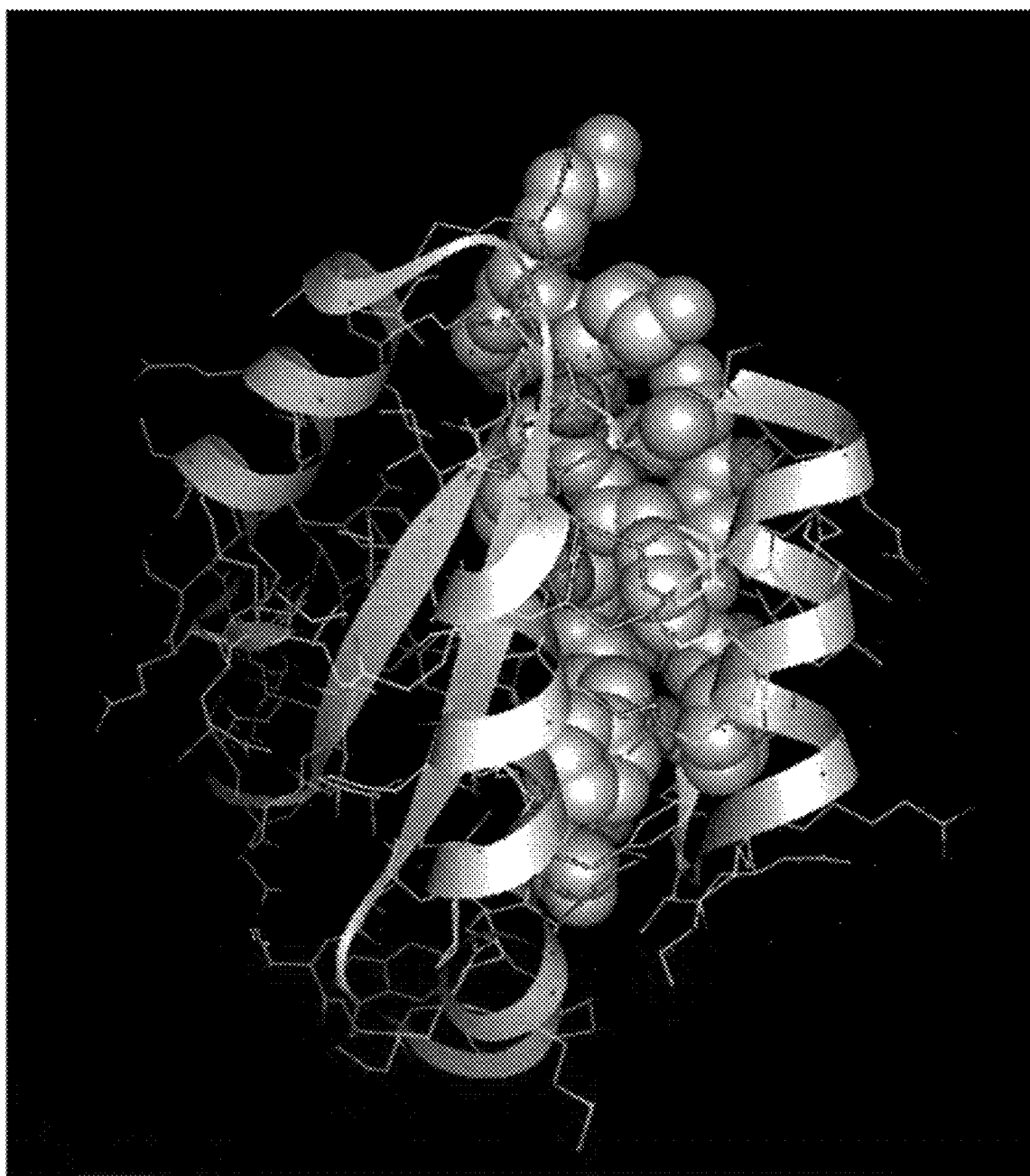
Figure 22C:
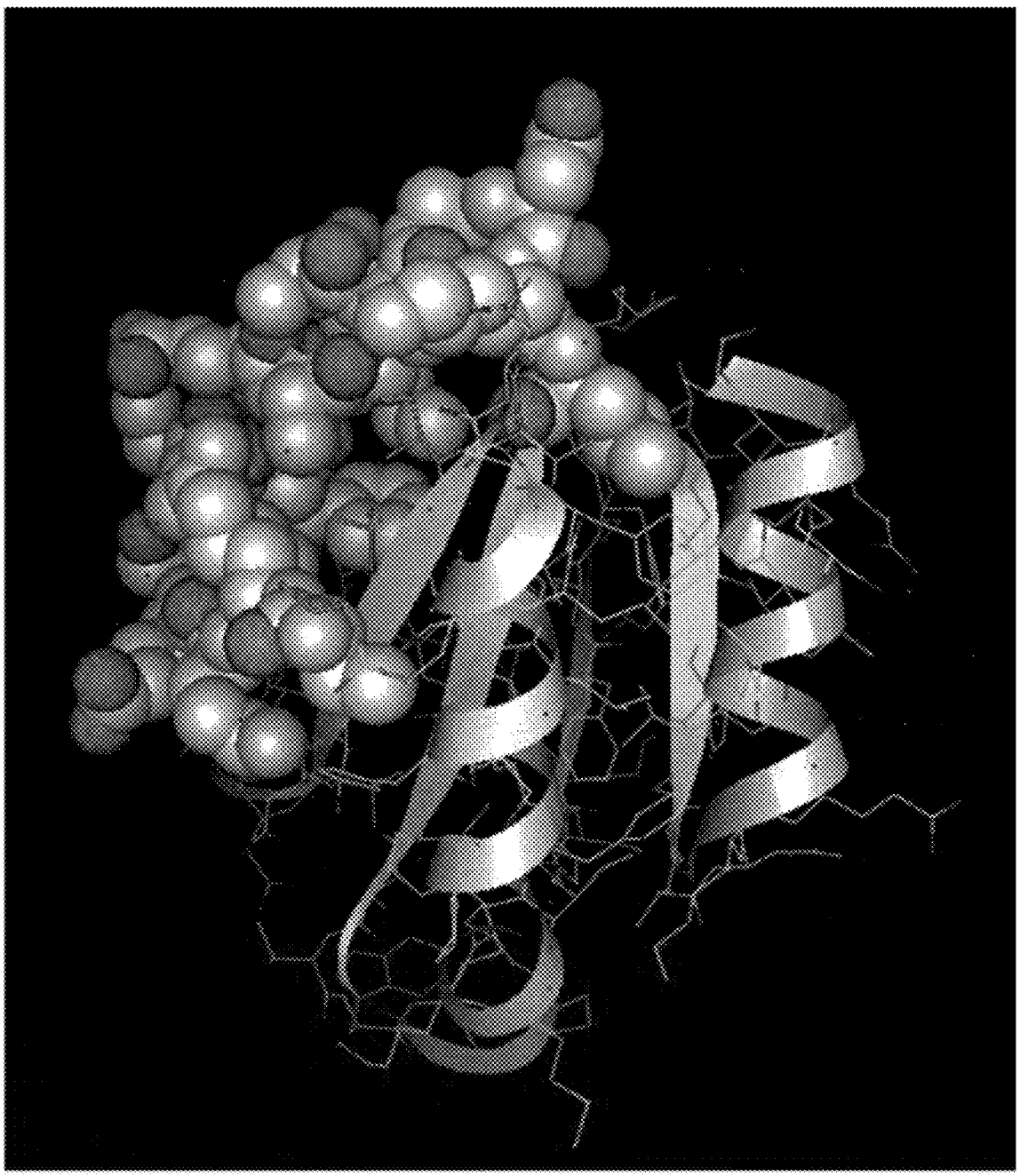
Figure 22D:
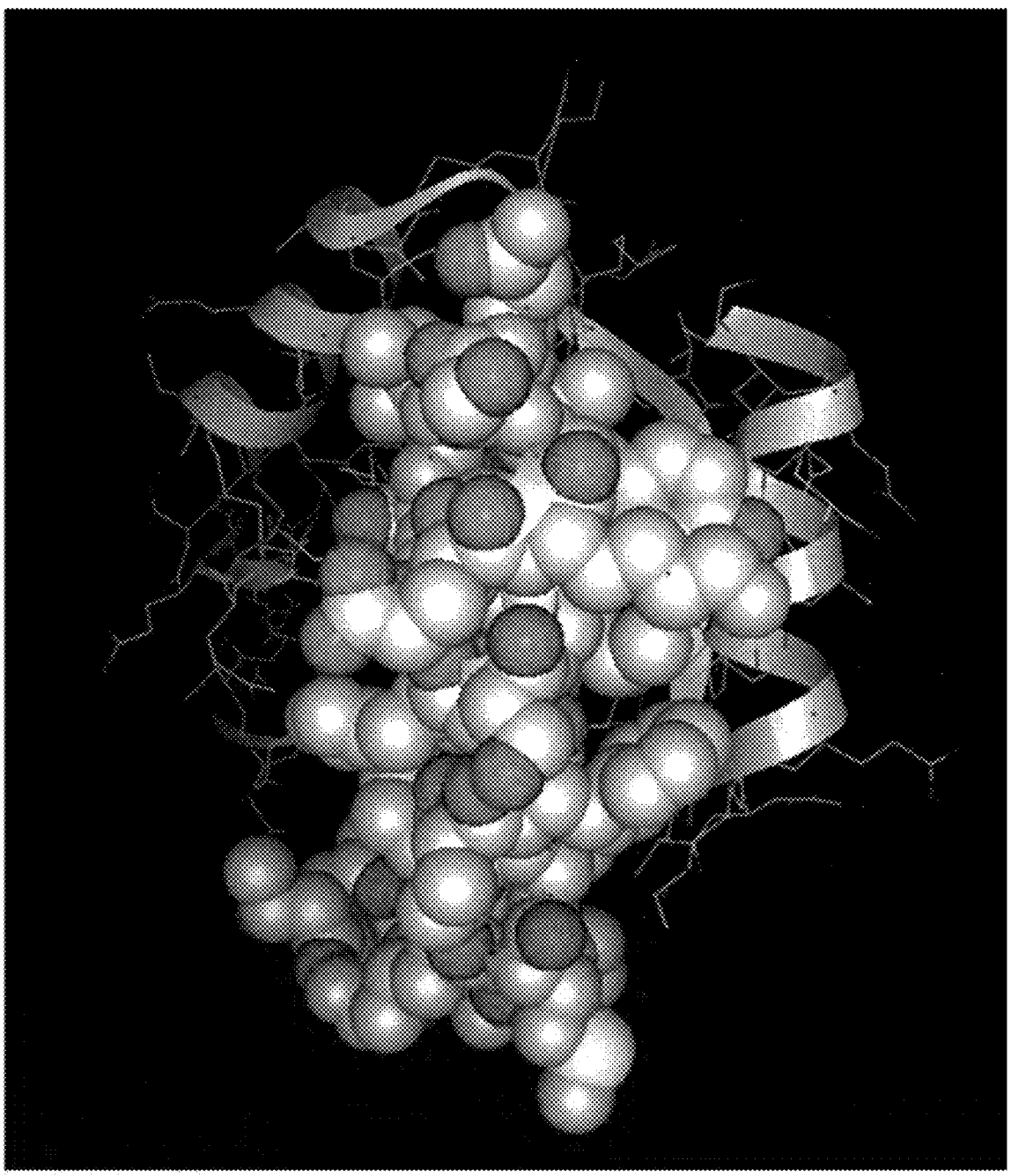
Figure 22E:
Figure 22F:

| Tertiary (3D) structure | Amino acid sequence | Gene sequence | Comparison with Example 13 | Description |
|---|---|---|---|---|
| FIGS. 22A, 22D | ATWCGPCKMIKPFFHS LSEKYSNVIF (SEQ ID NO: 172) | gctacctggtgcggcccgtgta aaatgattaaaccgttttccata gcctgtctgaaaaatacagtaa cgttatcttt (SEQ ID NO: 177) | Including M4 region | Epitopes of antibodies B264 and B266-1 |
| FIG. 22B | PTFQFFKKGQKVGEF (SEQ ID NO: 173) | ccgacgttccagttttcaaaaa aggtcaaaaagtcggtgaattt (SEQ ID NO: 178) | Including M6 region | Epitope of antibody B266-1 |
| FIG. 22C | VKQIESKTAFQEALD AAGDKL (SEQ ID NO: 174) | gtcaaacagatcgaatcaaaa accgcatttcaagaagccctgg acgccgctggtgacaaactg (SEQ ID NO: 179) | Integration of M1 and M2 regions | Epitope of antibody B264 |
| FIG. 22E | SECEVKCMPTFQFFKKG (SEQ ID NO: 175) | agcgaatgcgaagtgaaatgt atgccgacgttccagttttcaa aaaaggt (SEQ ID NO: 180) | Including M6 region | Epitope of antibody B264 |
| FIG. 22F | PTFQFFKKGQKVGEFS GANK (SEQ ID NO: 176) | ccgacgttccagttttcaaaaa aggtcaaaaagtcggtgaattt agcggtgccaacaaa (SEQ ID NO: 181) | Including M6 region | Epitope of antibody B264 |

The monoclonal antibody of the present invention can very specifically bind to Trx1 due to excellent binding affinity therefor, and can be effectively used in screening of breast cancer patients due to very high sensitivity and specificity. Further, the accuracy and reliability of breast cancer diagnosis can significantly increase because exceptionally high sensitivity and specificity are exhibited by detecting the monoclonal antibody of the present invention, which specifically binds to Trx1, rather than detecting CA15-3, another conventional breast cancer diagnostic biomarker. An epitope region of a human Trx1 antigen to which the antibody of the present invention binds can be effectively used in development of an improved antibody to enhance the binding affinity of an anti-Trx1 antibody.

The invention claimed is:

1. A monoclonal antibody specifically binding to thioredoxin-1 (Trx1) or an antigen-binding fragment thereof, comprising:
a light chain variable region including light chain CDR1 consisting of an amino acid sequence of SEQ ID NO: 7, light chain CDR2 consisting of an amino acid sequence of SEQ ID NO: 8 and light chain CDR3 consisting of an amino acid sequence of SEQ ID NO: 9, and a heavy chain variable region including heavy chain CDR1 consisting of an amino acid sequence of SEQ ID NO: 10, heavy chain CDR2 consisting of an amino acid sequence of SEQ ID NO: 11 and heavy chain CDR3 consisting of an amino acid sequence of SEQ ID NO: 12.

2. The monoclonal antibody or antigen-binding fragment thereof of claim 1, wherein the antibody comprises a light chain variable region consisting of an amino acid sequence of SEQ ID NO: 15 and a heavy chain variable region consisting of an amino acid sequence of SEQ ID NO: 16.

3. The monoclonal antibody or antigen-binding fragment thereof of claim 1, wherein the antibody comprises a light chain consisting of an amino acid sequence of SEQ ID NO: 19 or 25 and a heavy chain consisting of an amino acid sequence of SEQ ID NO: 20 or 26.

4. The monoclonal antibody or antigen-binding fragment thereof of claim 1, wherein the antibody comprises an IgG1 heavy chain and a kappa (κ) light chain.

5. The monoclonal antibody or antigen-binding fragment thereof of claim 1, wherein the antigen-binding fragment is Fab, F(ab'), F(ab')$_2$, Fv or a single chain antibody molecule.

6. The monoclonal antibody or antigen-binding fragment thereof of claim 1, wherein the antibody is a chimeric antibody, a humanized antibody or a human antibody.

7. A kit for diagnosing breast cancer, comprising the monoclonal antibody or antigen-binding fragment thereof of claim 1.

8. The kit of claim 7, which is an Enzyme-Linked Immunosorbent Assay (ELISA) kit.

9. The kit of claim 8, wherein the ELISA is one or more selected from the group consisting of direct ELISA, indirect ELISA, direct sandwich ELISA and indirect sandwich ELISA.

10. A method of providing information necessary for breast cancer diagnosis, comprising:
(a) bringing the monoclonal antibody or antigen-binding fragment thereof of claim 1 into contact with a biological sample isolated from a subject suspected of having breast cancer;
(b) measuring an expression level of the thioredoxin-1 (Trx1) protein binding to the monoclonal antibody or antigen-binding fragment thereof in the biological sample through the formation of an antigen-antibody complex; and
(c) comparing the expression level of the Trx1 protein, measured in Step (b) with that of a control and, if the protein expression level is higher than that of the control, determining the subject to be a breast cancer patient.

11. The method of claim 10, wherein the expression level of the Trx1 protein is measured by any one method selected from the group consisting of Western blotting, ELISA, sandwich ELISA, a radioimmunoassay, radioimmunodiffusion, Ouchterlony immunodiffusion, an immunoprecipitation assay, a complement fixation assay, an immunochromatographic assay, FACS and a protein chip assay.

12. The method of claim 10, wherein the isolated biological sample is any one or more selected from the group consisting of whole blood, serum, plasma, breast tissue and breast cells.

13. A method of providing information necessary for breast cancer diagnosis, comprising:
(a) coating a solid support with the monoclonal antibody or antigen-binding fragment thereof of claim 1;
(b) applying a biological sample isolated from a subject suspected of having breast cancer to the coated solid support;
(c) removing unbound biological sample from (b);
(d) applying a monoclonal antibody specifically binding to thioredoxin-1 (Trx1) or an antigen-binding fragment thereof to the solid support, wherein the monoclonal antibody comprises a light chain variable region including light chain CDR1 consisting of an amino acid sequence of SEQ ID NO: 1, light chain CDR2 consisting of an amino acid sequence of SEQ ID NO: 2 and light chain CDR3 consisting of an amino acid sequence of SEQ ID NO: 3, and a heavy chain variable region including heavy chain CDR1 consisting of an amino acid sequence of SEQ ID NO: 4, heavy chain CDR2 consisting of an amino acid sequence of SEQ ID NO: 5 and heavy chain CDR3 consisting of an amino acid sequence of SEQ ID NO: 6;
(e) removing unbound monoclonal antibody or antigen-binding fragment thereof from (d);
(f) measuring an expression level of the thioredoxin-1 (Trx1) protein; and
(g) comparing the expression level of the Trx1 protein, measured in Step (f), with that of a control, and, if the protein expression level is higher than that of the control, determining the subject to be a breast cancer patient.

14. The method of claim 13, wherein the expression level of the Trx1 protein is measured by any one method selected from the group consisting of Western blotting, ELISA, sandwich ELISA, a radioimmunoassay, radioimmunodiffusion, Ouchterlony immunodiffusion, an immunoprecipitation assay, a complement fixation assay, an immunochromatographic assay, FACS and a protein chip assay.

15. The method of claim 13, wherein the isolated biological sample is any one or more selected from the group consisting of whole blood, serum, plasma, breast tissue and breast cells.

* * * * *